United States Patent
Goto et al.

(10) Patent No.: US 9,018,325 B2
(45) Date of Patent: Apr. 28, 2015

(54) CATALYST FOR LIVING RADICAL POLYMERIZATION AND POLYMERIZATION METHOD

(75) Inventors: Atsushi Goto, Uji (JP); Hironori Kaji, Uji (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 14/240,607

(22) PCT Filed: Aug. 24, 2012

(86) PCT No.: PCT/JP2012/005336
§ 371 (c)(1),
(2), (4) Date: May 27, 2014

(87) PCT Pub. No.: WO2013/027419
PCT Pub. Date: Feb. 28, 2013

(65) Prior Publication Data
US 2014/0303334 A1    Oct. 9, 2014

(30) Foreign Application Priority Data

Aug. 25, 2011 (JP) ................. 2011-184173

(51) Int. Cl.
*C08F 4/00* (2006.01)
*C07C 211/62* (2006.01)
(Continued)

(52) U.S. Cl.
CPC .............. *C08F 4/00* (2013.01); *C08F 212/08* (2013.01); *C08F 220/14* (2013.01);
(Continued)

(58) Field of Classification Search
USPC .......... 502/162, 167, 168; 526/193, 204, 217, 526/206, 222, 236; 564/281, 291; 568/9
See application file for complete search history.

(56) References Cited

U.S. PATENT DOCUMENTS 2,857,365 A    10/1958  Johnson
5,304,615 A *   4/1994  Ambler et al. ................ 526/189
(Continued)

FOREIGN PATENT DOCUMENTS

JP     47-13366      4/1972
JP     47-13366 B4   4/1972
(Continued)

OTHER PUBLICATIONS

Ryan, et al, "First Nitroxide-Mediated Controlled/Living Free Radical Polymerization in an Ionic Liquid," Macromol. Rapid Commun. 2004, 25, 930-934.*

(Continued)

*Primary Examiner* — Fred M Teskin
(74) *Attorney, Agent, or Firm* — Seed IP Law Group PLLC

(57) ABSTRACT

A nonmetallic compound having an ionic bond with a halide ion is used as a catalyst for living radical polymerization. Even if a radical initiator is not used, a monomer can be subjected to a radical polymerization to obtain a polymer having narrow molecular weight distribution. The cost of the living radical polymerization can be remarkably reduced, and it is made possible to prevent adverse effects of using a radical initiator (such as side reactions). The present invention is significantly more environmentally friendly and economically excellent than conventional living radical polymerization methods, due to advantages such as low toxicity of the catalyst, low amount of the catalyst necessary, high solubility of the catalyst, mild reaction conditions, and no coloration/no odor, etc. The catalyst can be applied to various monomers and enables synthesis of high molecular weight polymers.

14 Claims, 4 Drawing Sheets

(51) Int. Cl.
| | |
|---|---|
| *C07F 9/54* | (2006.01) |
| *C08F 212/08* | (2006.01) |
| *C08F 220/18* | (2006.01) |
| *C08F 220/20* | (2006.01) |
| *C08F 220/34* | (2006.01) |
| *C08F 220/44* | (2006.01) |
| *C08F 220/10* | (2006.01) |
| *C08F 220/14* | (2006.01) |
| *C08F 220/28* | (2006.01) |
| *C08F 220/32* | (2006.01) |

(52) U.S. Cl.
CPC ............ *C08F 220/18* (2013.01); *C08F 220/20* (2013.01); *C08F 220/34* (2013.01); *C08F 220/44* (2013.01); *C08F 2220/1825* (2013.01); *C08F 2220/1841* (2013.01); *C08F 2220/1883* (2013.01); *C08F 2220/286* (2013.01); *C08F 2220/325* (2013.01)

(56) References Cited

U.S. PATENT DOCUMENTS

| | | | |
|---|---|---|---|
| 5,312,871 A * | 5/1994 | Mardare et al. | 525/272 |
| 5,530,079 A | 6/1996 | Veregin et al. | |
| 5,637,663 A | 6/1997 | Anolick et al. | |
| 6,133,389 A | 10/2000 | Anolick et al. | |
| 2002/0010291 A1 * | 1/2002 | Murphy | 526/133 |
| 2004/0158009 A1 * | 8/2004 | Mays et al. | 526/89 |
| 2005/0131186 A1 | 6/2005 | Percec et al. | |
| 2006/0063900 A1 | 3/2006 | San et al. | |
| 2010/0298499 A1 | 11/2010 | Goto et al. | |

FOREIGN PATENT DOCUMENTS

| | | |
|---|---|---|
| JP | 2006-89747 A | 4/2006 |
| WO | WO 02/079269 A1 | 10/2002 |

OTHER PUBLICATIONS

Iovu, et al, "Controlled/Living Radical Polymerization of Vinyl Acetate by Degenerative Transfer with Alkyl Iodides," *Macromolecules* 2003, 36, 9346-9354.*

Zhang, "Ionic Liquids . . . ," Encyclopedia of Polymer Science and Technology (J. Wiley & Sons, Inc.), 2005, 1-15.*

Green, et al, "Designing Imidazole-Based Ionic Liquids and Ionic Liquid Monomers . . . ," J. of Macromol. Science, Pt. C: Polymer Reviews, 49: 291-314, 2009.*

Paulsson, et al, "Molten and Solid Trialkylsulfonium Iodides . . . ," J. Phys. Chem. B 2003, 107, 13665-13670.*

Goto et al., "Living Radical Polymerizations with Germanium, Tin, and Phosphorus Catalysts—Reversible Chain Transfer Catalyzed Polymerizations (RTCPs),"*J Am Chem Soc* 129: 13347-13354, 2007; published online Oct. 4, 2007.

Heasley et al., "Boron Trifluoride Promoted Reactions of N-Haloelectrophiles with Alkenes," *Tetrahedron Letters* 26(15): 1811-1814, 1985.

Liu et al., "The Improved Process for Preparing N-Iodosuccinimide (NIS)," *Chemistry* 7: 32-33, 2000 (original Japanese document and English translation).

Prasad et al., "Effects of Phosphorous Oxychloride, Phosphorous Trichloride and Dichlorophenylphosphine on the Radical Polymerisation of Acrylonitrile Under Heterogeneous Conditions," *Polymer Bulletin* 2: 117-123, 1980.

Jeliĕiĕ et al., "Influence of Ionic Liquid Structure on the Propagation Kinetics of Methyl Methacrylate," *Macromolecules* 42:5062-5072, 2009.

Li et al., "Effect of the Medium on the Stereostructure of Poly(methyl methacrylate) Synthesized in Ionic Liquids," *Journal of Applied Polymer Science* 102:2199-2202, 2006.

Thurecht et al., "Free-Radical Polymerization in Ionic Liquids: The Case for a Protected Radical," *Macromolecules* 41:2814-2820, 2008.

\* cited by examiner

US 9,018,325 B2

CATALYST FOR LIVING RADICAL POLYMERIZATION AND POLYMERIZATION METHOD

TECHNICAL FIELD

The present invention is directed to a highly active catalyst, which is used in a living radical polymerization method, and a polymerization method using the catalyst. More specifically, the present invention uses a nonmetallic compound having an ionic bond with a halide ion as a catalyst for a living radical polymerization method.

BACKGROUND ART

A radical polymerization method has been a well-known method for polymerizing vinyl monomers to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having narrow molecular weight distribution. Specifically, even if the reaction is controlled, the ratio of weight-average molecular weight ($M_w$) and number-average molecular weight ($M_n$), ($M_w/M_n$), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having narrow molecular weight distribution. Specifically, a polymer having $M_w/M_n$ of 2 or less can easily be obtained. Therefore, this method has come into the limelight as a method for producing a polymer used in an advanced technology such as nanotechnology.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

Patent Document 1 (Japanese Laid-open Publication No. 2002-249505) discloses that a complex in which Cu, Ru, Fe, Ni or the like is a central metal, is used as a catalyst.

It should be noted that Patent Document 1 describes in its claim 1 that an organic halide is used as a polymerization initiator. This description is not intended to mean that a halogenated hydrocarbon acts as a catalyst for living radical polymerization. According to the invention of Patent Document 1, a metal complex having a transition metal as the central metal is used as the catalyst for living radical polymerization. According to the invention of Patent Document 1, an organic halide is used as a dormant species that will be described later in the present specification.

Patent Document 2 (Japanese Laid-open Publication No. 11-322822) discloses that a hydrido rhenium complex is used as a catalyst.

It should be noted that Patent Document 2 describes a "catalyst for radical living polymerization comprising a combination of a hydrido rhenium complex and a halogenated hydrocarbon" in claim 1. This description is not intended to mean that a halogenated hydrocarbon acts as a catalyst for living radical polymerization. According to the invention of Patent Document 2, the hydrido rhenium complex is used as the catalyst for living radical polymerization. According to the invention of Patent Document 2, the halogenated hydrocarbon is used as a dormant species that will be described later in the present specification. The combination of the catalyst and the dormant species is described as a catalyst in Patent Document 2, and this does not describe that the halogenated hydrocarbon serves as the catalyst for living radical polymerization.

Non-Patent Document 1 (Journal of The American Chemical Society 119, 674-680(1997)) discloses that a compound in which 4,4'-di-(5-nonyl)-2,2'-bipyridine is coordinated with copper bromide, is used as a catalyst.

It should be noted that Non-Patent Document 1 describes that 1-phenylethyl bromide is used at the time of polymerization of styrene. That is, according to the invention of Patent Document 2, a copper bromide complex is used as a catalyst for living radical polymerization, and 1-phenylethyl bromide is used as a dormant species that will be described later in the present specification.

However, when such a transition metal complex catalyst is used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high electroconductivity of the transition metal remaining in polymer, rendering the polymer conductive and hence unsuitable for use in electronic material such as resist material, organic electrochemical luminescence material, fuel cell, solar cell, lithium-ion cell. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher). (For example, in aforementioned Non-patent document 1, the polymerization reaction is performed at 110° C.).

It is noted that a living radical polymerization methods, which do not require a catalyst, have also been known. For example, a nitroxyl-type method and dithioester-type method have been known. However, these methods have the following disadvantages. A special protecting group must be introduced to the polymer growing chain. The protecting group is very expensive. Further, the polymerization reaction requires a high temperature (for example, 110° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (Polymer Preprints 2005, 46(2), 245-246) and Patent Document 3 (Japanese Laid-open Patent Publication No. 2007-92014) disclose that compounds having Ge, Sn or the like as a central metal are used as catalysts. Patent Document 4 (International Publication WO2008/139980) discloses that compounds having nitrogen or phosphorus as a central metal are used as catalysts.

In addition, recently, a novel organic catalyst-type living radical polymerization method using iodine as a protecting group and an amine as a catalyst, which is referred to as reversible complexation mediated polymerization (RCMP), has been developed. This polymerization method is characterized in that simple amines, such as triethylamine (TEA) and the like, can be utilized as catalysts, and is effective for polymerization of methacrylates and the like. Patent Document 5 (International Publication No. WO 2011/016166) discloses that organic amine compounds and the like are used as catalysts.

In regard to the copper complex catalyst described in Non-Patent Document 1, the cost for the catalyst required to polymerize 1 kg of a polymer sums up to approximately several thousand yen. On the other hand, in regard to a germanium catalyst, the cost is cut down to about one thousand yen. Thus, the invention of Non-Patent Document 2 markedly decreases the cost for the catalyst. However, in order to apply living radical polymerization to general-purpose resin products and the like, a further less expensive catalyst is demanded.

In general, it is known that transition metals or compounds of transition metal elements are preferable as catalysts for various chemical reactions. For example, the following is described on page 311 of "Inorganic Chemistry" by J. D. LEE (Tokyo Kagaku Dojin, $1^{st}$ edition published on Apr. 15, 1982): "Many transition metals and the compounds of the transition metals have catalytic action. . . . in some cases, a transition metal may adopt various valences and form unstable intermediate compounds, while in other cases, a transition metal provides good reaction surfaces, and these serve as catalytic actions." That is, it has been widely understood by those skilled in the art that the properties characteristic to transition metals, such as the ability to form various unstable intermediate compounds, are indispensable in connection with the function of a catalyst.

Furthermore, Ge, Sn and Sb described in aforementioned Non-Patent Document 2 are not transition metals, but are elements that belong to the $4^{th}$ period or the $5^{th}$ period of the Periodic Table and have large atomic numbers and have a large number of electrons and a large number of electron orbitals. Therefore, it is surmised in regard to Ge, Sn, and Sb that the fact that these atoms have a large number of electrons and a large number of electron orbitals works advantageously in terms of their action as catalysts.

According to such a common technological knowledge in connection with various catalysts of the prior art, it is believed that the typical elements which belong to the $2^{nd}$ period and the $3^{rd}$ period of the Periodic Table, merely have a small number of electrons and a smaller number of electron orbitals, and thus it is disadvantageous to use them in a catalyst compound, and a catalytic action cannot be expected from compounds utilizing these typical elements.

In addition, Non-patent document 3 discloses catalysts using a phosphorus compound. However, it does not describe using a nonmetallic element compound having an ionic bond with a halide ion.

Although various catalysts have been examined until now as described above, further improvement is required in the catalysts that can provide a polymer having narrow molecular weight distribution, such as amine compounds disclosed in Patent document 5 and the like.

For example, when a catalyst that can provide a polymer having narrow molecular weight distribution is used, that is, when a catalyst sufficiently controlling living polymerization is used, there was a problem that it is difficult to increase the molecular weight of the obtained polymer. For example, in case of methyl methacrylate (MMA) which has an α-methyl group, when the polymerization is carried out at a high temperature, a side reaction, i.e., removal of iodine from a terminal of a dormant species, significantly occurs. Therefore, there was a problem that polymerization over a long period of time is difficult, and accordingly there was a problem that it is difficult to increase the molecular weight. In addition, in some cases, depending on the type of a monomer, it was difficult to control polymerization. For example, in some cases, it was difficult to control polymerization of an acrylate monomer.

Further, in conventional living radical polymerization, a radical initiator such as a peroxide and diazo compound was used, except for the cases where a transition metal complex is used as a catalyst and nitroxyl is used as a protecting group. It thus has, for example, the following defects:

(1) A radical generated from a radical initiator reacts with a monomer to cause a reaction that is not based on the mechanism of living radical polymerization. As a result, a polymer having a less molecular weight than the desired polymer is mixed in the product, and molecular weight distribution becomes wide.

(2) When block copolymerization is carried out, a homopolymer is mixed in the product. For example, in synthesizing a block copolymer having a structure in which the segment obtained by polymerizing monomer B is linked to the segment obtained by polymerizing monomer A, a reaction of a radical initiator with monomer B produces a homopolymer, and, as a result, the purity of the block copolymer is lowered.

(3) In living radical polymerization, branched polymers which are referred to as, for example, a star-type polymer, and comb-type polymer can be synthesized. When the polymerization of such a branched polymer is carried out, a radical generated from a radical initiator is reacted with a monomer to cause a reaction that is not based on the mechanism of the living radical polymerization, and consequently a linear polymer is mixed in the product.

(4) When surface polymerization is carried out, a polymer that is not bound to a surface is produced. In living radical polymerization, the polymerization of which the starting point is a surface of a solid can be carried out to give a product of which the polymer is bound to the solid surface. In such a case, a radical generated from a radical initiator is reacted with a monomer to cause a reaction that is not based on the mechanism of the living radical polymerization, and thereby a polymer that is not bound to the surface is produced, and the yield is lowered.

Accordingly, a method of performing living radical polymerization without using a radical initiator is desired. In this regard, when the aforementioned catalyst in which a transition metal is the central element is used, living radical polymerization can be performed without using a radical initiator. However, since catalysts in which a transition metal is the central element have the aforementioned defects, it was difficult to utilize it industrially. Non-Patent Document 4 describes methods of using it wherein nitroxyl is used as a protecting group. However, when nitroxyl is used as a protecting group, since there are the aforementioned defects including those defects that a protecting group is very expensive, and the like, it is also difficult to utilize it industrially.

PRIOR ART REFERENCES

Patent Document

[Patent Document 1] Japanese Laid-open Patent Publication No. 2002-249505

[Patent Document 2] Japanese Laid-open Patent Publication No. 11-322822
[Patent Document 3] Japanese Laid-open Patent Publication No. 2007-92014
[Patent Document 4] International Publication WO2008/139980
[Patent Document 5] International Publication WO2011/016166

Non-Patent Document

[Non-Patent Document 1] *Journal of the American Chemical Society* 119, 674-680 (1997)
[Non-Patent Document 2] *Polymer Preprints* 2005, 46(2), 245-246, "Germanium- and Tin-Catalyzed Living Radical Polymerizations of Styrene", American Chemical Society, Division of Polymer Chemistry
[Non-Patent Document 3] *Polymer Preprints* 2007, 56(2), 2452, "A Novel Living Radical Polymerization using Germanium and Phosphorus Compound," The Society of Polymer Science, Japan, 56th Symposium on Macromolecules
[Non-Patent Document 4] Macromolecules 26, 2987-2988 (1993)

SUMMARY OF THE INVENTION

Problems to be Solved by the Invention

The present invention aims to solve the aforementioned problems. The objective of the present invention is to provide a catalyst having high activity for use in a living radical polymerization, and a method of polymerization using the catalyst.

Means for Solving the Problems

The present inventors earnestly conducted research to solve the above-mentioned problems and, have accomplished the present invention as a result. Specifically, according to the present invention, the following catalyst and polymerization methods as well as the use of the catalyst and the like are provided, and thereby the aforementioned problems are solved.

(1) A catalyst for a living radical polymerization method, wherein the catalyst is a nonmetallic compound having an ionic bond with a halide ion, and a nonmetallic atom in the nonmetallic compound is in a cationic state and forms an ionic bond with a halide ion.

(2) The catalyst according to the above item 1, wherein the nonmetallic atom is selected from the group 15 elements, the group 16 elements, or the group 17 elements, and one to four organic groups are bound to the nonmetallic atom.

(3) The catalyst according to any one of the above item 1 or 2, wherein the nonmetallic atom is selected from nitrogen, phosphorus, sulfur, or iodine.

(4) The catalyst according to any one of the above item 1 to 3,
wherein the nonmetallic atom in a cationic state is covalently bound to two to four organic groups and the nonmetallic atom is ionically bound to one halide ion, and
two of the organic groups may be linked to form a heterocycle,
wherein the nonmetallic atom is not bound to any substituent other than the halide ion and the organic groups.

(5) The catalyst according to the above item 4,
wherein one or two nonmetallic atoms are present in the nonmetallic compound, and when two nonmetallic atoms are present, the two nonmetallic atoms are linked via the organic group.

(6) The catalyst according to the above item 4 or 5, wherein the organic group is a hydrocarbon group or a substituted hydrocarbon group, the number of carbon atoms in the hydrocarbon group is 1 to 15, the number of carbon atoms of the hydrocarbon moiety in the substituted hydrocarbon group is 1 to 15.

(7) The catalyst according to any one of the above items 1 to 6,
wherein the halide ion ionically bound to the nonmetallic atom is an iodide ion or a bromide ion.

(8) The catalyst according to any one of the above items 1 to 7,
wherein the halide ion ionically bound to the nonmetallic atom is an iodide ion.

(9) The catalyst according to any one of the above items 4 to 6,
wherein the organic group is a saturated hydrocarbon group, a substituted saturated hydrocarbon group, an aromatic hydrocarbon group, or a substituted aromatic hydrocarbon group, or
wherein the organic group is a hydrocarbon group or a substituted hydrocarbon group, and is taken together with the nonmetallic atom to form an aromatic ring structure.

(10) The catalyst according to the above item 9,
wherein the organic group is lower alkyl, lower haloalkyl, aryl, or halogenated aryl, or
wherein the organic group is an unsaturated hydrocarbon or a halogenated unsaturated hydrocarbon and is taken together with the nonmetallic atom to form an aromatic ring structure.

(11) A method of polymerization comprising a step of conducting a living radical polymerization,
wherein the living radical polymerization step is conducted in the presence of the catalyst according to any one of the above items 1 to 10.

(12) The method according to the above item 11,
wherein a radical initiator is not added to a reaction mixture at the time of conducting the living radical polymerization.

(13) The method according to any one of above items 11 to 12,
wherein an organic halide having a carbon-halogen bond is used in the living radical polymerization reaction, and a halogen given from the organic halide is used as a protecting group of a growing chain.

(14) The method according to any one of above items 11 to 13,
wherein a reaction temperature at the time of conducting the living radical polymerization is 30° C. to 85° C.

(15) The method according to any one of above items 11 to 14,
wherein $I^-$ is used as an activating agent for the living radical polymerization reaction and $I_3^-$ is used as a deactivating agent for the living radical polymerization reaction.

(16) A use of a catalyst in living radical polymerization method,
wherein the catalyst is the catalyst according to any one of the above items 1 to 10, and
wherein the polymerization method comprises a step of conducting a living radical reaction in the presence of the catalyst.

(15) A raw material composition for living radical polymerization, comprising the catalyst according to any one of the above items 1 to 10.

It is noted that in a preferred embodiment, the organic halide having a carbon-halogen bond is a compound having the following general formula (II):

$$CR^2R^3R^4X^3 \quad (II)$$

wherein $R^2$ and $R^3$ are each, independently, halogen, hydrogen, or alkyl; $R^4$ is halogen, hydrogen, alkyl, aryl, heteroaryl, or cyano; $X^3$ is halogen; and
the monomer having a radical-reactive unsaturated bond is selected from:
(meth)acrylic acid ester monomers; aromatic unsaturated monomers (styrene-type monomers); carbonyl-group-containing unsaturated monomers; (meth)acrylonitriles; (meth)acrylamide-type monomers; diene-type monomers; vinyl ester monomers; N-vinyl monomers; (meth)acrylic acid monomer; vinyl halide monomers; and 1-olefin monomers.

Effect of the Invention

The present invention provides a catalyst for living radical polymerization which has high activity and a polymerization method using the same.

This catalyst has a significant advantage in that it is not necessary to use a radical initiator when a living radical polymerization is conducted.

Further, this catalyst has the advantage of having low toxicity. This catalyst has the advantage of having high solubility in a reaction solution. Therefore, it is not necessary to add a ligand to form a complex. As this catalyst has high activity, the polymerization reaction does not require a high temperature (for example, more than 110° C.), and it allows the reaction to sufficiently proceed at a low temperature (e.g., 30° C. to 80° C.). Further, the amount of the catalyst used can be reduced. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process.

Moreover, the present invention has the following advantages.

(1) Economical Efficiency

A low-priced catalyst is provided.

(2) Safety to the Human Body and Environment.

Most organic compounds have low toxicity, and thus if they are taken into the human body, the harm is small. Accordingly, from the viewpoint of safety, it is not necessary to remove them from a produced polymer. Even in the case of removing them for some reason, because of their characteristics including high water-solubility and the like, the operation for the removal is extremely easy.

(3) Recyclability

A variety of beads bearing an organic compound are commercially available. The catalyst compounds of the present invention can be attached onto beads and used as a catalyst. These beads can be recovered, and can be further used many times.

(4) Versatility of Usable Monomers

For a variety of monomers, it is made possible to conduct a living radical polymerization. Particularly, in polymerization of a monomer having a highly-reactive functional group, an organic compound is hardly affected by the functional group of the monomer, and thus is advantageous. Similarly, it is advantageous when using a solvent having a highly-reactive functional group. In addition, the catalyst of the present invention has high activity, and can be applied to a wide variety of monomers including acrylates.

(5) Synthesis of High Molecular Weight Polymers

The catalyst of the present invention has high activity, and allows polymerization at a low temperature. By conducting polymerization at a low temperature, a side reaction is suppressed, and it is made possible to synthesize high molecular weight polymers.

As described above, according to the present invention, a living radical polymerization method, which is significantly more environment-friendly and economically advantageous than conventional methods, has been realized.

EMBODIMENTS FOR CARRYING OUT THE INVENTION

Figure 1:
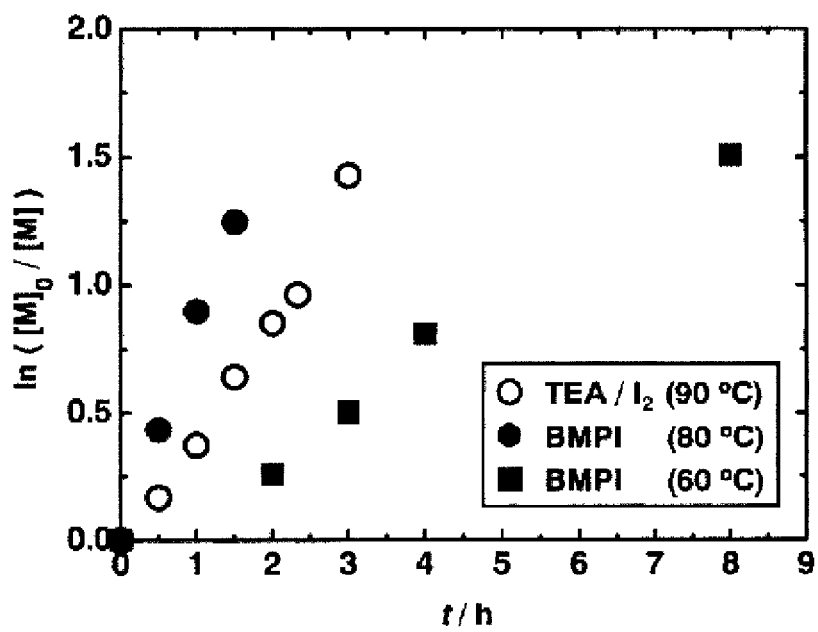
FIG. 1 shows a graph plotting $\ln([M]_0/[M])$ versus t (hour) for the result of performing the polymerization of methyl methacrylate (MMA) containing CP-I (the chemical formula is described below (Formula IA)) (80 mM) and a catalyst (BMPI (the chemical formula is described below in the list of the structural formulas of the catalyst compounds used in the Examples) (40 mM) or TEA (40 mM) and $I_2$ (1 mM)). It should be noted that $[M]_o$ and $[M]$ are monomer concentrations at time zero and t, respectively, and a higher $\ln([M]_0/[M])$ means a higher consumption rate of a monomer (polymerization ratio). White circles represent the result of an experiment at 90° C. in which 40 mM TEA (triethylamine) and 1 mM $I_2$ (iodine) were used (entry C-2 of Example 1). Black circles represent the result of an experiment at 80° C. in which BMPI was used (entry 1 of Example 1). Black squares represent the result of an experiment at 60° C. in which BMPI was used (entry 2 of Example 1).

Hereinbelow, the present invention will be explained in detail.
(General Terms)
Hereinafter, the terms, which are particularly used in the present specification, will be explained.

In the present specification, a "nonmetallic compound" refers to a compound containing a nonmetallic element.

In the present specification, a "nonmetallic element" refers to elements other than metallic elements in the Periodic Table. From the viewpoint of the groups of the Periodic Table, preferably it is an element of group 14 to group 17 of the Periodic Table. In addition, from the viewpoint of the periods of the Periodic Table, preferably it is an element in the 2nd period to the 5th period of the Periodic Table.

Specific examples of the nonmetallic element are, for example: carbon in the group 14 elements; nitrogen and phosphorus in the group 15 elements; oxygen, sulfur, and selenium in the group 16 elements; fluorine, chlorine, bromine, and iodine in the group 17 elements; and the like.

In the present specification, a "nonmetallic atom" refers to an atom of a nonmetallic element.

In the present specification, a "nonmetallic element cation" refers to a nonmetallic element being in a cationic state.

In the present specification, an "organic group" refers to a substituent, for example, hydrocarbon, substituted hydrocarbon, and the like, which are composed of organic material.

In the present specification, a "hydrocarbon" refers to a molecule or group which consists of carbon and hydrogen. A chain hydrocarbon may be a straight chain or branched chain. A cyclic hydrocarbon may consist of a cyclic structure. A cyclic hydrocarbon may have a structure in which a chain hydrocarbon is linked to the cyclic structure. A hydrocarbon may have an arbitrary natural number of carbon atoms. Preferably, a hydrocarbon has 1 to 30 carbon atoms. More preferably, a hydrocarbon has 1 to 20 carbon atoms. Further preferably, a hydrocarbon has 1 to 10 carbon atoms.

When a hydrocarbon molecule or hydrocarbon group is unsaturated, the unsaturated bond may be a double bond or triple bond. The hydrocarbon molecule or hydrocarbon group may have only one unsaturated group, or may have two or more unsaturated groups.

In the present specification, a "substituted hydrocarbon" refers to hydrocarbon in which one or more hydrogens are substituted with one or more substituents. The number of hydrogen atoms to be substituted may be one. Alternatively, the number of hydrogen atoms to be substituted may be two or more. For example, two to five hydrogen atoms may be substituted. In this regard, halogen, a hydroxyl group, a cyano group, an amino group, a nitro group, an alkoxy group, an alkylcarboxyl group (an ester group), an alkylcarbonyl group (a ketone group), or the like can be used as a substituent.

In the present specification, an "aromatic hydrocarbon" refers to hydrocarbon having aromaticity, for example, aryl, heteroaryl, and the like.

In the present specification, a "heterocycle" refers to a ring whose framework is composed of a hetero atom(s), such as nitrogen, oxygen, sulfur, and the like, and a carbon atom(s).

In the present specification, a "saturated hydrocarbon" refers to hydrocarbon which does not contain an unsaturated bond.

In the present specification, an "unsaturated hydrocarbon" refers to hydrocarbon containing an unsaturated bond. The unsaturated bond may be a double bond or a triple bond. The number of the unsaturated bond may be one. Alternatively, the number of the unsaturated bond may be two or more.

In the present specification, a "halogenated unsaturated hydrocarbon" refers to unsaturated hydrocarbon in which one or more hydrogens are substituted with one or more halogens. The number of hydrogen atoms to be substituted may be one. Alternatively, the number of hydrogen atoms to be substituted may be two or more. For example, two to five hydrogen atoms may be substituted.

In the present specification, a "substituted saturated hydrocarbon" refers to saturated hydrocarbon in which one or more hydrogens are substituted with one or more substituents. The number of hydrogen atoms to be substituted may be one. Alternatively, the number of hydrogen atoms to be substituted may be two or more. For example, two to five hydrogen atoms may be substituted. In this regard, halogen, a hydroxyl group, a cyano group, an amino group, a nitro group, an alkoxy group, an alkylcarboxyl group, an alkylcarbonyl group, and the like can be used as substituents.

In the present specification, a "substituted aromatic hydrocarbon" refers to an aromatic hydrocarbon in which one or more hydrogens are substituted with one or more substituents. The number of hydrogen atoms to be substituted may be one. Alternatively, the number of hydrogen atoms to be substituted may be two or more. For example, two to five hydrogen atoms may be substituted. In this regard, alkyl, or alkyloxy, halogen, a hydroxyl group, a cyano group, an amino group, a nitro group, an alkoxy group, an alkylcarboxyl group, an alkylcarbonyl group, and the like can be used as substituents.

In one embodiment of the present invention, unsaturated hydrocarbon having a resonance structure, or halogenated unsaturated hydrocarbon having a resonance structure can be used as a substituent of a catalyst compound. In the present specification, an "unsaturated hydrocarbon having a resonance structure" refers to a hydrocarbon having double bonds and single bonds alternately. For example, it is a hydrocarbon having such a structure as "—CH=CH—CH=CH—CH=". This unsaturated hydrocarbon may have a chain structure or may have a cyclic structure. In addition, it may consist of a cyclic structure only, and may have a structure in which a chain hydrocarbon is further linked to a cyclic structure. A hydrocarbon may have an arbitrary natural number of carbon atoms. Preferably, a hydrocarbon has 1 to 30 carbon atoms. More preferably, a hydrocarbon has 1 to 20 carbon atoms. Further preferably, a hydrocarbon has 1 to 10 carbon atoms.

In the present specification, a "halogenated unsaturated hydrocarbon having a resonance structure" refers to unsaturated hydrocarbon having the above-described resonance structure in which one or more hydrogen atoms in the unsaturated hydrocarbon are substituted with one or more halogen atoms. The number of hydrogen atoms to be substituted may be one. Alternatively, the number of hydrogen atoms to be substituted may be two or more. For example, two to five hydrogen atoms may be substituted.

Specific examples of the hydrocarbon include alkyl, alkenyl, alkynyl, alkoxy, aryl, and the like described below.

In the present specification, an "alkyl" refers to a monovalent group which is generated after a chain or cyclic aliphatic hydrocarbon (alkane) loses a hydrogen atom. In the cases of a chain alkyl group, the alkyl group is generally represented by $C_kH_{2k+1}$— (wherein k is a positive integer). A chain alkyl group may be a straight chain or branched chain. A cyclic alkyl group may consist of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms. In the present specification, an "alkylene" refers to a divalent group which is generated after an alkyl group further loses one hydrogen atom.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl and isopropyl. In the present specification, a "lower alkylene" refers to a divalent group which is generated after a lower alkyl group further loses one hydrogen atom.

In the present specification, an "alkenyl" refers to a monovalent group which is generated after a chain or cyclic aliphatic hydrocarbon (alkene) having a double bond loses a hydrogen atom. In the cases of a chain alkene having one double bond, the alkene group is generally represented by $C_kH_{2k-1}$— (wherein k is a positive integer). The number of double bond may be one, alternatively, the number of double bond may be two or more. There is no particular upper limit in the number of double bonds, but the upper limit may be 10 or less, or 5 or less. Preferred is a structure in which double bonds and single bonds are alternately repeated. A chain alkenyl group may be a straight chain or branched chain. A cyclic alkenyl group may consist of a cyclic structure. A cyclic alkenyl group may have a structure in which a chain structure is linked to the cyclic structure. Furthermore, a double bond may be present on a cyclic structure moiety or chain structure moiety. An alkenyl group may have an arbitrary natural number of carbon atoms. Preferably, an alkenyl group has 1 to 30 carbon atoms. More preferably, an alkenyl group has 1 to 20 carbon atoms. In the present specification, an "alkenylene" refers to a divalent group which is generated after an alkenyl group further loses one hydrogen atom.

In the present specification, a "lower alkenyl" refers to an alkenyl having a relatively small number of carbon atoms. In a lower alkenyl, the number of carbon atoms is preferably $C_{2-10}$, more preferably, $C_{2-5}$, and further preferably, $C_{2-3}$. Specific examples of alkenyl are, for example, vinyl and the like.

In a preferred embodiment, an alkenyl group is represented by the formula: —CR$^7$=CR$^8$R$^9$. R$^7$, R$^8$, and R$^9$ may be hydrogen, may be alkyl, or may be other substituent (for example, alkenyl, alkylcarboxyl, haloalkyl, alkylcarbonyl, amino, cyano, alkoxy, aryl, heteroaryl, or alkyl-substituted aryl). When all of R$^7$, R$^8$, and R$^9$ are hydrogen, this group is a vinyl group.

In the present specification, a "halogenated alkenyl" refers to an alkenyl in which a hydrogen in the alkenyl is substituted with a halogen. The number of hydrogen atoms to be substituted may be one. Alternatively, the number of hydrogen atoms to be substituted may be two or more. For example, two to five hydrogen atoms may be substituted.

In the present specification, a "halogenated lower alkenyl" refers to a lower alkenyl in which a hydrogen in the lower alkenyl is substituted with a halogen. The number of hydrogen atoms to be substituted may be one. Alternatively, the number of hydrogen atoms to be substituted may be two or more. For example, two to five hydrogen atoms may be substituted.

In the present specification, an "alkynyl" refers to a monovalent group which is generated after a chain or cyclic aliphatic hydrocarbon (alkyne) having a triple bond loses a hydrogen atom. In the cases of a chain alkyne having one triple bond, the alkene group is generally represented by $C_kH_{2k-3}$— (wherein k is a positive integer). The number of triple bond may be one, alternatively, the number of triple bond may be two or more. There is no particular upper limit in the number of triple bond, but the upper limit may be 10 or less, or 5 or less. Preferred is a structure in which triple bonds and single bonds are alternately repeated. A chain alkynyl group may be a straight chain or branched chain. A cyclic alkynyl group may consist of a cyclic structure. A cyclic alkynyl group may have a structure in which a chain structure is linked to the cyclic structure. Furthermore, a triple bond may be present on a cyclic or chain structure moiety. An alkynyl group may have an arbitrary natural number of carbon atoms. Preferably, an alkynyl group has 1 to 30 carbon atoms. More preferably, an alkynyl group has 1 to 20 carbon atoms. In the present specification, an "alkynylene" refers to a divalent group which is generated after an alkynyl group further loses one hydrogen atom.

An alkynyl group may be an alkynyl group having a relatively small number of carbon atoms, i.e., lower alkynyl group. In this case, the number of carbon atoms is preferably $C_{2-10}$, more preferably, $C_{2-5}$, and further preferably, $C_{2-3}$.

In a preferred embodiment, an alkynyl group is represented by the formula:

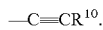

$R^{10}$ may be hydrogen, alkyl, or other substituents (for example, alkenyl, alkylcarboxyl, haloalkyl, alkylcarbonyl, amino, cyano, alkoxy, aryl, heteroaryl, alkyl-substituted aryl or alkoxy-substituted heteroaryl).

In the present specification, an "alkoxy" refers to a group in which an oxygen atom is bound to the aforementioned alkyl group. That is, when the alkyl group is represented by R—, the alkoxy refers to a group represented by RO—. A chain alkoxy group may be a straight chain or branched chain. Cyclic alkoxy may be composed only of a cyclic structure, or may have a structure formed from a cyclic structure further linked with chain alkyl. The number of carbon atoms in the alkoxy may be any natural number. The number of carbon atoms is preferably from 1 to 30, and more preferably from 1 to 20.

In the present specification, a "lower alkoxy" refers to an alkoxy group having relatively fewer carbon atoms. The lower alkoxy is preferably $C_{1-10}$ alkoxy, more preferably $C_{1-5}$ alkoxy, and even more preferably $C_{1-3}$ alkoxy. Specific examples thereof include methoxy, ethoxy, propoxy, isopropoxy, and the like.

In the present specification, an "alkylcarboxyl" refers to a group in which a carboxyl group is bound to the aforementioned alkyl group. That is, when the alkyl group is represented by R—, the alkylcarboxyl refers to a group represented by RCOO—. A chain alkylcarboxyl group may be a straight chain or branched chain. A cyclic alkylcarboxyl group may be composed only of a cyclic structure, or may have a structure formed from a cyclic structure further linked with chain alkyl. The number of carbon atoms in the alkylcarboxyl may be any natural number. The number of carbon atoms is preferably from 1 to 30, and more preferably from 1 to 20.

In the present specification, a "lower alkylcarboxyl" refers to an alkylcarboxyl group having relatively fewer carbon atoms. The lower alkylcarboxyl is preferably $C_{1-10}$ alkylcarboxyl, more preferably $C_{1-5}$ alkylcarboxyl, and even more preferably $C_{1-3}$ alkylcarboxyl.

In the present specification, an "alkylcarbonyl" refers to a group in which a carbonyl group is bound to the aforementioned alkyl group. That is, when the alkyl group is represented by R—, the alkylcarbonyl refers to a group represented by RCO—. A chain alkylcarbonyl group may be a straight chain or branched chain. Cyclic alkylcarbonyl may be composed only of a cyclic structure, or may have a structure formed from a cyclic structure further linked with chain alkyl. The number of carbon atoms in the alkylcarbonyl may be any natural number. The number of carbon atoms is preferably from 1 to 30, and more preferably from 1 to 20.

In the present specification, a "lower alkylcarbonyl" refers to an alkylcarbonyl group having relatively fewer carbon atoms. The lower alkylcarbonyl is preferably $C_{1-10}$ alkylcarbonyl, more preferably $C_{1-5}$ alkylcarbonyl, and even more preferably $C_{1-3}$ alkylcarbonyl.

In the present specification, a "haloalkyl" refers to a group in which a hydrogen atom of the aforementioned alkyl group is substituted with a halogen atom. A chain haloalkyl group may be a straight chain or branched chain. A cyclic haloalkyl group may be composed only of a cyclic structure, or may have a structure formed from a cyclic structure further linked with chain alkyl. The number of carbon atoms in the haloalkyl may be any natural number. The number of carbon atoms is preferably from 1 to 30, and more preferably from 1 to 20. In the haloalkyl, all of the hydrogen atoms may be substituted with halogen, or only some of the hydrogen atoms may be substituted. The number of hydrogen atoms to be substituted may be one. Alternatively, the number of hydrogen atoms to be substituted may be two or more. For example, two to five hydrogen atoms may be substituted. It should be noted that in the present specification, a "halogenated alkyl" and a "haloalkyl" have the same meaning In the present specification, a "lower haloalkyl" refers to a haloalkyl group having relatively fewer carbon atoms. The lower haloalkyl is preferably $C_{1-10}$ haloalkyl, more preferably $C_{1-5}$ haloalkyl, and even more preferably $C_{1-3}$ haloalkyl. Specific examples of a preferable lower haloalkyl group include a trifluoromethyl group, and the like. In the lower haloalkyl, all of the hydrogen atoms may be substituted with halogen, or only some of the hydrogen atoms may be substituted. The number of hydrogen atoms to be substituted may be one. Alternatively, the number of hydrogen atoms to be substituted may be two or more. For example, two to five hydrogen atoms may be substituted. It should be noted that in the present specification, a "halogenated lower alkyl" and a "lower haloalkyl" have the same meaning.

In the present specification, a "haloalkenyl" refers to an alkenyl group in which a hydrogen in the alkeny group is substituted with a halogen. In the haloalkenyl, all of the hydrogen atoms may be substituted with halogen, or only some of the hydrogen atoms may be substituted. The number of hydrogen atoms to be substituted may be one. Alternatively, the number of hydrogen atoms to be substituted may be two or more. For example, two to five hydrogen atoms may be substituted. It should be noted that in the present specification, a "halogenated alkenyl" and a "haloalkenyl" have the same meaning.

In the present specification, a "lower haloalkenyl" refers to a haloalkenyl group having a relatively small number of carbon atoms. Preferably, it is $C_{2-10}$, more preferably, $C_{2-5}$, and further preferably, $C_{2-3}$. In the lower haloalkenyl, all of the hydrogen may be substituted with halogen, or only some of the hydrogen atoms may be substituted. The number of hydrogen atoms to be substituted may be one. Alternatively, the number of hydrogen atoms to be substituted may be two or more. For example, two to five hydrogen atoms may be substituted. It should be noted that in the present specification, a "halogenated lower alkenyl" and a "lower haloalkenyl" have the same meaning.

In the present specification, a "substituted alkyl" refers to a group in which a hydrogen atom of an alkyl group is substituted with a substituent. Such a substituent includes aryl, heteroaryl, cyano and the like.

In the present specification, a "halogenated substituted alkyl" refers to a group in which a hydrogen of an alkyl group is substituted with a halogen, and another hydrogen of the alkyl group is substituted with another substituent. For, example, such another substituent includes an aryl group, a heteroaryl group, a cyano group and the like.

In the present specification, an "aryl" refers to a group which is generated after a hydrogen atom bound to a ring of an aromatic hydrocarbon is removed. The number of aromatic hydrocarbon ring constituting aryl may be one, alternatively, may be two or more. Preferred number of aromatic hydrocarbon ring is one to three. When there are a plurality of aromatic hydrocarbon rings in a molecule, the plurality of rings may be fused or not. Specifically, for example, an aryl includes a phenyl group, naphthyl group, anthracenyl group, biphenyl group, and the like.

In the present specification, a "heteroaryl" refers to a group in which elements constituting the ring skeleton of an aromatic ring of aryl contain a heteroatom other than carbon. Examples of heteroatoms include, specifically, oxygen, nitrogen, sulfur, and the like. The number of heteroatom in the aromatic ring is not particularly limited. The aromatic ring may contain, for example, only one heteroatom, or may contain two, three, or four or more heteroatoms.

In the present specification, a "substituted aryl" refers to a group which is generated after a substituent binds to an aryl group. In the present specification, a "substituted heteroaryl" refers to a group which is generated after a substituent binds to a heteroaryl group.

In the present specification, a "halogen" refers to a monovalent radical of an element, which belongs to the 7B group of the periodic table, such as a fluorine (F), chlorine (Cl), bromine (Br) and iodine (I). Preferred is bromine or iodine, and more preferred is iodine.

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have exhaustively reacted. According to this polymerization reaction, after completion of a polymerization reaction, a terminal of the generated polymer maintains the polymerization activity. If a monomer is added, then it is possible to start the polymerization reaction again.

A living radical polymerization is characterized in that, for example, a polymer having an arbitrary average molecular weight can be synthesized by adjusting the ratio of concentrations of a monomer and a dormant species (described later in the present specification), and the generated polymer has very narrow molecular weight distribution, and the polymerization can be applied to a block copolymer. It is noted that a living radical polymerization is sometimes abbreviated as "LRP".

In the present specification, a "central element" refers to an atom which is bound to a halogen atom and contributes mainly to a catalytic action among atoms constituting a compound that becomes a catalyst. It has the same meaning as the term "central metal" used in the prior art. However, since the central element used in the present invention is not metal, the term "central element" is used in place of the term "central metal" in the prior art to avoid misunderstanding.

Hereinafter, the present invention will be explained in detail.

(Catalyst)

In the present invention, a nonmetallic compound having an ionic bond with a halide ion is used as a catalyst for a living radical polymerization method. In one preferred embodiment, a nonmetallic compound having an organic group, i.e., an organic compound containing a nonmetallic element, is used.

A nonmetallic element that can become a cation is contained in a catalyst compound of the present invention. It is believed that since an ionic bond between a nonmetallic element cation and a halide ion is present in a catalyst compound of the present invention, a high activity for a catalyst is achieved. In one preferred embodiment, a nonmetallic compound used as a catalyst has a nonmetallic element selected from nitrogen, phosphorus, sulfur, or iodine.

Preferably, the nonmetallic compound does not contain a metal element.

In the present invention, in a nonmetallic compound to be a catalyst, a nonmetallic element is in a cationic state (that is, the element becomes a nonmetallic element cation) to form an ionic bond with a halide ion. Further, since this nonmetallic element cation and a halide ion are present, high activity as a catalyst is achieved. It should be noted that regarding this catalytic action, this nonmetallic element cation or a halide ion, or the entirety of the nonmetallic element cation and the halide ion is believed to catalyze an abstraction reaction of a radical from a dormant species. It should be noted that unlike a transition metal catalyst, the ionic valence of a nonmetallic element of a catalyst compound of the present invention does not change during living radical polymerization.

A nonmetallic compound having an ionic bond with a halide ion can suitably control a reaction to abstract a halogen from a dormant species and a reverse reaction thereof, and thus can catalyze living radical polymerization.

In the catalyst of the present invention, a halide ion is ionically bound to a nonmetallic atom.

In the catalyst of the present invention, it is preferable that an organic group is covalently bound to a nonmetallic atom.

In the catalyst of the present invention, it is preferable that a nonmetallic atom is not bound to any substituent other than a halide ion and an organic group.

Additionally, in the catalyst of the present invention, preferably, a hydrogen atom is not bound to a nonmetallic atom.

In a preferred embodiment, in the nonmetallic compound, a saturated aliphatic, unsaturated aliphatic, or aromatic hydrocarbon group binds to a nonmetallic atom.

The catalyst nonmetallic compound may have only one nonmetallic atom, or may have two or more nonmetallic atoms. Preferably, it has 1 to 10 nonmetallic atoms. More preferably, it has 1 to 6 nonmetallic atoms. Further preferably, it has 1 to 4 nonmetallic atoms. Particularly preferably, it has 1 to 3 nonmetallic atoms. In addition, when a halogen in the catalyst is iodine or bromine, particularly preferably, it has 1 to 2 nonmetallic atoms.

When only one nonmetallic atom is present, a preferred catalyst compound is a compound in which an organic group (e.g., hydrocarbon) binds to the one nonmetallic atom. Specific examples of preferable compounds are, for example, compounds represented by a general formula $AR_n$, wherein A is a nonmetallic atom, and in a preferable embodiment, A is nitrogen, phosphorous, sulfur, or iodine. R is a hydrocarbon substituent, and in a preferable embodiment, R is alkyl, aryl or the like. Compounds wherein R is lower alkyl are generally inexpensive and therefore the compounds are preferable. The number n is a number which is selected such that the valences of A and R are balanced in the whole molecule.

When two or more nonmetallic atoms are present, it is preferable that the nonmetallic atoms are linked via an organic group (e.g., hydrocarbon group) to each other.

Further, when two or more nonmetallic atoms are present, each of the nonmetallic atoms may be the same as or different from each other. For example, when three nonmetallic atoms are present, each of the nonmetallic atoms may be different from one another such that three types of nonmetallic atoms may be present in the compound; two of three nonmetallic atoms may be the same and the remaining one may be different such that two types of nonmetallic atoms may be present in the compound; and three nonmetallic atoms may be the same such that one type of nonmetallic atoms may be present in the compound.

In addition, in the catalyst nonmetallic compound, two organic groups which are bound to one nonmetallic atom may be linked to each other to form a ring structure.

Further, for example, when two or more nonmetallic atoms are present, each of the two or more nonmetallic atoms may form a ring structure. In addition, two nonmetallic atoms and two organic groups may be linked to form one ring structure. In addition, two nonmetallic atoms may be directly bound to form a chain structure consisting of the nonmetallic atoms. Preferably, two nonmetallic atoms are linked via two organic groups to form one ring. For example, when three or more nonmetallic atoms are present, each of the three or more nonmetallic atoms may form a ring structure. In addition, three nonmetallic atoms and three organic groups may be linked to form one ring structure. In addition, three nonmetallic atoms may be directly bound to form a chain structure consisting of the nonmetallic atoms.

Specific examples of preferable compounds are, for example, compounds having a structure represented by a general formula: $R^1R^2R^3R^4A^+X^-$ as the basic skeleton, wherein A is a nonmetallic atom, and in a preferable embodiment, A is nitrogen, phosphorus, sulfur, or iodine. $R^1$ to $R^4$ are organic groups bound to the nonmetallic atom, preferably, hydrocarbon groups or substituted hydrocarbon groups, and in a preferable embodiment, alkyl, aryl, and the like. When $R^1$ to $R^4$ are lower alkyl or phenyl, it is preferable because, generally, the compounds are inexpensive. Two of $R^1$ to $R^4$ may be linked to each other to form a ring structure.

It should be noted that depending on the valence of a nonmetallic atom, $R^4$ may not be present or $R^3$ and $R^4$ may not be present. That is, in some cases, it is represented by a general formula: $R^1R^2R^3A^+X^-$ or a general formula: $R^1R^2A^+X^-$.

In addition, two or more nonmetallic atoms may be present in a catalyst compound. When two or more nonmetallic atoms are present, it is possible that only one of them becomes a cation to bind to a halide ion, or it is possible that two or more nonmetallic atoms are bound to a halide ion.

When two nonmetallic atoms are present in a catalyst compound, for example, it can have a structure represented by a general formula: $(R^1R^2R^3R^4A^1)(R^5R^6R^7R^8A^2)(X^-)_n$ as a basic skeleton. In this regard, $R^1$ to $R^4$ are organic groups bound to a nonmetallic atom $A^1$, $R^5$ to $R^8$ are organic groups bound to a nonmetallic atom $A^2$, n is the number corresponding to the overall ionic valence of $A^1$ and $A^2$. Depending on the valence of a nonmetallic atom, $R^4$ or $R^8$ may not be present, or $R^3$ and $R^4$ or $R^7$ and $R^8$ may not be present. It is preferable that some of $R^1$ to $R^4$ and some of $R^5$ to $R^8$ are bound and linked. A ring structure containing two nonmetallic atoms may be formed by linking $R^1$ and $R^5$ and linking $R^2$ and $R^6$. It should be noted that the above-described $R^1$ to $R^8$ are selected independently from $R^2$ to $R^4$ in a general formula (II) described below.

In addition, when a nonmetallic atom and an organic group form a ring structure, it is preferable that the formed ring structure is an aromatic heterocycle. In this regard, in the aromatic heterocycle, it is possible that only one nonmetallic atom is present, and it is possible that two nonmetallic atoms are present, and it is possible that three or more nonmetallic atoms are present. The number of atoms constituting the aromatic heterocycle is not particularly limited. For example, 3-membered ring to 15-membered ring and the like can be used. 4-membered ring to 12-membered ring are preferable, 4-membered ring to 8-membered ring are more preferable, and 5-membered ring and 6-membered ring are particularly preferable.

In addition, in one embodiment, an atom binding to a nonmetallic atom in the catalyst compound may have a double bond or triple bond. That is, a double bond or triple bond may be present between an atom covalently binding to a nonmetallic atom (hereinafter, for convenience, referred to as "the primary atom") and the nonmetallic atom, or a double bond or triple bond may be present between the primary atom and an atom other than the nonmetallic atom adjacent to the primary atom (hereinafter, for convenience, referred to as "the secondary atom").

In addition, in one embodiment, it is preferable that a skeleton formed of a nonmetallic atom A and organic groups $R^1$ and $R^2$ in which the two organic groups $R^1$ and $R^2$ are bound to the nonmetallic atom A has a structure where single bonds and double bonds are alternately present, i.e., a conjugated structure, in the skeleton, and the nonmetallic atom A is a part of the conjugated structure.

In addition, when two or more nonmetallic atoms are directly bound to form a linear chain skeleton, a bond between two of the nonmetallic atoms may be a single bond, double bond, or triple bond. A double bond is preferable. Further, when two nonmetallic atoms form a double bond, it is preferable that an organic group is bound to one of the two nonmetallic atoms, and the organic group and the two nonmetallic atoms have a conjugated structure. For example, when two nonmetallic atoms A and B are present, it is preferable that A, B, and two carbon atoms $C^1$ and $C^2$ in an organic group form a structure: $A=B-C^1=C^2-$.

The number of carbon atoms of a nonmetallic compound of the catalyst, as a whole compound, is preferably 3 or more, more preferably 6 or more and further preferably 8 or more. In addition, it is preferably 100 or less, and more preferably 20 or less.

The molecular weight of a nonmetallic compound of the catalyst is preferably 50 or more, more preferably 100 or more, further preferably 200 or more. In addition, it is preferably 1000 or less, more preferably 800 or less, further preferably 600 or less, much preferably 500 or less, and particularly preferably 400 or less.

In the present invention, the catalyst can be used in combination with an organic halide having a carbon-halogen bond, which is used as a low molecular weight dormant species. The catalyst abstracts the halogen from this organic halide at the time of the living radical polymerization, and generates a radical. Therefore, according to the present invention, the catalyst detaches a group of the compound used as a dormant species, which suppresses a growing reaction, and converts the compound into an active species, thereby controlling the growing reaction. It should be noted that the dormant species is not limited to organic halides.

It is noted that Patent Document 2 describes in its claim 1 that a combination of a hydrido rhenium complex and a halogenated hydrocarbon is a catalyst for radical living polymerization. However, since the halogenated hydrocarbon described in Patent Document 2 is not a catalyst for living radical polymerization but corresponds to a dormant species, the halogenated hydrocarbon described in Patent Document 2 is distinguished from catalysts.

The nonmetallic compound which is a catalyst has at least one nonmetallic atom. In one preferred embodiment, the nonmetallic compound has one nonmetallic atom. However, a nonmetallic compound may have two or more nonmetallic atoms.

Many organic compounds do not have electroconductivity. Thus, for example, when a polymer is used for an application where it is not desirable that a conductive material remains in the polymer (for example, electronic material such as materials for resistor, organic electroluminescence material, or battery), it is preferable to use an organic compound as a catalyst.

Further, many organic compounds are generally also advantageous in terms of toxicity to the human body and influence to the environment. Therefore, even if a polymer is used in an application where some conductive materials are permitted to remain, it is much more advantageous to use a catalyst consisting of an organic compound than a transition metal complex catalyst or the like, which is used in prior art.

Furthermore, the catalyst of the present invention has the characteristic that a small amount of the catalyst can exert its catalytic action. Therefore, as described above, it was made possible that material having little toxicity to the human body and little influence to the environment is used in a small amount. The catalyst of the present invention is much superior to a conventional catalyst.

(Groups in the Catalyst)

If necessary, the catalyst compound may have various groups. For example, it is possible that an arbitrary organic group or inorganic group is bound to a nonmetallic atom. For example, various substituents explained in the above section of General terms can be used.

Such a group may be an organic group or an inorganic group. An organic group includes an aryl group, heteroaryl group, substituted aryl group, substituted heteroaryl group, alkyl group, alkenyl group (e.g., vinyl group), alkynyl group, alkoxy group (such as methoxy group, ethoxy group, propoxy group, butoxy group, and the like), substituted amino group (dimethylamino group, diethylamino group, diphenylamino group, and the like), ester group (aliphatic carboxylic acid ester and the like), alkylcarbonyl group (methylcarbonyl group and the like), haloalkyl group (trifluoromethyl group and the like) and the like. In one preferred embodiment, an organic group is an aryl, heteroaryl group, substituted aryl group, substituted heteroaryl group, alkenyl group (e.g., vinyl group), or alkynyl group.

Further, the inorganic group includes a hydroxyl group, amino group, cyano group, and the like. The amino group may be substituted if necessary. It is noted that although an amino group is an inorganic group, when the amino group is substituted with an organic group, such a substituted amino group is classified into an organic group for convenience in the present specification.

Regarding the organic group, it is also possible to use a nonmetallic compound having an organic group comprising a conjugated system, such as aryl, heteroaryl, substituted aryl, or substituted heteroaryl. Alternatively, it is also possible to form a catalyst compound having a conjugated system by using organic groups having an unsaturated bond (such as alkenyl group, alkynyl group, or the like) in combination. However, a catalyst compound having an organic group of non-conjugated system (e.g., alkyl group) has a tendency to have higher radical activity, and it is therefore more preferable.

In a substituted aryl or substituted heteroaryl group, substituents bound to the aryl or the heteroaryl group include, for example, an alkyl group, alkyloxy group, cyano group, amino group, and the like. The alkyl group is preferably a lower alkyl group, more preferably, a $C_1$ to $C_5$ alkyl group. The alkyl is further preferably a $C_1$ to $C_3$ alkyl group, and particularly preferably a methyl group. The alkyl group in the alkyloxy group is preferably a lower alkyl group, more preferably a $C_1$ to $C_5$ alkyl group, further preferably a $C_1$ to $C_3$ alkyl group, and particularly preferably a methyl group. Thus, in one embodiment, an organic group bound to a nonmetallic atom is a phenyl group, lower alkyl phenyl group, or lower alkyloxy phenyl group.

There is no particular limitation for the number of the aforementioned organic groups. However, it is preferable that one to four organic groups are bound to one nonmetallic atom, and it is more preferable that two to four organic groups are bound to one nonmetallic atom.

There is no particular limitation for the number of the aforementioned inorganic groups. However, the number of the aforementioned inorganic groups is preferably 3 or less, and more preferably 1.

It is noted that there is no particular limitation for the number of the substituents in the substituted aryl or substituted heteroaryl group. However, the number of the substituents in the substituted aryl or substituted heteroaryl group is preferably 1 to 3, more preferably 1 to 2, and further preferably 1.

Regarding the position of the substituent in the substituted aryl or substituted heteroaryl, an arbitrary position may be selected. When the aryl group is a phenyl group (that is, when the substituted aryl group is a substituted phenyl group), the position of the substituent may be ortho, meta, or para with respect to a nonmetallic atom. Preferably, the position is at para.

(Specific Examples of the Catalyst Compounds)

Preferred specific examples of the catalyst compounds include, for example, compounds having nitrogen as a nonmetallic atom, such as various imidazole salt compounds (e.g., 1-methyl-3-methyl-imidazolium iodide (EMIZI), 1-ethyl-3-methylimidazolium bromide (EMIZBr)), various pyridine salt compounds (e.g., 2-chloro-1-methylpyridinium iodide (CMPI)), various quaternary amine salt compounds (e.g., tetrabutylammonium iodide (BNI), tetrabutylammonium triiodide ($BNI_3$), tetrabutylammonium bromodiiodide ($BNBrI_2$)), compounds containing two types of nonmetallic elements (e.g., hexaphenyldiphosphazenium chloride (PPNCl)), and derivatives thereof, which can be used.

It should be noted that it is believed that in imidazole salt compounds such as EMIZI, EMIZBr, and the like, since an imidazole ring has a resonance structure, a bond is formed between both of the two nitrogen atoms and the halide ion, and a moiety functioning as the central element is formed.

Compounds having phosphorus as a nonmetallic element include various phosphonium salt compounds (e.g., methyl-tributylphosphonium iodide (BMPI), tetraphenylphosphonium iodide (PPI), and derivatives thereof, and the like.

Compounds having sulfur as a nonmetallic element include tributylsulfonium iodide (BSI), and derivatives thereof, and the like.

Compounds having iodine as a nonmetallic element include diphenyliodonium iodide (PII), and the like.

Such nonmetallic compounds capable of acting as a catalyst can be readily confirmed by performing an experiment of a radical reaction. Specifically, when a nonmetallic compound and a representative dormant species (e.g., CP-I or PE-I (the chemical formulas are described below (formula IA) and (formula IB)) are combined and an experiment of living radical polymerization reaction is performed without using a radical initiator, if narrow molecular weight distribution is obtained, it is confirmed that the nonmetallic compound acted as a catalyst.

In one embodiment, a catalyst compound does not have a radical-reactive double bond.

(Manufacturing Method of the Catalyst)

Regarding compounds used as the catalyst of the present invention, many of them are known compounds, and those compounds commercially available from reagent sales companies and the like are usable as it is, or they can be synthesized using known methods. Compounds existing in natural products can be obtained using a method of extracting them from the natural products or the like.

For example, when a compound in which a hydrocarbon group (e.g., alkyl, alkoxy, aryl, heteroaryl, substituted aryl, or substituted heteroaryl) is bound to a nitrogen cation is used as a catalyst, a commercially available compound is usable as such a compound, including those compounds having an aromatic heterocycle structure containing a nitrogen cation in the aromatic ring. For example, compounds such as various imidazole salts, pyridine salts, and the like are commercially available. Alternatively, such a compound can be synthesized using a known method.

For example, when a compound in which a hydrocarbon group (e.g., alkyl, alkoxy, aryl, heteroaryl, substituted aryl, or substituted heteroaryl) is bound to a phosphorus cation is used as a catalyst, a commercially available compound is usable as such a compound. Alternatively, such a compound can be synthesized using a known method.

For example, when an organic compound having an iodine cation is used as a catalyst, a commercially available compound is usable as such a compound. Alternatively, such a compound can be synthesized using a known method.

For example, when an organic compound having a sulfur cation is used as a catalyst, a commercially available compound is usable as such a compound. Alternatively, such a compound can be synthesized using a known method.

(Amount of the Catalyst Used)

The catalyst of the present invention has very high activity and can catalyze a living radical polymerization in a small amount.

In the method of the present invention, a compound used as a catalyst may be in some cases a liquid compound that can be used as a solvent in theory. However, under the circumstance that such a compound is used as a catalyst, there is no need to use the compound in such a large amount so as to achieve an effect as a solvent. Therefore, the amount of a catalyst used can be limited to an amount smaller than the so-called "solvent amount" (that is, an amount needed to achieve an effect as a solvent). According to the method of the present invention, a catalyst may be used in an amount that is sufficient to catalyze a living radical polymerization, as described above, and there is no need to add more than that.

Specifically, for example, in a preferred embodiment, it is possible that the catalyst in an amount of 80 millimoles (mM) or less, or 40 millimoles or less is used to one liter of a reaction solution, and it is also possible that the catalyst in an amount of 10 millimoles or less is used to one liter of a reaction solution. In a further preferred embodiment, it is possible that the catalyst in an amount of 5 millimoles or less is used to one liter of a reaction solution. It is also possible that the catalyst in an amount of 2 millimoles or less is used to one liter of a reaction solution. Further, it is possible that the catalyst in an amount of 1 millimole or less is used to one liter of a reaction solution. It is also possible that the catalyst in an amount of 0.5 millimoles or less is used to one liter of a reaction solution. Regarding the weight of the catalyst, the amount of the used catalyst can be 8% by weight or less, 4% by weight or less, or 1% by weight or less in a reaction solution. In a preferred embodiment, it is possible to limit the amount to 0.75% by weight or less, and it is also possible to limit the amount to 0.70% by weight or less. In a more preferred embodiment, it is possible to limit the amount to 0.5% by weight or less, and is also possible to limit the amount to 0.2% by weight or less. It is further possible to limit the amount to 0.1% by weight or less, and is possible to limit the amount to 0.05% by weight or less. For example, in the case of a phosphorus catalyst, the amount can be limited to 0.75% by weight or less, and can be also limited to 0.70% by weight or less. In an even more preferred embodiment, the amount can be limited to 0.5% by weight or less, can be limited to 0.2% by weight or less, can be further limited to 0.1% by weight or less, and can be also limited to 0.05% by weight or less. In other words, the amount can be limited to a "remarkably" smaller amount than an amount needed to achieve the effect as a solvent.

Further, the amount of the catalyst used is preferably 0.02 millimoles or more to one liter of a reaction solution. More preferably, the amount is 0.1 millimoles or more to one liter of a reaction solution. Further preferably, the amount is 0.5 millimoles or more to one liter of a reaction solution. Regarding the weight of the catalyst, preferably, an amount of the catalyst used is 0.001% by weight or more in a reaction solution. More preferably, the amount is 0.005% by weight or more in a reaction solution. Further preferably, the amount is 0.02% by weight or more in a reaction solution. If the amount of the catalyst used is too small, then the molecular weight distribution is likely to be broad.

It should be noted that when it is desired to increase a polymerization rate, it is preferable that the concentration of a catalyst is relatively high. When the amount of a catalyst is relatively high, it is possible to narrow molecular weight distribution and increase the polymerization rate. That is, when the amount of a catalyst is high, the amount of a radical increases, and polymerization rate increases. Further, when the amount of a catalyst is high, it is possible to increase the frequency of the activation-deactivation cycle shown in Scheme 1 described below, and narrow molecular weight distribution.

According to one embodiment, in the method of living radical polymerization of the present invention, it is possible to carry out the living radical polymerization satisfactorily, even without using a catalyst for living radical polymerization or a catalyst precursor compound other than the catalyst consisting of a nonmetallic compound having an ionic bond with a halide ion (hereinafter referred to as "other type catalyst or other type catalyst precursor compound") in combination. However, if necessary, it is also possible to use an other-type catalyst or an other-type catalyst precursor compound in combination. In that case, it is preferable to use a larger amount of a nonmetallic compound having an ionic bond with a halide ion, and to use a smaller amount of the other-type catalyst or the other-type catalyst precursor compound, in order to make the best possible use of the advantages of the nonmetallic compound having an ionic bond with a halide ion. Under such circumstances, the amount of the other-type catalyst or the other-type catalyst precursor compound used can be limited to 100 parts by weight or less per 100 parts by weight of a nonmetallic compound having an ionic bond with a halide ion. The amount can be limited to 50 parts by weight or less, can be limited to 20 parts by weight or less, 10 parts by weight or less, 5 parts by weight or less, 2 parts by weight or less, 1 part by weight or less, 0.5 parts by weight or less, 0.2 parts by weight or less, or 0.1 parts by weight or less relative to 100 parts by weight of a nonmetallic compound having an ionic bond with a halide ion. That is, a living radical reaction can be carried out in a reaction solution that does not substantially contain a catalyst other than a nonmetallic compound having an ionic bond with a halide ion.

(Protecting Group)

The method of the present invention uses a protecting group for protecting a growing chain during the living radical polymerization reaction. Regarding the protecting group, various known protecting groups, which are conventionally used as protecting groups in a living radical polymerization, can be used. In this regard, it is preferable to use halogen as a protecting group. As described above regarding prior art, when a special protecting group is used, there are disadvantages such as the disadvantage in that the protecting group is very expensive.

(Organic Halide(Low Molecular Weight Dormant Species))

According to the method of the present invention, preferably, an organic halide, which has a carbon-halogen bond, is added to the reaction material. Halogen, which is provided to the growing chain by the organic halide, is used as a protecting group. Such organic halides are relatively inexpensive. Therefore, it is more advantageous than other known compounds which are used as protecting groups in a living radical polymerization. Further, if necessary, low molecular weight dormant species in which a halogen is bound to an element other than carbon can be used.

An organic halide used as a dormant species is a compound having at least one carbon-halogen bond in the molecule which acts as a dormant species. There is no other particular limitation. However, generally, the organic halides preferably have one or two halogen atoms in the molecule.

Here, with regard to an organic halide used as a dormant species, it is preferable that when a carbon radical is generated by elimination of a halogen, the carbon radical is unstable. Thus, regarding an organic halide to be used as a dormant species, the organic halide, in which a carbon atom that would become a carbon radical is bound to two or more substituents that stabilize the carbon radical when the carbon radical is generated by elimination of a halogen, is not suitable. However, in many cases, the organic halide, in which a carbon atom that would become a carbon radical is bound to one substituent that stabilizes the carbon radical, exhibits appropriate radical stability, and can be used as dormant species.

The number of hydrogen atoms carried by the carbon to which the halogen atom of the organic halide used as a dormant species is bound (hereinafter referred to as "the 1-position carbon of the organic halide" for convenience), is preferably two or less, and more preferably one or less, and it is even more preferable that the carbon does not have any hydrogen atom. Further, the number of halogen atoms bound to the 1-position carbon of the organic halide is preferably three or less, more preferably two or less, and even more preferably one. Particularly, when the halogen atom bound to the 1-position carbon of the organic halide is chlorine atom, the number of the chlorine atoms is very preferably three or less, more preferably two or less, and particularly preferably one.

It is preferable that one or more carbon atoms are bound to the 1-position carbon of the organic halide used as a dormant species, and it is particularly preferable that two or three carbon atoms are bound thereto.

A halogen atom of an organic halide used as a dormant species is preferably chlorine, bromine, or iodine, and more preferably bromine or iodine. From the viewpoint of making molecular weight distribution narrow, most preferred is iodine. In one embodiment, bromine is also preferably usable. Regarding a bromine compound, generally, it is mentioned as advantages that since it is more stable than an iodine compound, it is easy to store lower molecular weight dormant species, and that there is relatively low necessity to remove terminal halogens from a produced polymer. Moreover, regarding a compound having a plurality of bromine, many of them are commercially available or can be easily synthesized, and various branched polymers including star-type, comb-type, and surface-grafted-type polymers and the like can be easily synthesized. There is also an advantage that a block copolymer can be easily synthesized from a compound having bromine on its terminal.

Further, when a catalyst compound having a halogen atom is used, the halogen atom in the organic halide used as a dormant species may be the same as the halogen atom in the catalyst. The halogen atom in the organic halide used as a dormant species may be different from the halogen atom in the catalyst, since even if the halogen atom in the organic halide and the halogen atom in the catalyst are different, it is possible that the halogen atom in the organic halide and the halogen atom in the catalyst are exchanged. However, if the halogen atom in the organic halide used as a dormant species and the halogen atom in the catalyst are the same, it is easier to exchange the halogen atoms between the organic halide used as a dormant species and the compound of the catalyst. Therefore, preferably, the halogen atom in the organic halide and the halogen atom in the catalyst are the same.

In one embodiment, the organic halide used as a dormant species has the following general formula (II):

$$CR^2R^3R^4X^3 \qquad (II)$$

wherein $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen, or alkyl. Preferably, $R^3$ is hydrogen or lower alkyl. More preferably, $R^3$ is hydrogen or methyl.

$R^4$ is halogen, hydrogen, alkyl, aryl, heteroaryl, alkylcarboxyl, or cyano. Preferably, $R^4$ is aryl, heteroaryl, alkylcarboxyl, or cyano. When $R^4$ is halogen, hydrogen, or alkyl, $R^4$ may be the same as $R^2$ or $R^3$, or may be different from $R^2$ or $R^3$.

$X^3$ is halogen. Preferably, $X^3$ is chlorine, bromine, or iodine. More preferably, $X^3$ is bromine, or iodine. Most preferably, $X^3$ is iodine. When there is halogen in $R^2$ to $R^4$, $X^3$ may be the same as the halogen in $R^2$ to $R^4$ or may be different from the halogen in $R^2$ to $R^4$. In one embodiment, $X^3$ may be the same halogen as that contained in the compound of the catalyst. $X^3$ may be different from the halogen contained in the catalyst compound.

The aforementioned $R^2$ to $R^4$ and $X^3$ are selected independently from one another. However, preferably, there is no halogen atom or one halogen atom in $R^2$ to $R^4$ (that is, the organic halide contains one or two halogen atoms in the compound).

In one preferable embodiment, the organic halide used as a low molecular weight dormant species is an alkyl halide or substituted alkyl halide. More preferably, the organic halide used as a low molecular weight dormant species is a substituted alkyl halide. In this regard, preferably, the alkyl is a secondary alkyl. More preferably, the alkyl is a tertiary alkyl.

In the alkyl halide or substituted alkyl halide used as a low molecular weight dormant species, the number of carbon atoms in the alkyl is preferably 2 or 3. Therefore, further preferably, the organic halide used as a low molecular weight dormant species is a substituted ethyl halide or substituted isopropyl halide. The substituent in the substituted alkyl halide used as a low molecular weight dormant species includes, for example, phenyl, cyano, and the like.

Preferable specific examples of the organic halide used as a low molecular weight dormant species include, for example, $CH(CH_3)(Ph)I$ and $C(CH_3)_2(CN)I$, as shown in the following chemical formulas:

(Structural Formulas of Representative Low Molecular Weight Dormant Species)

[Formula 16]

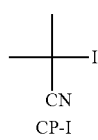

CP-I (Formula 1A)

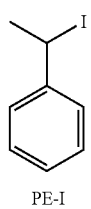

PE-I (Formula 1B)

Other specific examples of the organic halide used as dormant species include, for example, methyl chloride, methylene chloride, chloroform, chloroethane, dichloroethane, trichloroethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, diiodopropane, chloroiodopropane, iododibromoethane, bromoiodopropane, 2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl 2-iodo-isobutylate, 2-iodo-2-methylpropanamide, 2-iodo-2,4-dimethylpentane, 2-iodo-2-cyanobutanol, 4-methylpentane, cyano-4-methylpentane, 2-iodo-2-methyl-N-(2-hydroxyethyl)propionamide 4-methylpentane, 2-iodo-2-methyl-N-(1,1-bis(hydroxymethyl)-2-hydroxyethyl)propionamide 4-methylpentane, 2-iodo-2-(2-imidazolin-2-yl)propane, 2-iodo-2-(2-(5-methyl-2-imidazolin-2-yl)propane, and the like. One of these halide compounds may be used alone, or a combination of two or more of the halide compounds may be used.

According to the method of the present invention, since the organic halide used as a dormant species is not to be used as a solvent, it is not necessary to use the organic halide in such a large amount so as to provide an effect as a solvent. Thus, the amount of the organic halide used as a dormant species can be limited to an amount smaller than the so-called "solvent amount" (that is, an amount needed to achieve the effect as a solvent). In the method of the present invention, since the organic halide used as a dormant species is used to provide a halogen as a protecting group to a growing chain as described above, it is sufficient so long as a sufficient amount of halogen can be provided to the growing chains in the reaction system. Specifically, for example, in the method of the present invention, the amount of the organic halide used as a dormant species is preferably 0.05 moles or more relative to 1 mole of a nonmetallic compound as a catalyst in the polymerization reaction system. More preferably, the amount is 0.5 moles or more relative to 1 mole of a nonmetallic compound as a catalyst in the polymerization reaction system. Further preferably, the amount is 1 mole or more relative to 1 mole of a nonmetallic compound as a catalyst in the polymerization reaction system. Further, preferably, the amount is 100 moles or less relative to 1 mole of a nonmetallic compound as a catalyst in the polymerization system. More preferably, the amount is 30 moles or less relative to 1 mole of a nonmetallic compound as a catalyst in the polymerization reaction system. Further preferably, the amount is 5 moles or less relative to 1 mole of a nonmetallic compound as a catalyst in the polymerization reaction system. Additionally, the amount is preferably 0.0001 moles or more relative to 1 mole of the vinyl-type monomer. More preferably, the amount is 0.0005 moles or more relative to 1 mole of the vinyl-type monomer. Further, the amount is preferably 0.5 moles or less relative to 1 mole of the vinyl-type monomer. More preferably, the amount is 0.4 moles or less relative to 1 mole of the vinyl-type monomer. Further preferably, the amount is 0.3 moles or less relative to 1 mole of the vinyl-type monomer. Particularly preferably, the amount is 0.2 moles or less relative to 1 mole of the vinyl-type monomer. Most preferably, the amount is 0.1 moles or less relative to 1 mole of the vinyl-type monomer. Further, if necessary, the amount can be 0.07 moles or less, 0.05 moles or less, 0.03 moles or less, 0.02 moles or less, 0.01 moles or less, 0.005 moles or less, or 0.001 moles or less relative to 1 mole of the vinyl-type monomer.

Most of the aforementioned organic halides used as dormant species are known compounds. Reagents and the like, which are sold from reagent sellers or the like, can directly be used. Alternatively, the compounds may be synthesized using conventionally known synthesizing methods.

In regard to an organic halide used as a dormant species, it is also possible that raw materials thereof are introduced so as to generate the organic halide in situ, i.e., in the reaction solution, during the polymerization, such that the product can be used as the organic halide for this polymerization method. For example, an azo-type radical initiator (e.g., azobis(isobutyronitrile)) and a molecule as a simple substance of halogen (e.g., iodine ($I_2$)) can be introduced as raw materials, the reaction of the two can generates an organic halide (e.g., CP-I (the chemical formula is as described above), which is an alkyl iodide) in situ during the polymerization, and this product can be used as a dormant species for this polymerization method.

As for the organic halide used as a dormant species, it is also possible to use a compound that is immobilized at a surface such as an inorganic or organic solid surface, or an inorganic or organic molecular surface. For example, an organic halide immobilized on a silicon substrate surface, a polymer film surface, an inorganic or organic microparticle surface, a pigment surface, or the like, can be used. The immobilization can be achieved utilizing, for example, chemical binding, physical binding or the like.

In addition, a compound having a plurality of halogenated alkyl moieties can be also used as a dormant species. From a compound having two halogenated alkyl moieties, for example, two types of monomers, monomer A and monomer B, can be block-copolymerized to synthesize a BAB-type triblock copolymer. Moreover, a compound having a structure in which a halogen is bound to alkyl in an organic compound can be preferably used as a compound having a plurality of halogenated alkyl moieties. However, as necessary, a compound having a structure in which a plurality of halogenated alkyl moieties are bound to an inorganic compound may be used. The compound having a plurality of halogenated alkyl moieties may be a compound having a low molecular weight or may be a compound having a high molecular weight. That is, a polymer or supramolecular compound may be also used. Further, as a compound having a plurality of halogenated alkyl moieties, a compound that does not dissolve in a reaction solution can be used, keeping it a solid, to grow a polymer chain from a surface of the solid. As described above, compounds having various structures can be used as compounds having a plurality of halogenated alkyl moieties. In addition, compounds having various structures can be used to synthesize various branched polymers including star-type, comb-type, and surface-grafted-type polymers and the like.

In addition, a polymer compound having a halogenated alkyl moiety at a terminal may be used to synthesize a block copolymer. According to this method, for example, a block copolymer of a polymer synthesized by a method other than living radical polymerization and a polymer synthesized by living radical polymerization may be also synthesized.

(Monomer)

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which is conventionally known as a monomer for performing a living radical polymerization.

More specifically, the so-called vinyl monomers can be used. Vinyl monomer is a general name for monomers which are represented by the general formula "$CH_2=CR^5R^6$."

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, glycidyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethyleneglycol methacrylate, polyethylene glycol methacrylate, 2-(dimethylamino)ethyl methacrylate, and the like. Further, methacrylic acid can be used. In addition, it is possible to use ion liquid type methacrylates such as 2-(N,N-diethyl-N-methylamino)ethyl methacrylate$^+$/trifluorosulfonyliminium($N(CF_3SO_2)_2^-$) salt, 2-(N-ethyl-N-methyl-N-hydrogenated amino)ethyl methacrylate$^+$/trifluorosulfonyliminium($N(CF_3SO_2)_2^-$) salt, 1-ethyl-3-methylimidazolium methacrylate$^+$/fluorohydrogenation($(FH)_nF^-$) salt, N-ethyl-N-methylpyrrolidinium methacrylate$^+$/fluorohydrogenation($(FH)_nF^-$) salt, and the like.

The aforementioned vinyl monomers having the aforementioned general formula in which $R^5$ is hydrogen and $R^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonyl acrylate, benzyl acrylate, glycidyl acrylate, cyclohexyl acrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethylene glycol acrylate, 2-(dimethylamino) ethyl acrylate, and the like. Further, an acrylic acid can be used. In addition, it is possible to use ion liquid type acrylates such as 2-(N,N-diethyl-N-methylamino)ethyl acrylate$^+$/trifluorosulfonyliminium($N(CF_3SO_2)_2$) salt, 2-(N-ethyl-N-methyl-N-hydrogenated amino)ethyl acrylate$^+$/trifluorosulfonyliminium($N(CF_3 SO_2)_2^-$) salt, 1-ethyl-3-methylimidazolium acrylate$^+$/fluorohydrogenation($(FH)_nF^-$) salt, N-ethyl-N-methylpyrrolidinium acrylate$^+$/fluorohydrogenation($(FH)_nF^-$) salt.

Generally, it is difficult to control living radical polymerization of acrylates. However, according to the present invention, it is possible to control it. In particular, when a nitrogen type or phosphorus type catalyst is used, polymerization of acrylates can be preferably controlled.

A monomer having the aforementioned general formula of a vinyl monomer, in which $R^5$ is hydrogen and $R^6$ is phenyl, is styrene, can be suitably used in the present invention. A monomer, in which $R^6$ is phenyl or a phenyl derivative, is referred to as a styrene derivative, and can be suitably used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and the like. Further, a monomer in which $R^6$ is aromatic, (for example, vinylnaphthalene) can be used.

A monomer having the aforementioned general formula of a vinyl monomer, in which $R^5$ is hydrogen and $R^6$ is alkyl, is alkylene, and can be suitably used in the present invention.

In the present invention, monomers having two or more vinyl groups can be also used. Specifically, for example, a diene-type compound (e.g., butadiene, isoprene, and the like), a compound having two allyl groups (for example, diallyl phthalate and the like), a dimethacrylate having two methacryl groups (e.g., ethylene glycol dimethacrylate), a diacrylate having two acryl groups (e.g., ethylene glycol diacrylate), and the like, can be used.

Vinyl monomers other than those described above can also be used in the present invention. Specifically, for example, vinyl esters (for example, vinyl acetate, vinyl propionate, vinyl benzoate, vinyl acetate), styrene derivatives other than the aforementioned styrene derivatives (for example, α-methylstyrene), vinyl ketones (for example, vinyl methyl ketone, vinyl hexyl ketone, methyl isopropenyl ketone), N-vinyl compounds (for example, N-vinyl pyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these monomers may be used alone, or a combination of two or more of the monomers may be used.

There is no particular limitation to the combinations of the aforementioned monomer and the catalyst of the present invention. A catalyst of the present invention, which is arbitrarily selected, may be used for a monomer, which is arbitrarily selected.

(Radical Reaction Initiator)

When the catalyst of the present invention is used, even if such a radical reaction initiator is not used, a polymerization reaction is successfully performed. However, in the living radical polymerization method of the present invention, as the occasion demands, a small amount of a radical reaction initiator may be used. Initiators, which are known as initiators to be used for a radical reaction, can be used as the radical reaction initiator. For example, azo-type radical reaction initiators and peroxide-type radical initiators can be used. Specific examples of azo-type radical reaction initiators include, for example, azobis(isobutyronitrile) (AIBN), azobis(2,4-dimethylvaleronitrile) (V65), 2,2'-azobis(4-methoxy-2,4-dimethylvaleronitrile) (V70). Specific examples of peroxide-type radical reaction initiators include, for example, benzoylperoxide, dicumyl peroxide, t-butyl peroxybenzoate (BPB), di(4-tert-butylcyclohexyl)peroxydicarbonate (PERKADOX16), and potassium peroxodisulfate.

When it is not necessary to use a radical initiator, in order to maximize the effect of avoiding adverse effects due to a radical initiator, it is preferable that a radical initiator is not substantially used, and it is most preferable that the amount of use is zero. In this regard, "not substantially used" means that the amount of a radical initiator is small so that effects due to a radical initiator on a polymerization reaction do not substantially occur. Specifically, for example, the amount of the radical initiator is preferably 10 millimoles or less to 1 mole of the catalyst of the present invention, and more preferably 1 millimole or less to 1 mole of the catalyst of the present invention. Further preferably, the amount is 0.1 millimoles or less to 1 mole of the catalyst of the present invention.

On the other hand, in the present invention, a radical initiator may be used as necessary. When a radical initiator is used, the amount of radical in a reaction solution can be increased to increase polymerization rate.

When a radical initiator is used, the amount of the initiator used is not particularly limited. The amount is preferably 0.1 millimole or more to 1 liter of the reaction solution, more preferably 0.5 millimole or more to 1 liter of the reaction solution, and further preferably 1 millimole or more to 1 liter of the reaction solution. Additionally, the amount is preferably 500 millimoles or less to 1 liter of the reaction solution, more preferably 100 millimoles or less to 1 liter of the reaction solution, and further preferably 50 millimoles or less to 1 liter of the reaction solution. Particularly preferably, it is 10 millimoles or less to 1 liter of the reaction solution.

(Solvents)

When a reaction mixture of a monomer and other ingredients is liquid at the reaction temperature, it is not always necessary to use a solvent. If necessary, a solvent may be used. Solvents, which were conventionally used for a living radical polymerization, can be used in the method of the present invention. When a solvent is to be used, the amount of use is not particularly limited as long as the polymerization reaction is appropriately carried out; however, it is preferable to use a solvent in an amount of 1 part by weight or more relative to 100 parts by weight of the monomer, more preferable to use 10 parts by weight or more, and even more preferable to use 50 parts by weight or more relative to 100 parts by weight of the monomer. When the amount of use of the solvent is too small, the viscosity of the reaction solution may be excessively high. Furthermore, it is preferable to limit the amount to 2000 parts by weight or less, more preferable to limit the amount to 1000 parts by weight or less, and even more preferable to limit the amount to 500 parts by weight or less relative to 100 parts by weight of the monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

(Other Additives and the Like)

To the various aforementioned materials used for the living radical polymerization, known additives and the like may be added as necessary, in their required amounts. Examples of such additives include, for example, a polymerization suppressant and the like.

(Raw Material Composition)

By mixing the various raw materials described above, a raw material composition that is appropriate as a material for the living radical polymerization, is obtained. The obtained composition can be used in the conventionally known methods for a living radical polymerization.

A raw material composition includes the following ingredients:
(1) a catalyst; and
(2) a monomer having a radical-reactive unsaturated bond.

The raw material composition can further include, as necessary, one or more types of ingredients selected from the following:
(3) a low molecular weight dormant species (e.g., an organic halide having a carbon-halogen bond);
(4) a raw material for generating an organic halide in a reaction solution (e.g., a combination of a halogen molecule and an azo-type radical initiator);
(5) solvent; and
(6) a radical initiator.

The raw material composition may include all of the above-described ingredients (1) to (6). However, ingredients (3) to (6) are not essential. However, at the time of a reaction, it is necessary that a low molecular weight dormant species is present in addition to a catalyst and a monomer. Thus, it is preferable that the raw material composition includes at least one of ingredient (3) or (4). However, a low molecular weight dormant species may be generated in the reaction solution from ingredient (1) and (2) and the like without using ingredient (3) or (4). Generally, it is sufficient as long as one of the above-described ingredient (3) or ingredient (4), i.e., either one of the low molecular weight dormant species or a raw material thereof is used. Further, when a solvent is not necessary, it is possible that no solvent is used. Moreover, when a radical initiator is not necessary, it is possible that no radical initiator is used.

According to one embodiment, the raw material composition does not include any raw material other than the various raw materials mentioned above in the specification. For example, it is preferable, from the viewpoint of environmental problems and the like, that the raw material composition does not substantially include a raw material containing a transition metal.

According to a preferred embodiment, the raw material composition does not substantially include any ingredient other than the above-described ingredients (1) to (6). When a radical initiator is not necessary, a raw material composition which does not substantially including any ingredient other than the above-described ingredients (1) to (5) may be used. Further, when a solvent is not necessary, a raw material composition which does not substantially including any ingredient other than the above-described ingredients (1) to (4) and (6) may be used. Moreover, when a radical initiator and a solvent are not necessary, a raw material composition which does not substantially including any ingredient other than the above-described ingredients (1) to (4) may be used.

It is also preferable that the raw material composition does not substantially include any material irrelevant to a living radical polymerization (for example, an episulfide compound or the like). Furthermore, if it is desired to make the best possible use of the advantage of the catalyst that consists of a nonmetallic compound having an ionic bond with a halide ion, the raw material composition can be prepared as a composition that does not substantially include any catalyst or catalyst precursor for a living radical polymerization other than the catalyst which consists of a nonmetallic compound having an ionic bond with a halide ion.

According to one embodiment, the raw material composition is a composition substantially consisting of a catalyst, a monomer having a radical-reactive unsaturated bond, and one or more types of ingredients selected from the above-described ingredients (3) to (6).

(Reaction Temperature)

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less. In addition, as necessary, 90° C. or less can be selected, 85° C. or less can be selected, 80° C. or less can be selected, 70° C. or less can be selected, 60° C. or less can be selected, or 50° C. or less can be selected. When the temperature is too high, it may be difficult to obtain a very high molecular weight for the generated polymer. Further, when the temperature is too high, there is a disadvantage in that heating facilities and the like may be expensive. When the temperature is at room temperature or lower, there is a disadvantage that cooling facilities and the like may be expensive. Additionally, if a reaction mixture is prepared such that polymerization occurs at room temperature or lower, the reaction mixture is unstable at room temperature and may react. Therefore, there is the disadvantage that it is difficult to store the reaction mixture.

Therefore, the aforementioned range of the temperature, which is slightly higher than room temperature but is not too high (for example, 30° C. to 100° C.) is very preferable in terms of practical sense.

In the present invention, the reaction can be carried out at relatively low temperature. For example, the reaction can be carried out at from 30° C. to 80° C. When the reaction is carried out at such a low temperature, the reaction can be carried out while controlling removal of iodine from a terminal of a dormant species, which is a side reaction. Thus, such a reaction temperature is very advantageous for synthesizing a polymer having a high molecular weight.

(Reaction Period of Time)

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, in one embodiment, the reaction time period is 5 days or less, preferably 3 days or less, and more preferably 2 days or less, and further preferably 1 day or less.

If the reaction time period is too short, it is difficult to obtain a sufficient molecular weight (or a ratio of polymerization (conversion ratio of monomer)). If the reaction time period is too long, the efficiency of the entire process would be unsatisfactory. Advantageous results (an adequate monomer conversion and reduction of a side reaction) may be achieved by selecting a suitable reaction time period.

(Atmosphere)

The polymerization reaction in the method of the present invention may be carried out under a condition where air is present in the reaction vessel. Further, if necessary, the air may be replaced with an inert gas such as nitrogen or argon.

The method for living radical polymerization of the present invention can be applied to homopolymerization, that is, production of a homopolymer, and it is also possible to produce a copolymer using the method of the present invention in copolymerization. The copolymerization may be random copolymerization, or may also be block copolymerization.

The block copolymer may be a copolymer having two or more types of blocks linked together, or may be a copolymer having three or more types of blocks linked together.

In the case of block copolymerization using two types of blocks, for example, a block copolymer can be obtained by a method including a step of polymerizing a first block and a step of polymerizing a second block. In this case, the method of the present invention may be used in the step of polymerizing the first block, or the method of the present invention may be used in the step of polymerizing the second block. It is preferable to use the method of the present invention in both of the process of polymerizing the first block and the process of polymerizing the second block.

More specifically, for example, a block copolymer can be obtained by polymerizing the first block, and then carrying out the polymerization of the second block in the presence of the obtained first polymer. The first polymer can be supplied to the polymerization of the second block after isolation and purification, or the polymerization of blocks can also be carried out by adding the second monomer to the first polymerization in the middle of or at the completion of the polymerization of the first polymer, without isolation and purification of the first polymer.

Also in the case of producing a block copolymer having three types of blocks, the steps of polymerizing the respective blocks are carried out in the same manner as in the instance of producing a copolymer having two or more types of blocks linked together, and thereby a desired copolymer can be obtained. It is also preferable to use the method of the present invention in all of the block polymerization steps.

A compound having a plurality of halogenated alkyl moieties may be used as a dormant species. From a compound having two halogenated alkyl moieties, for example, monomer A and monomer B can be block-copolymerized to synthesize a BAB-type triblock copolymer. Moreover, from an inorganic/organic low molecule/polymer/supermolecule/solid having a plurality of halogenated alkyl moieties, various branched polymers including star-type, comb-type, and surface-grafted-type polymers and the like can be synthesized.

In addition, from a polymer compound having a halogenated alkyl moiety at a terminal thereof, a block copolymer can be synthesized. According to this, for example, it is also possible to synthesize a block copolymer of a polymer synthesized by a method other than living radical polymerization and a polymer synthesized by living radical polymerization.

(Reaction Mechanism)

Although the present invention is not particularly bound to a theory, an inferred mechanism will be explained.

The basic concept of a living radical polymerization method is a reversible activating reaction of a dormant species (polymer-X) to a growing chain radical (polymer). A method, which uses a halogen as protecting group X and uses a transition metal complex as an activating catalyst, is one of the useful living radical polymerization methods. According to the present invention, a nonmetallic compound can be used to abstract a halogen from an organic halide with high reactivity, and to produce a radical reversibly (Scheme 1).

It has been recognized that, generally, a transition metal can have electrons in various transition states and therefore, a transition metal is superior in the catalytic activity for various chemical reactions. Therefore, regarding catalysts suitable for a living radical polymerization, it is considered that a transition metal is superior. On the contrary, a typical element is considered disadvantageous for such a catalyst. That is, it was considered that a nonmetallic compound, particularly an organic compound, is disadvantageous for a catalyst.

However, unexpectedly, according to the present invention, a catalyst consisting of a nonmetallic element compound having an ionic bond with a halide ion is used, and thereby the polymerization reaction proceeds with very high efficiency. It is considered that this is because the ionic bond of the nonmetallic element with the halide ion generates a moiety functioning as the central element and a halogen-abstracting reaction from a dormant species by the compound is suitable for performing the exchange of the halogen between the catalyst and the reaction intermediate. Accordingly, it is basically considered that a nonmetallic compound having such an ionic bond with a halide ion can catalyze the living radical polymerization satisfactorily.

The following Scheme 1 shows the reaction formula in the case of using the catalyst of the present invention.

(Scheme 1)

[Formula 17]

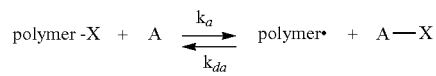

wherein A is a nonmetallic element compound having an ionic bond with a halide ion, and X is a halogen atom. The living radical polymerization is controlled by performing a reversible reaction between the left side and the right side of the reaction formula.

It is believed that a catalyst, i.e., an activating agent, abstracts a halogen from a dormant species (Polymer-X) to allow a polymerization reaction to proceed.

When the halogen is iodine, in this reaction, it is believed that a complex of a growing chain radical (Polymer •) and iodine radical anion ($I^{2-}$) is reversibly generated. It should be noted that regarding conventional transition metal complexes, the ionic valence of the central element changes during living polymerization reaction. However, unlike a transition metal catalyst, in this reaction, it is believed that the ionic valence of the cation of a nonmetallic element of the catalyst does not change.

In case of a low-active catalyst compound, generally, since the activating rate constant (the reaction from the left side to the right side in the above scheme) is not large and the frequency of the cycle does not become sufficiently high, molecular weight distribution cannot be highly controlled. In addition, in case of a low-active catalyst compound, the deactivating rate constant (the reaction from the left side to the right side) is small, and therefore, once Polymer• is generated from Polymer-X, the Polymer• is only slowly converted back to Polymer-X. Thus, during that, many monomers are added to Polymer• all at once, and the molecular weight extremely increases. That is, although the polymerization rate increases, living radical polymerization cannot be controlled. Since a molecular chain undergoes the cycle many times to grow equally little by little is an important feature to control molecular weight distribution in living radical polymerization, a highly active catalyst in the above scheme is desired. Since the catalyst of the present invention has such high activity, it is very advantageous.

For example, when an ionic compound of a phosphorus compound cation having four organic groups and an iodine ion is used as a catalyst, the reaction formula is understood as follows.

(Scheme 2)

[Formula 18]

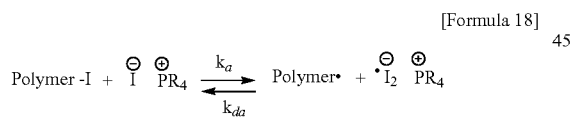

In this regard, since the $I_2$ anion radical species shown in Scheme 2 is not a stable radical, $I_2$ anion radical species react with each other to generate a stable I minus species and a $I_3$ minus species. This was experimentally confirmed by analysis of reaction mechanism.

(Scheme 3)

[Formula 18A]

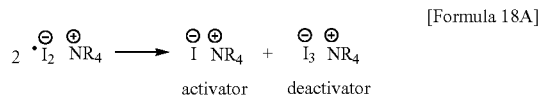

The generated I minus species acts as an activating agent for Polymer-I, the $I_3$ minus species reacts with a Polymer radical to act as an deactivating agent to convert the Polymer radical back to Polymer-I.

(Scheme 4)

[Formula 18B]

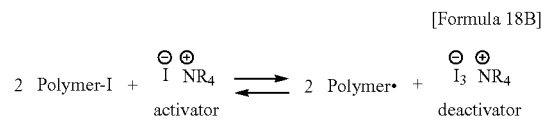

(Scheme 5)

[Formula 18C]

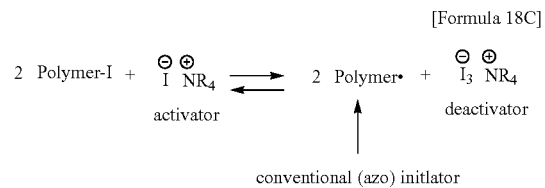

As described above, it was found that the activating agent in this system is a I minus species and the deactivating agent is a $I_3^-$ species. If this is applied, not only a method of combining Polymer-I (e.g., alkyl iodide) with a $I^-$ species as in the left side of Scheme 4, but also using Polymer-I (e.g., alkyl iodide), a $I_3^-$ species, and Polymer* (a radical source, e.g., azo compounds) in combination as in Scheme 5 is possible. A radical source has a role to regenerate a $I^-$ species from a $I_3^-$ species, and a role to continue supplying a polymer radical little by little through polymerization. In Scheme 5, if Polymer* (a radical source, e.g., azo compounds) is continuously supplied, $I^-N^+R_4$ is continuously regenerated from $I_3^-N^+R_4$.

This mechanism of the $I_3^-$ species is believed to work, for example, when a compound having three halogens (e.g., tetrabutylammonium triiodide ($BNI_3$)) is used as a catalyst.

It should be noted that for polymerization, a commercially available $I_3^-$ species can be used as a $I_3^-$ species. In addition, a $I_3^-$ species is generated by mixing $I_2$ and a $I^-$ species (Scheme 6).

(Scheme 6)

[Formula 18D]

For polymerization, a $I_3^-$ species obtained by mixing $I_2$ and a $I^-$ species and then isolating and purifying the product also can be used as a $I_3^-$ species. It is also possible that $I_2$ and $I^-$ species are used as loaded compounds to generate a $I_3^-$ species in situ during the polymerization, and the generated $I_3^-$ species is directly used.

In addition, similarly, a $BrI_2^-$ species consisting of $I_2$ and a $Br^-$ species (e.g., tetrabutylammonium bromodiiodide (BN-$BrI_2$)) can be used.

In addition, a $Br_2I^-$ species consisting of $Br_2$ and a $I^-$ species (e.g., tetrabutylammonium dibromoiodide ($BNBr_2I$)) or a $Br_a^-$ species consisting of $Br_2$ and $Br^-$ species (e.g., tetrabutylammonium tribromide ($BNBr_3$)) can be used.

(Removal of Halogen Bound to an End of Produced Polymer)

The produced polymer that is obtained by the method of the present invention has halogen (for example, iodine) at the chain end. When this polymer is to be used in products, if needed, the polymer can be used after removing the halogen at the end. It is also possible to positively utilize the halogen at the end and to convert this into a different functional group, so as to bring out a new function. The reactivity of the halogen at the end is generally high, and the removal or conversion of the halogen can be carried out by a wide variety of reactions. For example, examples of methods of treating the polymer end when the halogen is iodine, will be shown in the following scheme. The polymer end can be utilized by the reactions shown in these schemes or the like. Even when the halogen is other than iodine, the polymer end can be converted into a functional group in the same manner.

dispersants, packaging materials, pharmaceuticals, personal care products (such as hairdressing material, cosmetics, and the like), elastomers (such as material for automobiles, industrial articles, sports article, materials for coating electrical wire, materials for buildings, and the like), coating materials (such as materials for powder coating, and the like), and the like. Furthermore, it can be used for creating a new electronic material, optical material, dynamic material, crystal material, separation material, lubricant material, and medical material.

The polymer obtained by the living radical polymerization method of the present invention can also be advantageously (Scheme 3)

[Formula 19]

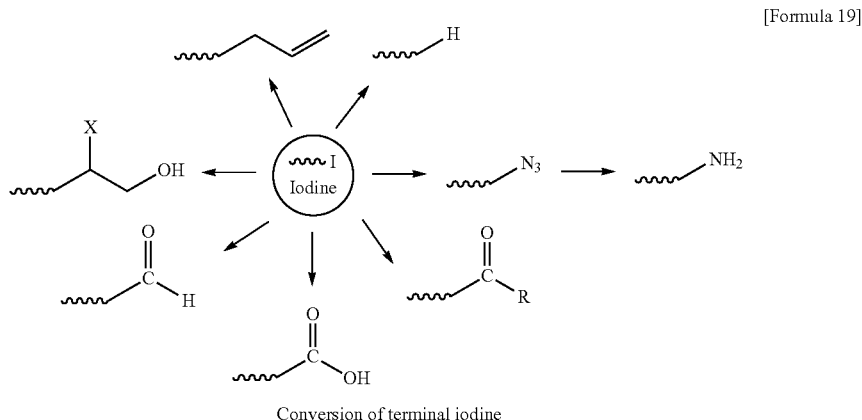

Conversion of terminal iodine
(Reference) Matyjaszewski, K., Davis, T. P., Eds.;
*Handbook of Radical Polymerization*; Wiley & Sons: New York, 2002.

Simple Removal/Conversion of Terminal Iodine

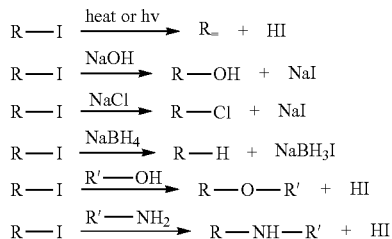

(Use of the Polymer)

According to the aforementioned living radical polymerization method of the present invention, a polymer having narrow molecular weight distribution is obtained. For example, it is possible to select a suitable formulation of reaction material, reaction conditions and the like, such that a polymer having the $M_w/M_n$ ratio, which is the ratio of the weight average molecular weight $M_w$ to the number average molecular weight $M_n$, is 1.5 or less. It is also possible to select a further suitable formulation of the reaction material and reaction conditions such that a polymer having the $M_w/M_n$ ratio of 1.4 or less, a polymer having the $M_w/M_n$ ratio of 1.3 or less, a polymer having the $M_w/M_n$ ratio of 1.2 or less, or a polymer having the $M_w/M_n$ ratio of 1.1 or less is obtained.

The polymer obtained by the living radical polymerization method of the present invention can be applied for various uses. For example, the polymer can be used for manufacturing materials for resistor, adhesives, lubricants, paint, ink, used in various applications from the viewpoint that the amount of catalyst remaining in the polymer is low. That is, since the amount of catalyst can be decreased relative to the conventional transition metal-based catalysts and the like, the obtained resins acquire high purity, and the polymer can be suitably used in the applications where a high purity resin is required. The catalyst residue may be removed from the produced polymer, or may not be removed, depending on the application. The polymer may be molded, or dissolved or dispersed in a solvent or a dispersion medium depending on the various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the amount of catalyst remaining in the polymer is low, and the advantage that the cost is low, and thus the polymer can be utilized in various applications by making the best use of these advantages.

For example, a homopolymer, a random copolymer and a block copolymer formed from benzyl methacrylate and having narrow molecular weight distribution, can be used as high performance materials for resistor.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug sustained-release materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, when a compound that does not have electroconductivity is used as a catalyst, a polymer that can be preferably used even in applications where the absence of any residual electroconductive impurities in the polymer is required (for example, resist materials, electronic materials and the like), is obtained.

The catalyst of the present invention is characterized in that the nonmetallic compound has an ionic bond. As a result of the research of the inventors of the present invention, it was found that nonmetallic compounds having an ionic bond with a halide ion can catalyze reversible activation of a growth terminal of a radical polymerization reaction. A nonmetallic compound having such an ionic bond with a halide ion can serve as a potent catalyst.

EXAMPLES

Hereinafter, Examples of the present invention will be explained. However, the present invention is not limited by these Examples.

The monomers and catalysts used in the following examples are shown below.
(Compounds Used)
First, the structures of the main compounds used in the Examples are described below:
(Monomers)
The structures of the monomers used in the Examples are described below:

[Formula 20]

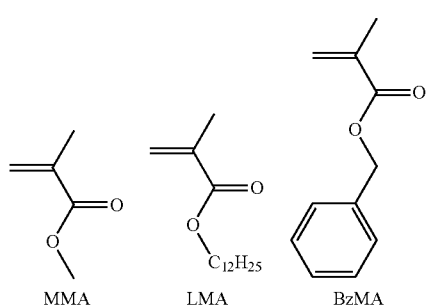

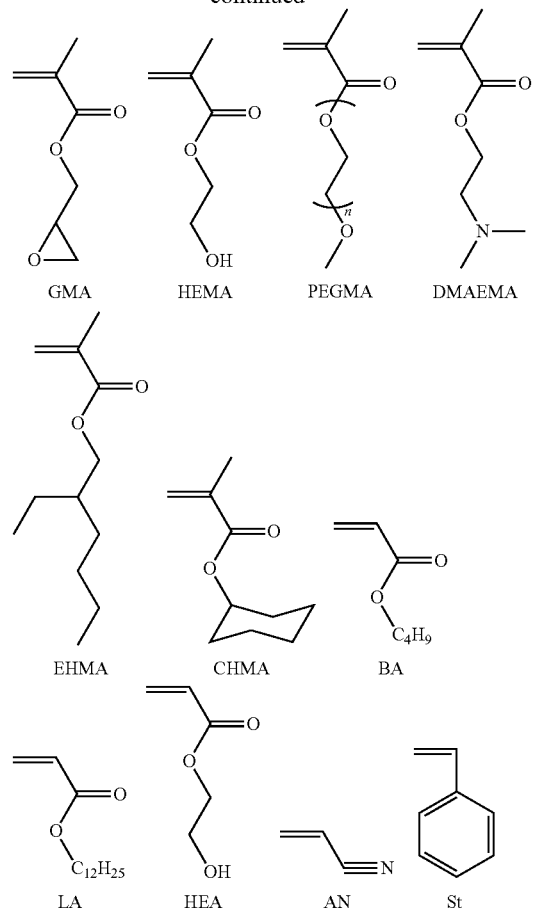

(Catalysts and Organic Halide Compounds to be Used as Dormant Species)

The structural formulas of the catalyst compounds used in the Examples are shown below:

(The List of the Structural Formulas of the Catalyst Compounds Used in the Examples)

[Formula 21A]

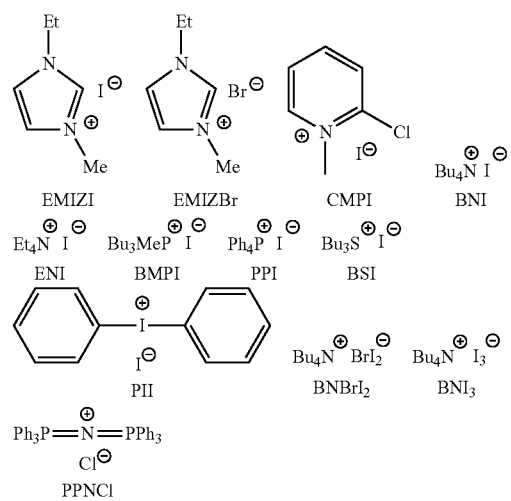

It should be noted that the structural formula of organic halogenated compound (CPI) used as low molecular weight dormant species is as described above.

It should be noted that in the following tables, when a solvent is used, the described concentration of a loaded compound is a concentration prior to dilution with the solvent. When a solvent is used, the whole loaded mixture, described therein, is diluted with the solvent. Therefore, for example, when a concentration of a solvent is 25%, regarding all loaded compounds, the actual concentration at the time of the polymerization is three-fourths of the described concentration (for example, when a table describes that a monomer is 8000 mM, the actual concentration at the time of the polymerization is 6000 mM). When a concentration of a solvent is 50%, the actual concentration at the time of the polymerization is a half of the described concentration (for example, when a table describes that a monomer is 8000 mM, the actual concentration at the time of the polymerization is 4000 mM).

In the following tables, PDI denotes the ratio of $M_w/M_n$. Further, $M_n$ is a number average molecular weight of the obtained polymer.

$M_{n,theo}$ denotes a theoretical value calculated according to the following formula:

$$M_{n,theo} = ([M]_0 / [R-I]_0) \times \text{(molecular weight of the monomer)} \times (conv)/100 \quad \text{[Numerical formula 1]}$$

wherein $[M]_0$ and $[R-I]_0$ are the initial concentrations (charge concentration) of a monomer and an alkyl iodide that is to be used as a dormant species, respectively; and conv is the monomer conversion ratio (polymerization ratio).

Example 1

[Polymerization of methyl methacrylate (MMA) Using BMPI as a Catalyst]
(Entry 1)

80 mM of 2-cyanopropyl iodide (CP-I: the chemical structural formula is as described above) was used as an alkyl halide that is to be used as a dormant species. 40 mM of methyltributylphosphonium iodide (BMPI: the chemical structural formula is as described above) was used as a catalyst. A radical initiator such as an organic peroxide or diazo compound was not used. These materials were dissolved in 3 g of methyl methacrylate (MMA) to obtain a reaction solution having the aforementioned concentrations. The monomer concentration was about 8 M. The solubilities of these materials were satisfactory, and a homogenous solution was formed. The remaining oxygen was replaced with argon. The reaction solution was heated to 80° C. to perform the polymerization reaction. The reaction period of time was 30 minutes, 60 minutes, or 90 minutes. The experimental results are shown in entry 1 in Table 1A and Table 1B. In addition, the obtained data are shown with black circles in FIG. 1 and FIG. 2.

In this experiment, it was aimed that a 100-mer is formed when the conversion ratio is 100%. As a result, the conversion ratio and the molecular weight had a proportional relationship approximately as targeted. PDI was also very small, and living polymerization was satisfactorily controlled.

Figure 2:
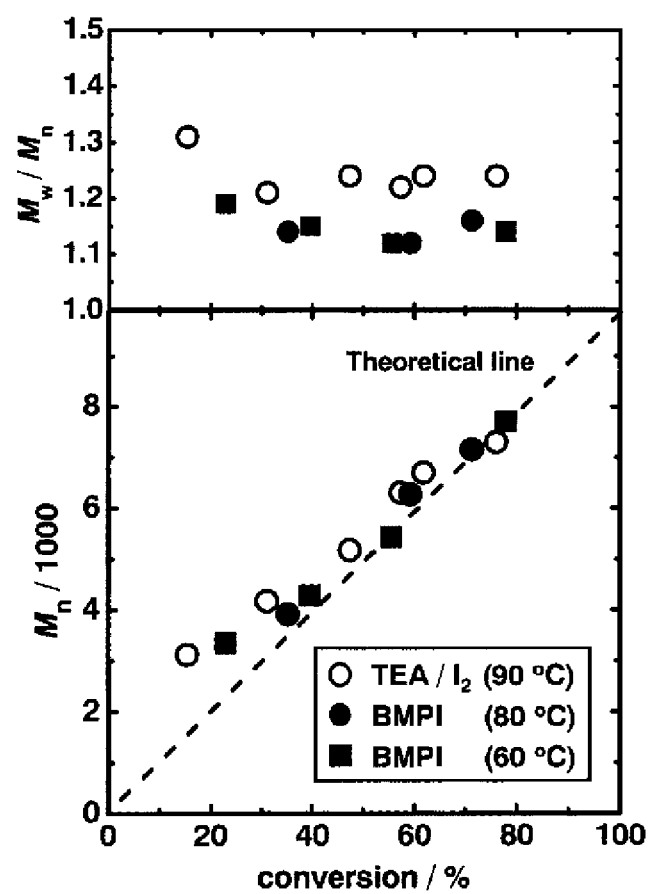
FIG. 2 shows a graph plotting $M_n$ and $M_w/M_n$ versus Conversion (polymerization ratio) for the result of performing the polymerization of methyl methacrylate (MMA) containing CP-I (80 mM) and a catalyst (BMPI (40 mM) or TEA (40 mM) and $I_2$ (1 mM)). White circles represent the result of an experiment at 90° C. in which 40 mM TEA (triethylamine) and 1 mM $I_2$ (iodine) were used (entry C-2 of Example 1). Black circles represent the result of an experiment at 80° C. in which BMPI was used (entry 1 of Example 1). Black squares represent the result of an experiment at 60° C. in which BMPI was used (entry 2 of Example 1). The obtained results are consistent with the theoretical values, which are indicated as Theoretical line. It should be noted that the theoretical value is $M_{n,theo}$ in the formula described later (Numerical formula 1), (R-I) in the formula (Numerical formula 1) is CP-I in FIG. 2. $M_n$ is well consistent with the theoretical value at any experiments.

As shown in FIG. 1 and FIG. 2 (black circles for each) and Table 1 (entry 1), $M_n$ was consistent with the theoretical value, and polydispersity (PDI(=$M_w/M_n$)) was as small as about 1.1 to 1.2 from the early stage of the polymerization, and thus satisfactory control by BMPI was achieved.

It is noted that regarding concentrations, "mM" refers to the number of millimoles relative to 1 liter of a monomer. For example, 80 mM means that 80 millimoles of a solute is dissolved in 1 liter of a monomer. Regarding concentrations, "M" refers to the number of moles relative to 1 liter of a monomer. For example, 8 M means that 8 moles of a solute is dissolved in 1 liter of a monomer. It is noted that in the case of MMA, 1 liter of a monomer (bulk) is 8 moles at room temperature.

(Entry 2)

An experiment was carried out in the same manner as the experiment of entry 1 except that the temperature was changed to 60° C. and the reaction period of time was changed to 120 minutes, 180 minutes, 240 minutes, or 480 minutes. The experimental results are shown in entry 2 of Table 1A and Table 1B. Further, the obtained data are shown in FIG. 1 and FIG. 2 with black squares.

(Entry 3 to Entry 62)

The materials and reaction conditions were changed as described in the following tables (Table 1A to Table 5B), and experiments were carried out. The experimental results are shown in the following tables. In all of the experiments, living polymerization was satisfactorily controlled. In this regard, the respective aims in the experiments are as described in the following.

In entry 3, it was aimed that a 400-mer is formed when the conversion ratio is 100%.

In entry 4, the amount of the catalyst BMPI was reduced.

In entry 5, dilution with 25% of a solvent was performed.

In entry 6, the catalyst was combined with a catalyst PMDETA described in the above-described Patent Document 5.

In entry 7, a radical initiator V65 was added in order to increase the polymerization rate.

In entry 8, dilution with 50% of a solvent was performed.

In entry 9, the catalyst was combined with PMDETA.

In entry 10, the catalyst was combined with a catalyst of the present invention, BNI.

In entry 11, similarly to entry 10, the catalyst was combined with the catalyst of the present invention, BNI.

In entry 12, a radical initiator AIBN was added in order to increase the polymerization rate.

In entry 13, the catalyst was combined with a catalyst TBA described in the above-described Patent Document 5.

In entry 14, TBA and AIBN were combined.

In entry 15, the amount of the catalyst BMPI was reduced.

In entry 16, TBA was added.

In entry 17, V65 which has a higher decomposition rate was used as an initiator, and the amount thereof was reduced to less than that of AIBN.

In entry 18, TBA was added.

In entry 19, the amount of the catalyst BMPI was reduced.

In entry 20, TBA was added.

In entry 21, the amount of V65 was increased in order to increase the polymerization rate.

In entry 22, the amount of the catalyst BMPI was reduced.

In entry 23, TBA was added.

In entry 24, it was aimed that an 800-mer is formed when the conversion ratio is 100%.

In entry 25, dilution with 25% of a solvent was performed.

In entry 26, dilution with 50% of a solvent was performed.

In entry 27, the amount of the catalyst BMPI was reduced.

In entry 28, the catalyst was combined with BNI.

In entry 29, the catalyst was combined with BNI and TBA.

In entry 30, dilution with 25% of a solvent was performed.

In entry 31, the catalyst was combined with BNI.
In entry 32, the catalyst was combined with PMDETA.
In entry 33, the catalyst was combined with BNI and PMDETA.
In entry 34, V65 was added in order to increase the polymerization rate.
In entry 35, dilution with 50% of a solvent was performed.
In entry 36, the catalyst was combined with BNI and PMDETA.
In entry 37, a radical initiator AIBN was added in order to increase the polymerization rate.
In entry 38, the amount of the catalyst BMPI was reduced.
In entry 39, TBA was added.
In entry 40, the amount of the catalyst BMPI was further reduced.
In entry 41, DMDG was used as a solvent.
In entry 42, TBA was added.
In entry 43, V65 which has a higher decomposition rate was used as an initiator.
In entry 44, TBA was added.
In entry 45, V65 was increased in order to increase the polymerization rate.
In entry 46, it was aimed that a 1600-mer is formed when the conversion ratio is 100%.
In entry 47, dilution with 25% of a solvent was performed.
In entry 48, the catalyst was combined with BNI.
In entry 49, the catalyst was combined with BNI and PMDETA.
In entry 50, dilution with 50% of a solvent was performed.
In entry 51, the catalyst was combined with PMDETA.
In entry 52, a radical initiator AIBN was added in order to increase the polymerization rate.
In entry 53, V65 was used as a radical initiator, and TBA was further added.
In entry 54, the temperature was decreased to 40° C. V70 was used as a radical initiator, and MFDG was used as a solvent. It was aimed that an 800-mer is formed when the conversion ratio is 100%.
In entry 55, in order to increase the polymerization rate, V70 was increased, and the catalyst was combined with BNI.
In entry 56, it was aimed that an 800-mer is formed when the conversion ratio is 100%. A solvent was used at 25%.
In entry 57, a solvent was used in an amount of 50%.
In entry 58, the amount of the catalyst BMPI was reduced.
In entry 59, the amount of the catalyst BMPI was further reduced.
In entry 60, TBA was added.
In entry 61, in comparison to entry 60, the amount of the catalyst BMPI was reduced.
In entry 62, it was aimed that a 1600-mer is formed when the conversion ratio is 100%.

Comparative Example 1

(Entry C-1)
Polymerization of methyl methacrylate (MMA) was carried out without using a catalyst. An experiment was carried out in the same manner as entry 1. However, BMPI was not used, only MMA and CP-I were used, the temperature was 90° C., and the reaction period of time was one hour. The results are shown in entry C-1 of Table 5A and Table 5B. Polymerization hardly proceeded, and a polymer having narrow molecular weight distribution was not obtained. That is, it can be said that in the Examples of the present invention, the polymerization proceeded and was controlled due to the action of the catalyst of the present invention.

Comparative Example 2

(Entry C-2)
Polymerization was carried out in the same manner as entry 1 using a catalyst described in Patent Document 5, triethylamine (TEA) (40 mM) and $I_2$ (1 mM), in place of BMPI. The reaction materials and reaction conditions are shown in the following tables. The results are shown in the following tables and FIG. 1 and FIG. 2 (white circles for each).

Comparative Example 3

(Entry C-3)
Polymerization was carried out in the same manner as entry 24 using a catalyst described in Patent Document 5, tributylphosphine (TBP) (80 mM), in place of BMPI. The reaction materials and reaction conditions and the results are shown in the following tables.

By comparing entry 1 with entry C-2, it was found that in the same concentration of a catalyst, BMPI (80° C.) in entry 1 can perform polymerization at a lower temperature and at higher rate than TEA (90° C.) and the molecular weight distribution is also narrower than that obtained with TEA (90° C.).

By comparing entry 2 with entry C-2, it was found that in the same concentration of a catalyst, even when the temperature was decreased to 60° C. which is further lower than that of the experiment with TEA (90° C.), the conversion ratio reached 80% at 8 hours. That is, it was confirmed that the polymerization rate is sufficiently large even at a low temperature.

FIG. 1 shows a graph plotting $\ln([M]_0/[M])$ versus t (hour) for the results of entry 1, entry 2, and entry C-2. FIG. 2 shows a graph plotting $M_n$ and $M_w/M_n$ versus Conversion (polymerization ratio) for the result of entry 1, entry 2, and entry C-2.

The white circles in FIG. 1 and FIG. 2 represent the values of the results of entry C-2. That is, they represent the polymerization of Comparative Example 2 using TEA, which is a representative amine catalyst.

The black circles in FIG. 1 and FIG. 2 represent the values of the results of entry 1 in Example 1 (BMPI, 80° C.). $M_n$ is consistent with the theoretical value, and the polydispersity ($PDI(=M_w/M_n)$) was as small as about 1.1 to 1.2 from the early stage of the polymerization. Satisfactory control by BMPI was achieved.

The black squares in FIG. 1 and FIG. 2 represent the values of the results of entry 2 in Example 1 (BMPI, 60° C.). The obtained results are consistent with the theoretical values, which are indicated as Theoretical line. $M_n$ is well consistent with the theoretical value also in this experiment.

In the same concentration of a catalyst, it is found that BMPI (80° C.) can perform polymerization at a lower temperature and a higher rate than TEA (90° C.), and the molecular weight distribution is also narrower than that obtained with TEA (90° C.). Even when the temperature was further decreased to 60° C. (FIG. 1 (black squares) and FIG. 2 (black squares) as well as Table 1 (entry 2)), the conversion ratio reached 80% at 8 hours, and the polymerization rate was sufficiently large. As described above, it was confirmed that BMPI has high activity.

Figure 3:
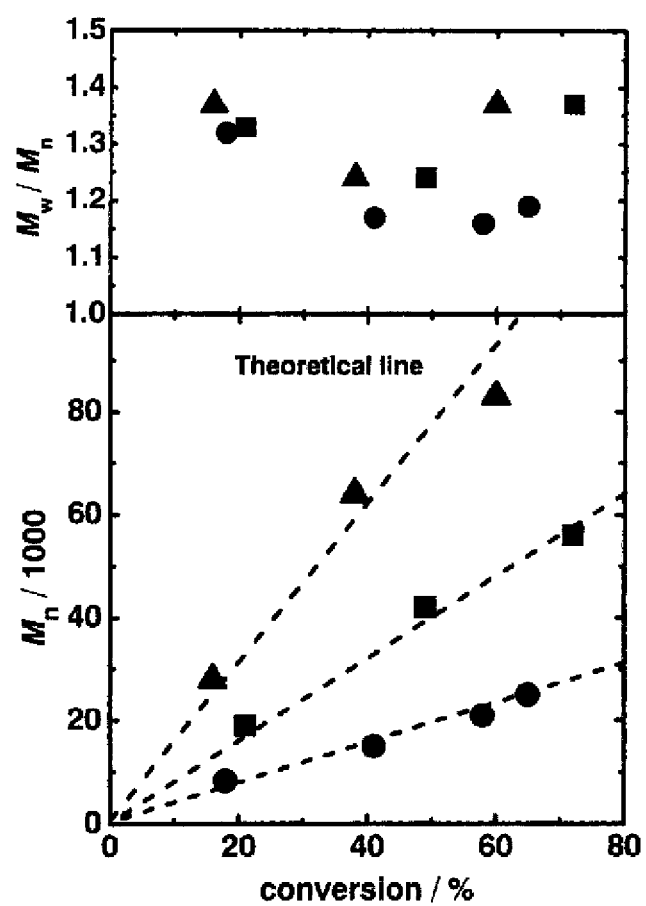
FIG. 3 shows the results of entries 3, 25, and 47 of Example 1. That is, it shows a graph plotting $M_n$ and $M_w/M_n$ versus Conversion (polymerization ratio) for the result of performing the polymerization of methyl methacrylate (MMA) at 60° C. using CP-I (20 mM, 10 mM, or 5 mM) and BMPI (80 mM). Black circles represent the values for 20 mM CP-I. Black squares represent the values for 10 mM CP-I. Black triangles represent the values for 5 mM CP-I. The obtained results are consistent with the theoretical values, which are indicated as Theoretical line. $M_n$ is well consistent with the theoretical value at any experiments.
Figure 4:
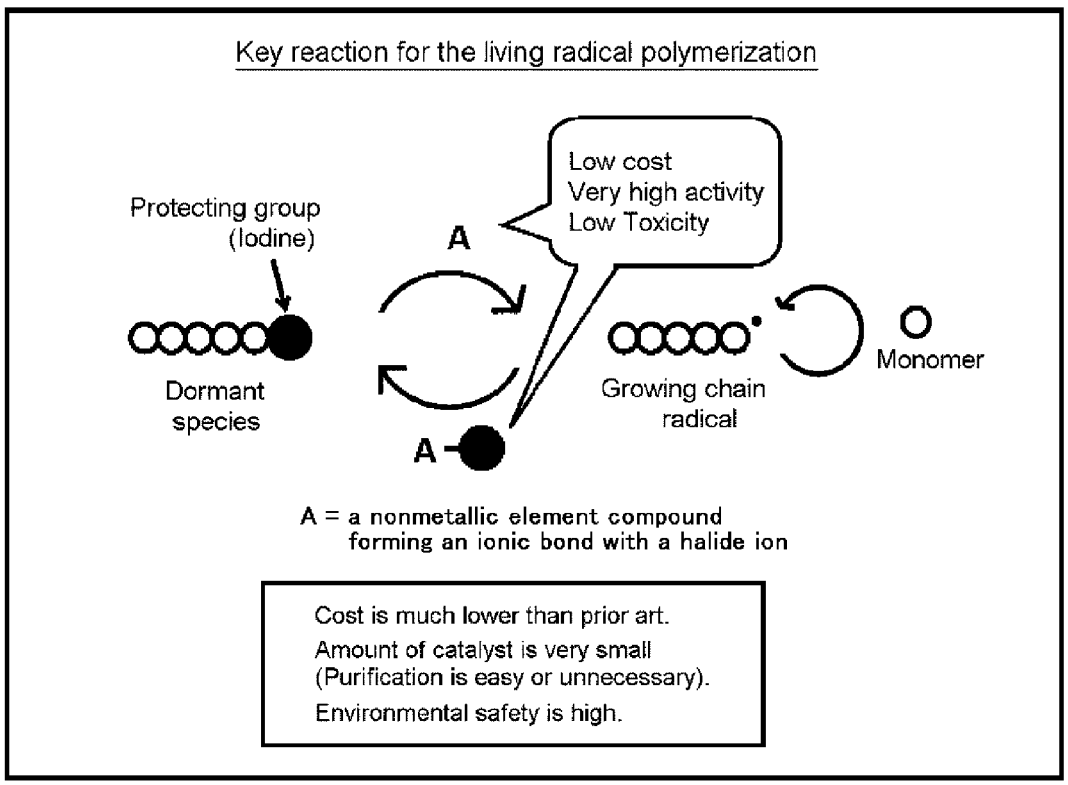
FIG. 4 is a scheme showing the concept of the present invention, and shows the key reaction for the living radical polymerization of the present invention. In this scheme, the compound which is the catalyst is indicated by A, and a compound in which iodine is bound to the compound is indicated by a symbol of A bound to a black circle. This catalyst is characterized in that it does not require a radical initiator; the catalyst is more inexpensive as compared with transition metal catalysts and the like of prior art; since the catalyst is ultra-highly active, the catalyst can be used in a small amount; purification is unnecessary at the time of production of the catalyst, or even if purification is needed, the purification is easy; and since the catalyst is low in toxicity or non-toxic, the catalyst is highly safe to the human body and the environment.

In case of MMA which has an α-methyl group, when polymerization is carried out at a high temperature, removal of iodine from a terminal of a dormant species, which is a side reaction, occurs significantly. Therefore, it is difficult to achieve a higher molecular weight (polymerization for a long period of time). Since BMPI is highly active even at a relatively low temperature, synthesis of a polymer having a higher molecular weight was attempted at 60° C. As shown in FIG. 3 and Table 1A to Table 4B (entries 3, 25, and 47), $M_n$ is consistent with the theoretical value even in a range of several tens of thousands, which was difficult for amine catalysts. For example, a polymer having a relatively high molecular weight and narrow molecular weight distribution, wherein $M_n$ is 83,000 and PDI is 1.37, was obtained.

In these experiments, a radical initiator was not used, and the concentration of a dormant species is low. Therefore, a relatively long period of time (12 hours to 48 hours) was needed for a high conversion ratio. However, the polymerization rate can be increased by adding an azo compound or the like as a radical source. Actually, addition of a small amount of an azo compound (Table 4A and Table 4B (entries 57-57 and the like)) successfully attained a further decrease of the polymerization temperature (40° C.) and an increase of the polymerization rate without significantly deteriorating $M_n$ and PDI.

FIG. 3 shows the results of entries 3, 25, and 47 in Example 1. That is, it shows a graph plotting $M_n$ and $M_w/M_n$ versus Conversion (polymerization ratio) for the result of performing the polymerization of MMA at 60° C. using CP-I (20 mM, 10 mM, or 5 mM) and BMPI (80 mM). The black circles represent the values for 20 mM CP-I. The black squares represent the values for 10 mM CP-I. The black triangles represent the values for 5 mM CP-I. The obtained results are consistent with the theoretical values, which are indicated as Theoretical line. $M_n$ is well consistent with the theoretical value at any catalyst concentrations.

As described above, it was confirmed that BMPI has high activity, and the polymerization rate is high even at a low temperature. It is believed that in this polymerization, the reaction between a radical at the growth terminal of the polymer (polymer •) and iodine was catalyzed by BMPI and thus the living radical polymerization proceeded.

In view of the molecular weight of BMPI (about 344), the amount, 1 mM, which was used in the experiments of entry 40 in Table 3A, entry 59 in Table 4A, and the like, corresponds to about 0.037% by weight in the MMA monomer solution. This amount is about one two-hundred-fortieth (about 1/240) in comparison with the amount of the catalyst (8.9% by weight) used in the experimental example described in Non-Patent Document 1 which is described later. As described above, the living radical polymerization reaction can be conducted with a quite small amount of the catalyst. Therefore, it was confirmed that the activity of the catalyst is very high.

From the tacticity of the produced polymers, it was confirmed that the present polymerizations were radical polymerizations.

TABLE 1B

| entry | T (° C.) | t (min) | conv (%) | $M_n$ | $M_{n,theo}$ | PDI |
|---|---|---|---|---|---|---|
| 1 | 80 | 30 | 35.2 | 3900 | 3500 | 1.14 |
|   |    | 60 | 59.2 | 6300 | 5900 | 1.12 |
|   |    | 90 | 71.2 | 7200 | 7100 | 1.16 |
| 2 | 60 | 120 | 22.9 | 3300 | 2300 | 1.19 |
|   |    | 180 | 39.5 | 4300 | 4000 | 1.15 |
|   |    | 240 | 55.5 | 5400 | 5600 | 1.12 |
|   |    | 480 | 77.9 | 7700 | 7800 | 1.14 |
| 3 | 60 | 120 | 18.0 | 8300 | 7200 | 1.19 |
|   |    | 300 | 41.0 | 15000 | 16000 | 1.15 |
|   |    | 480 | 58.0 | 21000 | 23000 | 1.12 |
|   |    | 720 | 65.0 | 25000 | 26000 | 1.14 |
| 4 | 60 | 300 | 34.4 | 14000 | 14000 | 1.25 |
|   |    | 1440 | 69.7 | 29000 | 28000 | 1.29 |
| 5 | 60 | 300 | 30.5 | 13000 | 12000 | 1.26 |
|   |    | 1440 | 66.3 | 27000 | 27000 | 1.21 |
| 6 | 60 | 300 | 28.4 | 13000 | 11000 | 1.14 |
|   |    | 540 | 46.5 | 22000 | 19000 | 1.20 |
|   |    | 1440 | 91.5 | 45000 | 37000 | 1.33 |
| 7 | 60 | 300 | 64.9 | 24000 | 26000 | 1.17 |
|   |    | 720 | 92.0 | 35000 | 37000 | 1.23 |
| 8 | 60 | 300 | 18.4 | 8700 | 7400 | 1.31 |
|   |    | 1440 | 55.6 | 23000 | 22000 | 1.16 |
|   |    | 48 h | 67.0 | 28000 | 27000 | 1.22 |
| 9 | 60 | 300 | 19.8 | 11000 | 7900 | 1.30 |
|   |    | 1440 | 63.2 | 25000 | 25000 | 1.32 |
| 10 | 60 | 300 | 20.3 | 8800 | 8100 | 1.19 |
|   |    | 1320 | 55.5 | 24000 | 22000 | 1.16 |
| 11 | 60 | 300 | 24.1 | 11000 | 9600 | 1.23 |
|   |    | 1440 | 62.5 | 27000 | 25000 | 1.19 |
| 12 | 60 | 300 | 23.3 | 9800 | 9300 | 1.26 |
|   |    | 1440 | 59.9 | 22000 | 24000 | 1.19 |
|   |    | 46 h | 89.4 | 29000 | 36000 | 1.35 |
| 13 | 60 | 300 | 16.8 | 8000 | 6700 | 1.26 |
|   |    | 1440 | 51.7 | 21000 | 21000 | 1.15 |
| 14 | 60 | 300 | 21.4 | 9300 | 8600 | 1.21 |
|   |    | 1440 | 68.6 | 26000 | 27000 | 1.19 |
| 15 | 60 | 1440 | 73.4 | 23000 | 29000 | 1.33 |

TABLE 1A

| entry | monomer | In | catalyst | $[M]_0/[CP\text{-}I]_0/[In]_0/[catalyst]_0$ (mM) | solvent |
|---|---|---|---|---|---|
| 1 | MMA(100 eq) |  | BMPI | 8000/80/0/40 | — |
| 2 | MMA(100 eq) |  | BMPI | 8000/80/0/40 | — |
| 3 | MMA(400 eq) |  | BMPI | 8000/20/0/80 | — |
| 4 | MMA(400 eq) |  | BMPI | 8000/20/0/40 | — |
| 5 | MMA(400 eq) |  | BMPI | 8000/20/0/80 | toluene 25 wt % |
| 6 | MMA(400 eq) |  | BMPI/PMDETA | 8000/20/0/(80/20) | toluene 25 wt % |
| 7 | MMA(400 eq) | V65 | BMPI | 8000/20/5/80 | toluene 25 wt % |
| 8 | MMA(400 eq) |  | BMPI | 8000/20/0/80 | toluene 50 wt % |
| 9 | MMA(400 eq) |  | BMPI/PMDETA | 8000/20/0/(80/40) | toluene 50 wt % |
| 10 | MMA(400 eq) |  | BMPI/BNI | 8000/20/0/(80/80) | toluene 50 wt % |
| 11 | MMA(400 eq) |  | BMPI/BNI | 8000/20/0/(80/320) | toluene 50 wt % |
| 12 | MMA(400 eq) | AIBN | BMPI | 8000/20/5/80 | toluene 50 wt % |
| 13 | MMA(400 eq) |  | BMPI/TBA | 8000/20/0/(80/40) | toluene 50 wt % |
| 14 | MMA(400 eq) | AIBN | BMPI/TBA | 8000/20/5/(80/40) | toluene 50 wt % |
| 15 | MMA(400 eq) | AIBN | BMPI | 8000/20/10/5 | toluene 50 wt % |

TABLE 2A

| entry | monomer | $I_n$ | catalyst | $[M]_0/[CP\text{-}I]_0/[In]_0/[catalyst]_0$ (mM) | solvent |
|---|---|---|---|---|---|
| 16 | MMA (400 eq) | AIBN | BMPI/TBA | 8000/20/10/(5/40) | toluene 50 wt % |
| 17 | MMA (400 eq) | V65 | BMPI | 8000/20/5/80 | toluene 50 wt % |
| 18 | MMA (400 eq) | V65 | BMPI/TBA | 8000/20/5/(80/40) | toluene 50 wt % |
| 19 | MMA (400 eq) | V65 | BMPI | 8000/20/5/20 | toluene 50 wt % |
| 20 | MMA (400 eq) | V65 | BMPI/TBA | 8000/20/5/(20/40) | toluene 50 wt % |
| 21 | MMA (400 eq) | V65 | BMPI/TBA | 8000/20/10/(20/40) | toluene 50 wt % |
| 22 | MMA (400 eq) | V65 | BMPI | 8000/20/5/5 | toluene 50 wt % |
| 23 | MMA (400 eq) | V65 | BMPI/TBA | 8000/20/5/(5/40) | toluene 50 wt % |
| 24 | MMA (800 eq) | | BMPI | 8000/10/0/80 | — |
| 25 | MMA (800 eq) | | BMPI | 8000/10/0/80 | toluene 25 wt % |
| 26 | MMA (800 eq) | | BMPI | 8000/10/0/80 | toluene 50 wt % |
| 27 | MMA (800 eq) | | BMPI | 8000/10/0/40 | — |
| 28 | MMA (800 eq) | | BMPI/BNI | 8000/10/0/(80/80) | — |
| 29 | MMA (800 eq) | | BMPI/BNI/TBA | 8000/10/0/(80/320/40) | — |
| 30 | MMA (800 eq) | | BMPI | 8000/10/0/80 | toluene 25 wt % |

TABLE 2B

| entry | T (°C.) | t (min) | conv (%) | $M_n$ | $M_{n,theo}$ | PDI |
|---|---|---|---|---|---|---|
| 16 | 60 | 300 | 29.1 | 12000 | 12000 | 1.47 |
| | | 1440 | 90.2 | 26000 | 36000 | 1.39 |
| 17 | 60 | 300 | 40.8 | 16000 | 16000 | 1.39 |
| | | 1380 | 74.5 | 23000 | 30000 | 1.37 |
| 18 | 60 | 300 | 40.7 | 16000 | 16000 | 1.27 |
| | | 1380 | 84.5 | 27000 | 34000 | 1.26 |
| 19 | 60 | 300 | 42.3 | 15000 | 17000 | 1.34 |
| | | 1440 | 68.8 | 21000 | 28000 | 1.27 |
| 20 | 60 | 300 | 40.2 | 15000 | 16000 | 1.20 |
| | | 1440 | 79.1 | 26000 | 32000 | 1.22 |
| 21 | 60 | 300 | 58.1 | 18000 | 23000 | 1.39 |
| | | 600 | 85.2 | 24000 | 34000 | 1.40 |
| 22 | 60 | 1440 | 70.0 | 20000 | 28000 | 1.44 |
| 23 | 60 | 300 | 42.8 | 14000 | 17000 | 1.32 |
| | | 1440 | 80.5 | 23000 | 32000 | 1.32 |
| 24 | 60 | 300 | 28.2 | 23000 | 23000 | 1.26 |
| | | 1440 | 53.8 | 45000 | 43000 | 1.34 |
| | | 48 h | 71.3 | 56000 | 57000 | 1.42 |
| 25 | 60 | 300 | 21.1 | 19000 | 17000 | 1.33 |
| | | 1440 | 49.3 | 42000 | 39000 | 1.24 |
| | | 48 h | 72.2 | 56000 | 58000 | 1.37 |
| 26 | 60 | 300 | 13.4 | 12000 | 11000 | 1.32 |
| | | 1440 | 44.2 | 36000 | 35000 | 1.18 |
| | | 48 h | 57.5 | 48000 | 46000 | 1.24 |
| 27 | 60 | 300 | 25.8 | 20000 | 21000 | 1.35 |
| | | 1440 | 55.8 | 44000 | 45000 | 1.28 |
| 28 | 60 | 300 | 38.1 | 34000 | 31000 | 1.15 |
| | | 1440 | 65.4 | 58000 | 52000 | 1.32 |
| 29 | 60 | 300 | 37.8 | 37000 | 30000 | 1.13 |
| | | 1440 | 71.0 | 73000 | 57000 | 1.35 |
| 30 | 60 | 300 | 16.0 | 15000 | 13000 | 1.12 |
| | | 1440 | 49.3 | 42000 | 39000 | 1.24 |
| | | 48 h | 72.2 | 56000 | 58000 | 1.29 |

TABLE 3A

| entry | monomer | In | catalyst | $[M]_0/[CP\text{-}I]_0/[In]_0/[catalyst]_0$ (mM) | solvent |
|---|---|---|---|---|---|
| 31 | MMA(800eq) | | BMPI/BNI | 8000/10/0/(80/80) | toluene 25 wt % |
| 32 | MMA(800eq) | | BMPI/PMDETA | 8000/10/0/(80/10) | toluene 25 wt % |
| 33 | MMA(800eq) | | BMPI/BNI/PMDETA | 8000/10/0/(80/20/20) | toluene 25 wt % |
| 34 | MMA(800eq) | V65 | BMPI | 8000/10/5/80 | toluene 25 wt % |
| 35 | MMA(800eq) | | BMPI | 8000/10/0/80 | toluene 50 wt % |
| 36 | MMA(800eq) | | BMPI/BNI/PMDETA | 8000/10/0/(80/320/20) | toluene 50 wt % |
| 37 | MMA(800eq) | AIBN | BMPI | 8000/10/5/80 | toluene 50 wt % |
| 38 | MMA(800eq) | AIBN | BMPI | 8000/10/5/5 | toluene 50 wt % |
| 39 | MMA(800eq) | AIBN | BMPI/TBA | 8000/10/5/(5/40) | toluene 50 wt % |
| 40 | MMA(800eq) | AIBN | BMPI | 8000/10/4/1 | toluene 50 wt % |
| 41 | MMA(800eq) | AIBN | BMPI | 8000/10/5/80 | DMDG 50 wt % |
| 42 | MMA(800eq) | AIBN | BMPI/TBA | 8000/10/5/(80/160) | DMDG 50 wt % |
| 43 | MMA(800eq) | V65 | BMPI | 8000/10/5/80 | toluene 50 wt % |
| 44 | MMA(800eq) | V65 | BMPI/TBA | 8000/10/5/(80/40) | toluene 50 wt % |
| 45 | MMA(800eq) | V65 | BMPI/TBA | 8000/10/10/(80/40) | toluene 50 wt % |

TABLE 3B

| entry | T (° C.) | t (min) | conv (%) | $M_n$ | $M_{n,theo}$ | PDI |
|---|---|---|---|---|---|---|
| 31 | 60 | 300 | 26.0 | 26000 | 21000 | 1.14 |
|  |  | 600 | 41.9 | 40000 | 34000 | 1.14 |
|  |  | 1440 | 56.0 | 54000 | 45000 | 1.22 |
| 32 | 60 | 300 | 20.8 | 21000 | 17000 | 1.19 |
|  |  | 1440 | 81.2 | 71000 | 65000 | 1.42 |
| 33 | 60 | 300 | 24.3 | 24000 | 19000 | 1.16 |
|  |  | 588 | 40.7 | 38000 | 33000 | 1.20 |
|  |  | 1440 | 93.8 | 83000 | 75000 | 1.35 |
| 34 | 60 | 300 | 76.7 | 38000 | 61000 | 1.40 |
|  |  | 1440 | 100.0 | 62000 | 80000 | 1.40 |
| 35 | 60 | 300 | 13.4 | 12000 | 11000 | 1.32 |
|  |  | 1440 | 44.2 | 36000 | 35000 | 1.18 |
|  |  | 48 h | 57.5 | 48000 | 46000 | 1.24 |
| 36 | 60 | 300 | 14.2 | 16000 | 11000 | 1.20 |
|  |  | 1440 | 54.0 | 56000 | 43000 | 1.22 |
| 37 | 60 | 300 | 23.3 | 20000 | 19000 | 1.42 |
|  |  | 1440 | 69.7 | 44000 | 56000 | 1.38 |
|  |  | 46 h | 97.9 | 53000 | 78000 | 1.40 |
| 38 | 60 | 1440 | 68.1 | 41000 | 55000 | 1.38 |
| 39 | 60 | 300 | 14.0 | 10000 | 11000 | 1.33 |
|  |  | 1440 | 77.1 | 48000 | 62000 | 1.36 |
| 40 | 60 | 1380 | 60.4 | 39000 | 48000 | 1.48 |
| 41 | 60 | 300 | 23.4 | 21000 | 19000 | 1.17 |
|  |  | 1440 | 60.2 | 46000 | 48000 | 1.40 |
| 42 | 60 | 300 | 26.7 | 27000 | 21000 | 1.32 |
|  |  | 1440 | 83.6 | 77000 | 67000 | 1.48 |
| 43 | 60 | 1440 | 79.4 | 41000 | 64000 | 1.40 |
| 44 | 60 | 150 | 26.4 | 19000 | 21000 | 1.36 |
|  |  | 1440 | 84.9 | 45000 | 68000 | 1.36 |
| 45 | 60 | 300 | 54.6 | 32000 | 44000 | 1.44 |
|  |  | 474 | 69.2 | 36000 | 55000 | 1.47 |

TABLE 4A

| entry | monomer | In | catalyst | $[M]_0/[CP\text{-}I]_0/[In]_0/[catalyst]_0$ (mM) | solvent |
|---|---|---|---|---|---|
| 46 | MMA(1600eq) |  | BMPI | 8000/5/0/80 | — |
| 47 | MMA(1600eq) |  | BMPI | 8000/5/0/80 | toluene 25 wt % |
| 48 | MMA(1600eq) |  | BMPI/BNI | 8000/5/0/(80/80) | toluene 25 wt % |
| 49 | MMA(1600eq) |  | BMPI/BNI/PMDETA | 8000/5/0/(80/80/80) | toluene 25 wt % |
| 50 | MMA(1600eq) |  | BMPI | 8000/5/0/80 | toluene 50 wt % |
| 51 | MMA(1600eq) |  | BMPI/PMDETA | 8000/5/0/(80/40) | toluene 50 wt % |
| 52 | MMA(1600eq) | AIBN | BMPI | 8000/5/5/80 | toluene 50 wt % |
| 53 | MMA(1600eq) | V65 | BMPI/TBA | 8000/5/5/(80/40) | toluene 50 wt % |
| 54 | MMA(400eq) | V70 | BMPI | 8000/20/10/80 | MFDG50 wt % |
| 55 | MMA(400eq) | V70 | BMPI/BNI | 8000/20/20/(80/20) | MFDG 50 wt % |
| 56 | MMA(800eq) | V70 | BMPI | 8000/10/5/80 | MFDG 25 wt % |
| 57 | MMA(800eq) | V70 | BMPI | 8000/10/5/80 | MFDG 50 wt % |
| 58 | MMA(800eq) | V70 | BMPI | 8000/10/5/10 | MFDG 50 wt % |
| 59 | MMA(800eq) | V70 | BMPI | 8000/10/4/1 | DMDG 50 wt % |
| 60 | MMA(800eq) | V70 | BMPI/TBA | 8000/10/5/(80/20) | MFDG 50 wt % |

TABLE 4B

| entry | T (° C.) | t (min) | conv (%) | $M_n$ | $M_{n,theo}$ | PDI |
|---|---|---|---|---|---|---|
| 46 | 60 | 300 | 20.3 | 35000 | 33000 | 1.30 |
|  |  | 1440 | 41.3 | 68000 | 66000 | 1.33 |
|  |  | 48 h | 59.2 | 83000 | 95000 | 1.43 |
| 47 | 60 | 300 | 16.2 | 28000 | 25000 | 1.28 |
|  |  | 1440 | 37.7 | 64000 | 60000 | 1.24 |
|  |  | 48 h | 60.0 | 83000 | 95000 | 1.37 |
| 48 | 60 | 300 | 19.3 | 38000 | 31000 | 1.15 |
|  |  | 1440 | 49.9 | 85000 | 80000 | 1.22 |
| 49 | 60 | 1440 | 93.1 | 140000 | 150000 | 1.36 |
| 50 | 60 | 1440 | 32.2 | 53000 | 52000 | 1.20 |
|  |  | 48 h | 43.9 | 72000 | 70000 | 1.30 |
| 51 | 60 | 1440 | 53.9 | 78000 | 86000 | 1.43 |
| 52 | 60 | 300 | 20.9 | 32000 | 33000 | 1.41 |
|  |  | 46 h | 96.9 | 88000 | 160000 | 1.45 |
| 53 | 60 | 1440 | 92.1 | 59000 | 150000 | 1.43 |
| 54 | 40 | 300 | 26.0 | 10000 | 10000 | 1.12 |
|  |  | 1440 | 88.2 | 28000 | 35000 | 1.19 |
| 55 | 40 | 300 | 16.6 | 7200 | 6700 | 1.10 |
|  |  | 720 | 85.0 | 28000 | 34000 | 1.38 |
| 56 | 40 | 600 | 62.6 | 47000 | 50000 | 1.32 |
|  |  | 1020 | 95.5 | 73000 | 70000 | 1.31 |
| 57 | 40 | 300 | 10.1 | 8500 | 8100 | 1.09 |
|  |  | 1440 | 71.9 | 48000 | 58000 | 1.23 |
| 58 | 40 | 1440 | 50.9 | 40000 | 41000 | 1.22 |
| 59 | 40 | 1320 | 63.3 | 35000 | 51000 | 1.46 |
| 60 | 40 | 1440 | 87.0 | 74000 | 70000 | 1.44 |

TABLE 5A

| entry | monomer | In | catalyst | $[M]_0/[CP\text{-}I]_0/[In]_0/[catalyst]_0$ (mM) | solvent |
|---|---|---|---|---|---|
| 61 | MMA(800eq) | V70 | BMPI/TBA | 8000/10/5/(20/20) | MFDG50 wt % |
| 62 | MMA(1600eq) | V70 | BMPI | 8000/5/2.5/80 | MFDG50 wt % |
| C-1 | MMA(100eq) | — | — | 8000/80/0/0 | — |
| C-2 | MMA(100eq) | — | TEA/$I_2$ | 8000/80/0/(40/1) | — |
| C-3 | MMA(800eq) | — | TBP | 8000/10/0/80 | — |

TABLE 5B

| entry | T (° C.) | t (min) | conv (%) | $M_n$ | $M_{n,theo}$ | PDI |
|---|---|---|---|---|---|---|
| 61 | 40 | 300 | 31.1 | 25000 | 25000 | 1.32 |
|  |  | 1440 | 92.8 | 59000 | 74000 | 1.36 |
| 62 | 40 | 1440 | 28.9 | 41000 | 46000 | 1.15 |
| C-1 | 90 | 60 | 1 | 400000 | — | 2.28 |
| C-2 | 90 | 30 | 15.4 | 3100 | 1500 | 1.31 |
|  |  | 60 | 31 | 4200 | 3100 | 1.21 |
|  |  | 90 | 47.3 | 5200 | 4700 | 1.24 |
|  |  | 120 | 57.3 | 6300 | 5700 | 1.22 |
|  |  | 140 | 61.8 | 6700 | 6200 | 1.24 |
|  |  | 180 | 76 | 7300 | 7600 | 1.24 |
| C-3 | 40 | 1440 | 95 | 75000 | 76000 | 1.70 |

Monomer: methyl methacrylate (MMA)
Monomer concentration was 8 M when no solvent was used, 6 M when the concentration of the solvent was 25%, and 4 M when the concentration of the solvent was 50%.
Alkyl halide to be used as a dormant species (R-I): 2-cyanopropyl iodide (CP-I)
Catalyst: BMPI (methyltributylphosphonium iodide), BNI (tetrabutylammonium iodide), PMDETA (N,N,N',N'',N''-pentamethyldiethylenetriamine, which is a catalyst disclosed in Patent Document 5), TBA (tributylamine, which is a catalyst disclosed in Patent Document 5), $I_2$
Radical initiator (In) (which was used in some experiments): AIBN (azobisisobutyronitrile), V65 (azobis(2,4-dimethylvaleronitrile)), V70 (2,2'-azobis(4-methoxy-2,4-dimethylvaleronitrile)).
Solvent (which was used in some experiments): toluene, MFDG (dipropylene glycol monomethyl ether), DMDG (dimethyl diglycol)
It should be noted that when the amount of the solvent is 50%, the solvent is 50% and materials other than the solvent is 50% of the reaction materials. It should be noted that when the amount of the solvent is 25%, the solvent is 25% and the materials other than the solvent is 75% of the reaction materials.
$M_n$ and PDI: Molecular weight and polydispersity obtained by gel permeation chromatography (GPC) with tetrahydrofuran (THF) as an eluent calibrated by polymethyl methacrylate (PMMA) standard.

It should be noted that in the above tables, regarding a reaction period of time t, the unit for values described with a unit "h" is hour, and the unit for the others is minute. For example, "48 h" is 48 hours, and "60" is 60 minutes. The same applies to the tables described below.

Example 2

[Polymerization of methyl methacrylate (MMA) Using EMIZI]
1-Methyl-3-methyl-imidazolium iodide (EMIZI; the chemical structural formula thereof is as described above) was used in place of BMPI. The polymerization of methyl methacrylate (MMA) was carried out in the same manner as in Example 1 except that the reaction materials and reaction conditions were changed as shown in Tables 6A and 6B. The results are shown in Tables 6A and 6B.

In this regard, the respective aims in the experiments are as described in the following.

In entry 1 to entry 4, it was confirmed that EMIZI can be used in place of BMPI. In entry 1, it was aimed that a 100-mer is formed when the conversion ratio is 100%. In entry 2, the temperature was decreased to 80° C. In entry 3, the temperature was decreased to 70° C. In entry 4, it was aimed that a 400-mer is formed when the conversion ratio is 100%.

In entry 5, it was aimed that a 400-mer is formed when the conversion ratio is 100%.

In entry 6, dilution with 25% of a solvent was performed.
In entry 7, the catalyst was combined with BNI.
In entry 8, it was aimed that a 1600-mer is formed when the conversion ratio is 100%.

From the results, it was confirmed that EMIZI also acts as a catalyst for living radical polymerization.

TABLE 6A

| entry | monomer | catalyst | $[M]_0/[CP\text{-}I]_0/$ $[catalyst]_0$ (mM) | solvent |
|---|---|---|---|---|
| 1 | MMA (100 eq) | EMIZI | 8000/80/20 | — |
| 2 | MMA (100 eq) | EMIZI | 8000/80/40 | — |
| 3 | MMA (100 eq) | EMIZI | 8000/80/20 | — |

TABLE 6A-continued

| entry | monomer | catalyst | $[M]_0/[CP\text{-}I]_0/$ $[catalyst]_0$ (mM) | solvent |
|---|---|---|---|---|
| 4 | MMA (400 eq) | EMIZI | 8000/20/20 | — |
| 5 | MMA (400 eq) | EMIZI | 8000/20/80 | — |
| 6 | MMA (400 eq) | EMIZI | 8000/20/80 | toluene 25 wt % |
| 7 | MMA (400 eq) | EMIZI/BNI | 8000/20/(80/80) | toluene 50 wt % |
| 8 | MMA (1600 eq) | EMIZI | 8000/5/80 | toluene 25 wt % |

TABLE 6B

| entry | T (° C.) | t (min) | conv (%) | $M_n$ | $M_{n,theo}$ | PDI |
|---|---|---|---|---|---|---|
| 1 | 90 | 120 | 71.9 | 6800 | 7200 | 1.29 |
| 2 | 80 | 90 | 72.0 | 6800 | 7200 | 1.29 |
| 3 | 70 | 300 | 56.3 | 6100 | 5600 | 1.26 |
| 4 | 80 | 300 | 42.3 | 18000 | 17000 | 1.33 |
| 5 | 60 | 1440 | 42.6 | 19000 | 17000 | 1.24 |
|   |    | 47 h | 62.5 | 22000 | 25000 | 1.37 |
| 6 | 60 | 1440 | 33.5 | 13000 | 13000 | 1.48 |
|   |    | 47 h | 47.5 | 17000 | 19000 | 1.40 |
| 7 | 60 | 1320 | 44.7 | 17000 | 18000 | 1.21 |
| 8 | 60 | 1440 | 18.7 | 30000 | 30000 | 1.46 |
|   |    | 47 h | 28.6 | 41000 | 46000 | 1.35 |

Monomer: methyl methacrylate (MMA)
Monomer concentration was 8 M when no solvent was used, 6 M when the concentration of the solvent was 25%, and 4 M when the concentration of the solvent was 50%.
Alkyl halide to be used as a dormant species ((R-I)): 2-cyanopropyl iodide (CP-I)
Catalyst: EMIZI (1-ethyl-3-methylimidazolium iodide), BNI (tetrabutylammonium iodide).
Radical initiator (In) was not used.
Solvent (which was used in some experiments): toluene.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 3

[Polymerization of methyl methacrylate (MMA) Using BNI]
BNI (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

In this regard, the respective aims in the experiments are as described in the following.

In entry 1, it was confirmed that BNI can be used in place of BMPI.

In entry 2, it was aimed that a 400-mer is formed when the conversion ratio is 100%.

In entry 3, dilution with 25% of a solvent was performed.
In entry 4, the catalyst was combined with a catalyst PMDETA.
In entry 5, it was aimed that an 800-mer is formed when the conversion ratio is 100%.
In entry 6, a radical initiator V65 was added in order to increase the polymerization rate.
In entry 7, the temperature was decreased to 40° C., and V70 having a higher decomposition rate than V65 was used as a radical initiator. MFDG was used as a solvent.
In entry 8, it was aimed that a 1600-mer is formed when the conversion ratio is 100%.

TABLE 7A

| entry | monomer | In | catalyst | [M]$_0$/[CP-I]$_0$/[In]$_0$/[catalyst]$_0$ (mM) | solvent |
|---|---|---|---|---|---|
| 1 | MMA (100 eq) | | BNI | 8000/80/0/20 | — |
| 2 | MMA (400 eq) | | BNI | 8000/20/0/80 | — |
| 3 | MMA (400 eq) | | BNI | 8000/20/0/80 | toluene 25 wt % |
| 4 | MMA (400 eq) | | BNI/PMDETA | 8000/20/0/(80/5) | toluene 25 wt % |
| 5 | MMA (800 eq) | | BNI | 8000/10/0/80 | toluene 25 wt % |
| 6 | MMA (800 eq) | V65 | BNI | 8000/10/5/80 | toluene 25 wt % |
| 7 | MMA (800 eq) | V70 | BNI | 8000/10/5/80 | MFDG 25 wt % |
| 8 | MMA (1600 eq) | | BNI | 8000/5/0/80 | toluene 25 wt % |

TABLE 7B

| entry | T (° C.) | t (min) | conv (%) | $M_n$ | $M_{n,theo}$ | PDI |
|---|---|---|---|---|---|---|
| 1 | 70 | 120 | 38.3 | 4200 | 3800 | 1.16 |
|   |    | 300 | 63.5 | 6700 | 6400 | 1.13 |
| 2 | 60 | 300 | 31.0 | 12000 | 12000 | 1.20 |
|   |    | 1440 | 71.9 | 27000 | 29000 | 1.23 |
| 3 | 60 | 300 | 20.3 | 8300 | 8100 | 1.23 |
|   |    | 1440 | 57.1 | 21000 | 23000 | 1.18 |
|   |    | 47 h | 66.6 | 24000 | 27000 | 1.26 |
| 4 | 60 | 300 | 21.9 | 11000 | 8800 | 1.19 |
|   |    | 1440 | 79.8 | 50000 | 64000 | 1.31 |
| 5 | 60 | 300 | 14.6 | 12000 | 12000 | 1.25 |
|   |    | 1440 | 41.8 | 33000 | 34000 | 1.21 |
|   |    | 47 h | 52.5 | 38000 | 42000 | 1.27 |
| 6 | 60 | 300 | 79.9 | 37000 | 64000 | 1.44 |
|   |    | 1440 | 100.0 | 57000 | 80000 | 1.37 |
| 7 | 40 | 1440 | 99.1 | 70000 | 79000 | 1.32 |
| 8 | 60 | 300 | 10.7 | 19000 | 17000 | 1.39 |
|   |    | 1440 | 33.3 | 52000 | 53000 | 1.22 |
|   |    | 47 h | 42.7 | 62000 | 68000 | 1.26 |

Monomer: methyl methacrylate (MMA)
Monomer concentration was 8 M when no solvent was used, and 6 M when the concentration of the solvent was 25%.
Alkyl halide to be used as a dormant species ((R-I)): 2-cyanopropyl iodide (CP-I)
Radical initiator (In) (which was used in some experiments): V65 (azobis(2,4-dimethylvaleronitrile)), V70 (2,2'-azobis(4-methoxy-2,4-dimethylvaleronitrile)).
Catalyst: BNI (tetrabutylammonium iodide), PMDETA (N,N,N',N'',N''-pentamethyldiethylenetriamine, which is a catalyst disclosed in Patent Document 5)
Solvent (which was used in some experiments): toluene, MFDG (dipropylene glycol monomethyl ether)
$M_n$ and PDI: Molecular weight and polydispersity obtained by gel permeation chromatography (GPC) with tetrahydrofuran (THF) as an eluent calibrated by polymethyl methacrylate (PMMA) standard.

Example 4

[Polymerization of methyl methacrylate (MMA) Using PPI]

PPI (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

TABLE 8A

| entry | monomer | catalyst | [M]$_0$/[CP-I]$_0$/[catalyst]$_0$ (mM) |
|---|---|---|---|
| 1 | MMA (100 eq) | PPI | 8000/80/160 |

TABLE 8B

| entry | T (° C.) | t (min) | conv (%) | $M_n$ | $M_{n,theo}$ | PDI |
|---|---|---|---|---|---|---|
| 1 | 70 | 1440 | 39.1 | 5000 | 3900 | 1.49 |

Monomer: methyl methacrylate (MMA)
Monomer concentration: 8 M (bulk)
Alkyl halide to be used as a dormant species ((R-I)): 2-cyanopropyl iodide (CP-I)
Radical initiator (In) was not used.
Catalyst: PPI (tetraphenylphosphonium iodide)
$M_n$ and PDI: Molecular weight and polydispersity obtained by gel permeation chromatography (GPC) with tetrahydrofuran (THF) as an eluent calibrated by polymethyl methacrylate (PMMA) standard.

Example 5

[Polymerization of methyl methacrylate (MMA) Using BSI]

BSI (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

TABLE 9A

| entry | monomer | catalyst | [M]$_0$/[CP-I]$_0$/[catalyst]$_0$ (mM) |
|---|---|---|---|
| 1 | MMA (100 eq) | BSI | 8000/80/160 |

TABLE 9B

| entry | T (° C.) | t (min) | conv (%) | $M_n$ | $M_{n,theo}$ | PDI |
|---|---|---|---|---|---|---|
| 1 | 70 | 300 | 6.3 | 2300 | 640 | 1.27 |

Monomer: methyl methacrylate (MMA)
Monomer concentration: 8 M (bulk)
Alkyl halide to be used as a dormant species ((R-I)): 2-cyanopropyl iodide (CP-I)
Radical initiator (In) was not used.
Catalyst: BSI (tributylsulfonium iodide)
$M_n$ and PDI: Molecular weight and polydispersity obtained by gel permeation chromatography (GPC) with tetrahydrofuran (THF) as an eluent calibrated by polymethyl methacrylate (PMMA) standard.

Example 6

[Polymerization of methyl methacrylate (MMA) Using ENI]

ENI (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

TABLE 10A

| entry | monomer | catalyst | $[M]_0/[CP-I]_0/[catalyst]_0$ (mM) |
|---|---|---|---|
| 1 | MMA (100 eq) | ENI | 8000/80/20 |

TABLE 10B

| entry | T (°C.) | t (min) | conv (%) | $M_n$ | $M_{n,theo}$ | PDI |
|---|---|---|---|---|---|---|
| 1 | 90 | 240 | 39.2 | 5300 | 3900 | 1.37 |

Monomer: methyl methacrylate (MMA)
Monomer concentration: 8 M (bulk)
Alkyl halide to be used as a dormant species ((R-I)): 2-cyanopropyl iodide (CP-I)
Catalyst: ENI (tetraethylammonium iodide).
Radical initiator (In) was not used.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 7

[Polymerization of Methyl Methacrylate (MMA) Using PII]

PII (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

TABLE 11A

| entry | monomer | catalyst | $[M]_0/[CP-I]_0/[catalyst]_0$ (mM) |
|---|---|---|---|
| 1 | MMA (100 eq) | PII | 8000/80/80 |

TABLE 11B

| entry | T (°C.) | t (min) | conv (%) | $M_n$ | $M_{n,theo}$ | PDI |
|---|---|---|---|---|---|---|
| 1 | 90 | 300 | 13.3 | 1300 | 1300 | 1.49 |

Monomer: methyl methacrylate (MMA)
Monomer concentration: 8 M (bulk)
Alkyl halide to be used as a dormant species ((R-I)): 2-cyanopropyl iodide (CP-I)
Catalyst: PII (diphenyliodonium iodide).
Radical initiator (In) was not used.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 8

[Polymerization of methyl methacrylate (MMA) Using CMPI]

CMPI (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

TABLE 12A

| entry | monomer | catalyst | $[M]_0/[CP-I]_0/[catalyst]_0$ (mM) |
|---|---|---|---|
| 1 | MMA (100 eq) | CMPI | 8000/80/160 |

TABLE 12B

| entry | T (°C.) | t (min) | conv (%) | $M_n$ | $M_{n,theo}$ | PDI |
|---|---|---|---|---|---|---|
| 1 | 70 | 300 | 24.4 | 3100 | 2400 | 1.36 |

Monomer: methyl methacrylate (MMA)
Monomer concentration: 8 M (bulk)
Alkyl halide to be used as a dormant species ((R-I)): 2-cyanopropyl iodide (CP-I)
Catalyst: CMPI (2-chloro-1-methylpyridinium iodide).
Radical initiator (In) was not used.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 9

[Polymerization of methyl methacrylate (MMA) Using BNBrI$_2$]

BNBrI$_2$ (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

TABLE 13A

| entry | monomer | In | catalyst | $[M]_0/[CP-I]_0/[In]_0/[catalyst]_0$ (mM) | solvent |
|---|---|---|---|---|---|
| 1 | MMA (100 eq) | AIBN | BNBrI$_2$ | 8000/80/40/80 | toluene 25% |
| 2 | MMA (100 eq) | AIBN | BNBrI$_2$ | 8000/80/40/10 | toluene 25% |

TABLE 13B

| entry | T (°C.) | t (min) | conv (%) | $M_n$ | $M_{n,theo}$ | PDI |
|---|---|---|---|---|---|---|
| 1 | 60 | 1440 | 30.9 | 4200 | 3100 | 1.25 |
| 2 | 60 | 180 | 36.5 | 3900 | 3700 | 1.37 |

Monomer: methyl methacrylate (MMA)
Monomer concentration was 8 M when no solvent was used, and 6 M when the concentration of the solvent was 25%.

Alkyl halide to be used as a dormant species ((R-I)): 2-cyanopropyl iodide (CP-I)
Catalyst: BNBrI$_2$ (tetrabutylammonium bromodiiodide).
Radical initiator (In): AIBN (azobisisobutyronitrile).
Solvent: toluene
$M_n$ and PDI: Molecular weight and polydispersity obtained by gel permeation chromatography (GPC) with tetrahydrofuran (THF) as an eluent calibrated by polymethyl methacrylate (PMMA) standard.

Example 10

[Polymerization of methyl methacrylate (MMA) Using BNI$_3$]

BNI$_3$ (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

In entry 1, it was aimed that a 100-mer is formed when the conversion ratio is 100%.

In entry 2, the amount of a radical initiator AIBN was reduced.

In entry 3, the temperature was decreased to 65° C., and V65 which has a higher decomposition rate than AIBN was used.

In entry 4, it was aimed that a 400-mer is formed when the conversion ratio is 100%.

In entry 5, the temperature was decreased to 40° C., and V70 having a higher decomposition rate than V65 was used as a radical initiator. MFDG was used as a solvent.

In entry 6, the catalyst was combined with a catalyst TBP.

In entry 7, it was aimed that an 800-mer is formed when the conversion ratio is 100%. A solvent was used in an amount of 25%.

In entry 8, the temperature was decreased to 40° C., and V70 having a higher decomposition rate than V65 was used as a radical initiator. MFDG was used as a solvent.

In entry 9, the catalyst was combined with TBP.

TABLE 14A

| entry | monomer | In | catalyst | [M]$_0$/[CP-I]$_0$/[In]$_0$/[catalyst]$_0$ (mM) | solvent |
|---|---|---|---|---|---|
| 1 | MMA (100 eq) | AIBN | BNI$_3$ | 8000/80/40/1 | — |
| 2 | MMA (100 eq) | AIBN | BNI$_3$ | 8000/80/20/1 | — |
| 3 | MMA (100 eq) | V65 | BNI$_3$ | 8000/80/20/1 | — |
| 4 | MMA (400 eq) | V65 | BNI$_3$ | 8000/20/5/1 | toluene 25 wt % |
| 5 | MMA (400 eq) | V70 | BNI$_3$ | 8000/20/10/1 | MFDG50 wt % |
| 6 | MMA (400 eq) | V70 | TBP/BNI$_3$ | 8000/20/10/(40/1) | MFDG 50 wt % |
| 7 | MMA (800 eq) | V65 | BNI$_3$ | 8000/10/5/1 | toluene 25 wt % |
| 8 | MMA (800 eq) | V70 | BNI$_3$ | 8000/10/5/1 | MFDG 50 wt % |
| 9 | MMA (800 eq) | V70 | TBP/BNI$_3$ | 8000/10/5/(20/1) | MFDG 50 wt % |

TABLE 14B

| entry | T (° C.) | t (min) | conv (%) | $M_n$ | $M_{n,theo}$ | PDI |
|---|---|---|---|---|---|---|
| 1 | 80 | 60 | 87.2 | 7200 | 8700 | 1.34 |
| 2 | 80 | 60 | 50.4 | 5200 | 5000 | 1.18 |
|   |   | 180 | 91.1 | 9900 | 9100 | 1.27 |
| 3 | 65 | 60 | 63.2 | 4500 | 6300 | 1.18 |
|   |   | 120 | 93.1 | 8100 | 9300 | 1.27 |
| 4 | 65 | 300 | 64.9 | 21000 | 26000 | 1.23 |
|   |   | 600 | 94.1 | 30000 | 38000 | 1.22 |
| 5 | 40 | 300 | 40.5 | 15000 | 16000 | 1.39 |
|   |   | 600 | 74.0 | 24000 | 30000 | 1.28 |
| 6 | 40 | 300 | 43.2 | 18000 | 17000 | 1.30 |
|   |   | 600 | 79.6 | 30000 | 32000 | 1.26 |
| 7 | 65 | 300 | 69.9 | 41000 | 56000 | 1.40 |
|   |   | 600 | 100.0 | 57000 | 80000 | 1.34 |
| 8 | 40 | 300 | 23.1 | 16000 | 18000 | 1.31 |
|   |   | 600 | 69.3 | 39000 | 55000 | 1.24 |
| 9 | 40 | 320 | 34.6 | 31000 | 28000 | 1.35 |
|   |   | 664 | 69.9 | 54000 | 56000 | 1.29 |

Monomer: methyl methacrylate (MMA)
Monomer concentration was 8 M when no solvent was used, 6 M when the concentration of the solvent was 25%, and 4 M when the concentration of the solvent was 50%.
Alkyl halide to be used as a dormant species ((R-I)): 2-cyanopropyl iodide (CP-I)
Catalyst: BNI$_3$ (tetrabutylammonium triiodide), TBP (tributylphosphine, which is a catalyst disclosed in Patent Document 5).
Radical initiator (In): AIBN (azobisisobutyronitrile), V65 (azobis(2,4-dimethylvaleronitrile)), V70 (2,2'-azobis(4-methoxy-2,4-dimethylvaleronitrile)).
Solvent (which was used in some experiments): toluene, MFDG (dipropylene glycol monomethyl ether).
$M_n$ and PDI: Molecular weight and polydispersity obtained by gel permeation chromatography (GPC) with tetrahydrofuran (THF) as an eluent calibrated by polymethyl methacrylate (PMMA) standard.

Example 11

[Polymerization of methyl methacrylate (MMA) Using PPNCl]

PPNCl (the chemical structural formula is as described above) was used in place of BMPI. Polymerization of methyl methacrylate (MMA) was carried out in the same manner as in Example 1 except that the reaction materials and reaction conditions were changed as shown in the following tables. The results are shown in the following tables.

In entry 2, the temperature was raised to 80° C. and an experiment was performed.

TABLE 15A

| entry | monomer | catalyst | [M]$_0$/[CP-I]$_0$/[catalyst]$_0$ (mM) |
|---|---|---|---|
| 1 | MMA (100 eq) | PPNCl | 8000/80/80 |
| 2 | MMA (100 eq) | PPNCl | 8000/80/80 |

TABLE 15B

| entry | T (°C.) | t (min) | conv (%) | $M_n$ | $M_{n,theo}$ | PDI |
|---|---|---|---|---|---|---|
| 1 | 60 | 300 | 18.0 | 2700 | 1800 | 1.26 |
|   |    | 1380 | 46.8 | 7200 | 4700 | 1.29 |
| 2 | 80 | 300 | 33.6 | 6800 | 3400 | 1.34 |

Monomer: methyl methacrylate (MMA)
Monomer concentration: 8 M (bulk)
Alkyl halide to be used as a dormant species (R-I): 2-cyanopropyl iodide (CP-I)
Catalyst: PPNCl (hexaphenyldiphosphazenium chloride).
Radical initiator (In) was not used.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 12

[Polymerization of methyl methacrylate (MMA) Using Iodine]

Iodine and a radical initiator were used to generate alkyl halide (a dormant species) in the reaction solution. Alkyl iodide was generated in situ during polymerization, and without isolation, directly the polymerization was allowed to proceed. Polymerization of methyl methacrylate (MMA) was carried out in the same manner as in Example 1 except that the reaction materials and reaction conditions were changed as shown in the following tables. The results are shown in the following tables. It should be noted that $M_{n,theo}$ denotes a theoretical value on the assumption that alkyl iodide is quantitatively formed from the loaded iodine, and it is a value obtained by replacing $[(R\text{-}I)]_0$ in the above-described numerical formula [Numerical formula 1] with $2[I_2]_0$.

The respective aims in the experiments are as described in the following.

In entry 1, it was aimed that a 200-mer is formed when the conversion ratio is 100%.
In entry 2, the amount of AIBN was reduced.
In entry 3, a solvent was used in an amount of 25%. The temperature was decreased to 60° C., and V65 which has a higher decomposition rate than AIBN was used as a radical initiator.
In entry 4, the temperature was decreased to 40° C., and V70 having a higher decomposition rate than V65 was used as a radical initiator.
In entry 5, a solvent was used in an amount of 50%.
In entry 6, the temperature was decreased to 60° C., and V65 which has a higher decomposition rate than AIBN was used as a radical initiator.
In entry 7, the amount of the catalyst BMPI was increased.
In entry 8, the amount of V65 was increased.
In entry 9, it was aimed that a 400-mer is formed when the conversion ratio is 100%.
In entry 10, the temperature was decreased to 60° C., and V65 which has a higher decomposition rate than AIBN was used as a radical initiator.
In entry 11, the amount of V65 was reduced.
In entry 12, the amount of V65 was further reduced.
In entry 13, the amount of the catalyst BMPI was reduced.
In entry 14, it was aimed that an 800-mer is formed when the conversion ratio is 100%.
In entry 15, the amount of V65 was reduced.
In entry 16, BNI was used as a catalyst. It was aimed that a 200-mer is formed when the conversion ratio is 100%.
In entry 17, it was aimed that a 400-mer is formed when the conversion ratio is 100%.
In entry 18, the amount of V65 was reduced.
In entry 19, it was aimed that an 800-mer is formed when the conversion ratio is 100%.

TABLE 16A

| entry | monomer | R-X | In | XA | $[M]_0/[R\text{-}XI]_0/[In]_0/[catalyst]_0$ (mM) | solvent |
|---|---|---|---|---|---|---|
| 1 | MMA (200 eq) | $I_2$ | AIBN | BMPI | 8000/20/80/5 | — |
| 2 | MMA (200 eq) | $I_2$ | AIBN | BMPI | 8000/20/40/5 | — |
| 3 | MMA (200 eq) | $I_2$ | V65 | BMPI | 8000/20/50/80 | toluene 25 wt % |
| 4 | MMA (200 eq) | $I_2$ | V70 | BMPI | 8000/20/40/80 | toluene 25 wt % |
| 5 | MMA (200 eq) | $I_2$ | AIBN | BMPI | 8000/20/40/10 | toluene 50 wt % |
| 6 | MMA (200 eq) | $I_2$ | V65 | BMPI | 8000/20/40/10 | toluene 50 wt % |
| 7 | MMA (200 eq) | $I_2$ | V65 | BMPI | 8000/20/40/80 | toluene 50 wt % |
| 8 | MMA (200 eq) | $I_2$ | V65 | BMPI | 8000/20/60/80 | toluene 50 wt % |
| 9 | MMA (400 eq) | $I_2$ | AIBN | BMPI | 8000/10/25/10 | toluene 50 wt % |
| 10 | MMA (400 eq) | $I_2$ | V65 | BMPI | 8000/10/30/80 | toluene 50 wt % |
| 11 | MMA (400 eq) | $I_2$ | V65 | BMPI | 8000/10/25/80 | toluene 50 wt % |
| 12 | MMA (400 eq) | $I_2$ | V65 | BMPI | 8000/10/20/80 | toluene 50 wt % |
| 13 | MMA (400 eq) | $I_2$ | V65 | BMPI | 8000/10/20/10 | toluene 50 wt % |
| 14 | MMA (800 eq) | $I_2$ | V65 | BMPI | 8000/5/15/80 | toluene 50 wt % |
| 15 | MMA (800 eq) | $I_2$ | V65 | BMPI | 8000/5/10/80 | toluene 50 wt % |
| 16 | MMA (200 eq) | $I_2$ | V65 | BNI | 8000/20/40/40 | toluene 50 wt % |
| 17 | MMA (400 eq) | $I_2$ | V65 | BNI | 8000/10/25/40 | toluene 50 wt % |
| 18 | MMA (400 eq) | $I_2$ | V65 | BNI | 8000/10/20/40 | toluene 50 wt % |
| 19 | MMA (800 eq) | $I_2$ | V65 | BNI | 8000/5/10/40 | toluene 50 wt % |

TABLE 16B

| entry | T (°C.) | t (min) | conv (%) | $M_n$ | $M_{n,theo}$ | PDI |
|---|---|---|---|---|---|---|
| 1 | 80 | 70 | 27.4 | 5600 | 5500 | 1.31 |
|   |    | 100 | 86.6 | 13000 | 17000 | 1.46 |
| 2 | 80 | 210 | 48.7 | 10000 | 9800 | 1.23 |
|   |    | 240 | 93.1 | 19000 | 19000 | 1.45 |
| 3 | 60 | 210 | 36.1 | 8200 | 7200 | 1.12 |
|   |    | 330 | 97.7 | 17000 | 20000 | 1.17 |
| 4 | 40 | 390 | 30.9 | 6900 | 6200 | 1.11 |
|   |    | 1320 | 100.0 | 18000 | 20000 | 1.15 |
| 5 | 80 | 195 | 43.5 | 8000 | 8700 | 1.22 |
|   |    | 255 | 63.4 | 11000 | 13000 | 1.28 |
|   |    | 315 | 74.9 | 12000 | 15000 | 1.33 |
| 6 | 60 | 370 | 49.4 | 8200 | 9900 | 1.24 |
|   |    | 605 | 79.1 | 12000 | 16000 | 1.28 |
| 7 | 60 | 370 | 47.9 | 9200 | 9600 | 1.15 |
|   |    | 605 | 77.7 | 13000 | 16000 | 1.20 |

TABLE 16B-continued

| entry | T (° C.) | t (min) | conv (%) | $M_n$ | $M_{n,theo}$ | PDI |
|---|---|---|---|---|---|---|
| 8 | 60 | 190 | 31.7 | 6700 | 6400 | 1.18 |
|  |  | 280 | 60.9 | 10000 | 12000 | 1.30 |
|  |  | 370 | 75.5 | 12000 | 15000 | 1.34 |
| 9 | 80 | 140 | 34.3 | 11000 | 14000 | 1.40 |
|  |  | 200 | 59.5 | 17000 | 24000 | 1.44 |
|  |  | 260 | 71.2 | 20000 | 29000 | 1.46 |
| 10 | 60 | 165 | 20.1 | 8100 | 8000 | 1.15 |
|  |  | 225 | 37.9 | 13000 | 15000 | 1.27 |
|  |  | 285 | 53.7 | 15000 | 22000 | 1.33 |
| 11 | 60 | 420 | 59.5 | 18000 | 24000 | 1.29 |
|  |  | 1440 | 91.5 | 23000 | 37000 | 1.33 |
| 12 | 60 | 370 | 36.7 | 14000 | 15000 | 1.18 |
|  |  | 420 | 42.9 | 15000 | 17000 | 1.19 |
|  |  | 605 | 66.4 | 21000 | 27000 | 1.26 |
|  |  | 1440 | 84.9 | 24000 | 34000 | 1.26 |
| 13 | 60 | 370 | 37.7 | 12000 | 15000 | 1.28 |
|  |  | 605 | 70.2 | 20000 | 28000 | 1.35 |
| 14 | 60 | 165 | 13.1 | 11000 | 10000 | 1.17 |
|  |  | 225 | 27.6 | 19000 | 22000 | 1.33 |
|  |  | 285 | 41.5 | 24000 | 33000 | 1.39 |
|  |  | 420 | 60.4 | 29000 | 48000 | 1.46 |
|  |  | 1440 | 91.5 | 36000 | 73000 | 1.45 |
| 15 | 60 | 420 | 37.8 | 25000 | 30000 | 1.26 |
|  |  | 1440 | 76.9 | 40000 | 62000 | 1.30 |
| 16 | 60 | 420 | 59.4 | 9500 | 12000 | 1.20 |
|  |  | 1440 | 96.9 | 14000 | 19000 | 1.25 |
| 17 | 60 | 360 | 56.1 | 17000 | 22000 | 1.32 |
|  |  | 800 | 90.3 | 23000 | 36000 | 1.38 |
| 18 | 60 | 420 | 47.9 | 14000 | 19000 | 1.31 |
|  |  | 1440 | 85.9 | 26000 | 34000 | 1.24 |
| 19 | 60 | 420 | 35.4 | 25000 | 28000 | 1.25 |
|  |  | 1440 | 83.4 | 40000 | 67000 | 1.36 |

Monomer: methyl methacrylate (MMA)
Monomer concentration was 8 M when no solvent was used, 6 M when the concentration of the solvent was 25%, and 4 M when the concentration of the solvent was 50%.
Alkyl halide to be used as a dormant species ((R-I)): an organic halide was generated by a reaction of an azo-type radical initiator with iodine ($I_2$) in the reaction solution, and the organic halide was used as a dormant species in this polymerization method.
Catalyst: BMPI (methyltributylphosphonium iodide), BNI (tetrabutylammonium iodide).
Radical initiator (In): AIBN (azobisisobutyronitrile), V65 (azobis(2,4-dimethylvaleronitrile)), V70 (2,2'-azobis(4-methoxy-2,4-dimethylvaleronitrile)).

Solvent (which was used in some experiments): toluene.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 13

[Polymerization of n-butyl acrylate (BA)]
Polymerization was carried out in the same manner as in Example 1 except that the reaction materials and reaction conditions were changed as shown in the following tables. The results are shown in the following tables.

By utilizing high activity of BMPI or BNI, the polymerization of BA was successfully controlled. For example, when an amine compound reported in the above-described Patent Document 5 was used as a catalyst, it was difficult to obtain a PDI value of 1.5 or less. However, in cases of BMPI and BNI, PDI values less than 1.5 were obtained. From this, regarding BMPI and BNI, it was confirmed that the activation rate constant is sufficiently large and they have high capability of keeping the balance of equilibrium during the polymerization reaction in a preferable state.

The respective aims in the experiments are as described in the following.

In entry 1, it was aimed that a 100-mer is formed when the conversion ratio is 100%.
In entry 2, DMDG was used as a solvent.
In entry 3, radical initiators, BPB and DAP, were further added in order to increase the polymerization rate.
In entry 4, the catalyst was combined with the catalyst BNI of the present invention.
In entry 5, the catalyst was combined with a catalyst TBA.
In entry 6, the amount of the catalyst BMPI was reduced.
In entry 7, a solvent was used at 25%.
In entry 8, a polymer having a molecular weight more than 10000 was synthesized.
In entry 9 to entry 12, the type of catalyst was changed.
In entry 13, the temperature was decreased to 110° C. BMPI was used as a catalyst.
In entry 14, the catalyst was combined with a catalyst TBA.
In entry 15, a catalyst was changed to BNI.
In entry 16, the amount of a catalyst BNI was reduced.
In entry 17, radical initiators, BPB and DAP, were added in order to increase the polymerization rate.
In entry 18, the catalyst was combined with a catalyst TBA.
In entry 19, the catalyst was combined with a catalyst TBP.

TABLE 17A

| entry | monomer | R-X | In | catalyst | $[M]_0/[R-X]_0/[In]_0/[catalyst]_0$ (mM) | solvent |
|---|---|---|---|---|---|---|
| 1 | BA(100 eq) | CPI |  | BMPI | 8000/80/0/160 | tBB50 wt % |
| 2 | BA(100 eq) | CPI |  | BMPI | 8000/80/0/160 | DMDG50 wt % |
| 3 | BA(100 eq) | CPI | BPB/DAP | BMPI | 8000/80/0/(2/5)/160 | tBB50 wt % |
| 4 | BA(100 eq) | CPI |  | BMPI/BNI | 8000/80/0/(160/40) | tBB50 wt % |
| 5 | BA(100 eq) | CPI |  | BMPI/TBA | 8000/80/0/(160/5) | tBB50 wt % |
| 6 | BA(100 eq) | CPI |  | BMPI/TBA | 8000/80/0/(40/5) | tBB50 wt % |
| 7 | BA(100 eq) | CPI |  | BMPI/TBA | 8000/80/0/(160/5) | tBB25 wt % |
| 8 | BA(400 eq) | CPI |  | BMPI | 8000/20/0/160 | tBB50 wt % |
| 9 | BA(100 eq) | CPI |  | EMIZI | 8000/80/0/160 | tBB50 wt % |
| 10 | BA(100 eq) | CPI |  | EMIZBr | 8000/80/0/160 | tBB50 wt % |
| 11 | BA(100 eq) | CPI |  | BNI | 8000/80/0/160 | tBB50 wt % |
| 12 | BA(100 eq) | CPI |  | PPI | 8000/80/0/160 | tBB50 wt % |
| 13 | BA(100 eq) | CPI |  | BMPI | 8000/80/0/320 | — |
| 14 | BA(100 eq) | CPI |  | BMPI/TBA | 8000/80/0/(320/5) | — |
| 15 | BA(100 eq) | CPI |  | BNI | 8000/80/0/320 | — |
| 16 | BA(100 eq) | CPI |  | BNI | 8000/80/0/80 | — |
| 17 | BA(100 eq) | CPI | BPB/DAP | BNI | 8000/80/0/(2/5)/80 | — |
| 18 | BA(100 eq) | CPI |  | BNI/TBA | 8000/80/0/(320/5) | — |
| 19 | BA(100 eq) | CPI |  | BNI/TBP | 8000/80/0/(320/40) | — |

TABLE 17B

| entry | T (° C.) | t (min) | conv (%) | $M_n$ | $M_{n,theo}$ | PDI |
|---|---|---|---|---|---|---|
| 1 | 120 | 300 | 18.5 | 4200 | 2400 | 1.26 |
|   |   | 1440 | 46.7 | 6700 | 6000 | 1.22 |
|   |   | 48 h | 66.3 | 7200 | 8500 | 1.32 |
| 2 | 120 | 1440 | 28.4 | 4600 | 3600 | 1.15 |
| 3 | 120 | 1440 | 61.1 | 7600 | 7800 | 1.29 |
| 4 | 120 | 300 | 20.4 | 4700 | 2600 | 1.27 |
|   |   | 1450 | 66.3 | 7900 | 8500 | 1.41 |
| 5 | 120 | 300 | 20.6 | 4300 | 2600 | 1.30 |
|   |   | 1440 | 55.9 | 6900 | 7200 | 1.38 |
|   |   | 48 h | 75.9 | 8500 | 9700 | 1.44 |
| 6 | 120 | 1440 | 43.3 | 5100 | 5500 | 1.25 |
|   |   | 48 h | 56.3 | 6500 | 7200 | 1.23 |
| 7 | 120 | 1385 | 52.7 | 7200 | 6700 | 1.22 |
|   |   | 48 h | 67.7 | 7800 | 8700 | 1.29 |
| 8 | 120 | 1440 | 29.9 | 15000 | 15000 | 1.41 |
| 9 | 120 | 1440 | 25.5 | 3000 | 3300 | 1.45 |
| 10 | 120 | 300 | 16.9 | 2900 | 2200 | 1.45 |
| 11 | 120 | 300 | 29.6 | 4500 | 3800 | 1.41 |
| 12 | 120 | 1440 | 17.6 | 2100 | 2300 | 1.43 |
| 13 | 110 | 48 h | 58.3 | 7700 | 7500 | 1.24 |
| 14 | 110 | 300 | 19.0 | 5300 | 2400 | 1.25 |
|   |   | 1320 | 62.6 | 7000 | 8000 | 1.33 |
| 15 | 110 | 300 | 38.4 | 4500 | 4900 | 1.18 |
|   |   | 1080 | 74.3 | 10000 | 9500 | 1.34 |
|   |   | 1440 | 90.4 | 11000 | 12000 | 1.40 |
| 16 | 110 | 300 | 21.7 | 2700 | 2800 | 1.24 |
|   |   | 1440 | 50.6 | 6700 | 6500 | 1.18 |
| 17 | 110 | 300 | 19.0 | 2600 | 2400 | 1.20 |
|   |   | 1440 | 80.2 | 7700 | 10000 | 1.20 |
| 18 | 110 | 300 | 24.9 | 5900 | 3200 | 1.25 |
|   |   | 1440 | 81.8 | 15000 | 10000 | 1.34 |
| 19 | 110 | 300 | 33.3 | 6300 | 4300 | 1.41 |
|   |   | 600 | 52.4 | 8600 | 6700 | 1.36 |

Monomer: n-butyl acrylate (BA)

Monomer concentration was 8 M when no solvent was used, 6 M when the concentration of the solvent was 25%, and 4 M when the concentration of the solvent was 50%.

Alkyl halide to be used as a dormant species ((R-I)): 2-cyanopropyl iodide (CP-I)

Catalyst: BMPI (methyltributylphosphonium iodide), EMIZI (1-ethyl-3-methylimidazolium iodide), EMIZBr (1-ethyl-3-methylimidazolium bromide), BNI (tetrabutylammonium iodide), PPI (tetraphenylphosphonium iodide), TBA (tributylamine, which is a catalyst disclosed in Patent Document 5), TBP (tributylphosphine, which is a catalyst disclosed in Patent Document 5).

Radical initiator (In) (which was used in some experiments): BPB (tert-butyl perbenzoate), DAP (di-tert-amyl peroxide).

Solvent: tBB (tert-butyl benzene), DMDG (dimethyl diglycol)

$M_n$ and PDI: Molecular weight and polydispersity determined by multi-angle laser light scattering (MALLS) detector with gel permeation chromatography (GPC) with tetrahydrofuran (THF) as an eluent.

Example 14

[Homopolymerization of 2-hydroxyethyl methacrylate (HEMA)]

Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%.

In entry 2, a catalyst was changed to $BNI_3$, and a radical initiator V70 was added. The temperature was decreased to 40° C.

In entry 3, the amounts of a catalyst $BNI_3$ and a radical initiator V70 were reduced.

In entry 4, ethanol was added as a solvent.

In entry 5, the amounts of a catalyst $BNI_3$ and a radical initiator V70 were reduced.

In entry 6, it was aimed that a 400-mer is formed when the conversion ratio is 100%.

TABLE 18A

| entry | monomer | R-X | In | catalyst | $[M]_0/[R-X]_0/[In]/[catalyst]_0$(mM) | solvent |
|---|---|---|---|---|---|---|
| 1 | HEMA (100 eq) | CPI | — | BMPI | 8000/80/0/80 | — |
| 2 | HEMA (100 eq) | CPI | V70 | $BNI_3$ | 8000/80/20/3 | — |
| 3 | HEMA (100 eq) | CPI | V70 | $BNI_3$ | 8000/80/10/1 | — |
| 4 | HEMA (100 eq) | CPI | V70 | $BNI_3$ | 8000/80/20/3 | ethanol 5 wt % |
| 5 | HEMA (100 eq) | CPI | V70 | $BNI_3$ | 8000/80/10/1 | ethanol 5 wt % |
| 6 | HEMA (400 eq) | CPI | V70 | $BNI_3$ | 8000/20/20/4 | — |

TABLE 18B

| entry | T (° C.) | t (min) | conv (%) | $M_n$ | $M_{n,theo}$ | PDI |
|---|---|---|---|---|---|---|
| 1 | 80 | 300 | 29.3 | 8700 | 1700 | 1.34 |
| 2 | 50 | 300 | 40.0 | 9300 | 2300 | 1.38 |
| 3 | 80 | 300 | 29.5 | 8600 | 1700 | 1.34 |
| 4 | 50 | 300 | 39.5 | 9200 | 2300 | 1.38 |
| 5 | 50 | 300 | 62.3 | 12000 | 7300 | 1.49 |

Monomer: 2-hydroxyethyl methacrylate (HEMA)

Monomer concentration was 8 M when no solvent was used, and 7.6 M when the concentration of the solvent was 5%.

Alkyl halide to be used as a dormant species ((R-I)): 2-cyanopropyl iodide (CP-I)

Catalyst: BMPI (methyltributylphosphonium iodide), $BNI_3$ (tetrabutylammonium triiodide).

Radical initiator (In) (which was used in some experiments): V70 (2,2'-azobis(4-methoxy-2,4-dimethylvaleronitrile)).

Solvent: ethanol $M_n$ and PDI: Molecular weight and polydispersity determined by multi-angle laser light scattering (MALLS)

detector with gel permeation chromatography (GPC) with dimethylformamide (DMF) as an eluent.

Example 15

[Random Copolymerization of 2-hydroxyethyl methacrylate (HEMA) and styrene (St)]

Polymerization was carried out in the same manner as in Example 1 except that the reaction materials and reaction conditions were changed as shown in the following tables. The results are shown in the following tables.

The respective aims in the experiments are as described in the following.

In entry 1, random copolymerization of HEMA and styrene was performed.
In entry 2, the temperature was decreased.
In entry 3, BMPI was used as a catalyst.
In entry 4, the temperature was decreased.
In entry 5, a polymer having a high molecular weight was synthesized.

TABLE 19A

| entry | monomer | R-X | In | catalyst | $[M]_0/[R-X]_0/[In]_0/[catalyst]_0$ (mM) | solvent |
|---|---|---|---|---|---|---|
| 1 | HEMA/St(25/25 eq) | CPI | AIBN | EMIZI | (4000/4000)/160/80/20 | ethyl lactate 50 wt % |
| 2 | HEMA/St(25/25 eq) | CPI | V70 | EMIZI | (4000/4000)/160/80/20 | ethyl lactate 50 wt % |
| 3 | HEMA/St(25/25 eq) | CPI | AIBN | BMPI | (4000/4000)/160/80/20 | ethyl lactate 50 wt % |
| 4 | HEMA/St(25/25 eq) | CPI | V70 | BMPI | (4000/4000)/160/80/20 | ethyl lactate 50 wt % |
| 5 | HEMA/St(50/50 eq) | CPI | V70 | BMPI | (4000/4000)/80/80/80 | ethyl lactate 50 wt % |

TABLE 19B

| entry | T (° C.) | t (min) | conv (%) | $M_n$ | $M_{n,theo}$ | PDI |
|---|---|---|---|---|---|---|
| 1 | 80 | 300 | 29.3 | 8700 | 1700 | 1.34 |
| 2 | 50 | 300 | 40.0 | 9300 | 2300 | 1.38 |
| 3 | 80 | 300 | 29.5 | 8600 | 1700 | 1.34 |
| 4 | 50 | 300 | 39.5 | 9200 | 2300 | 1.38 |
| 5 | 50 | 300 | 62.3 | 12000 | 7300 | 1.49 |

Monomer: 2-hydroxyethyl methacrylate (HEMA), styrene (St).
Monomer concentration was 8 M when no solvent was used (HEMA 4 M and St 4 M), and 4 M when the concentration of the solvent was 50% (HEMA 2 M and St 2 M).
Alkyl halide to be used as a dormant species ((R-I)): 2-cyanopropyl iodide (CP-I)
Catalyst: BMPI (methyltributylphosphonium iodide), EMIZI (1-ethyl-3-methylimidazolium iodide).
Radical initiator (In) (which was used in some experiments): AIBN (azobisisobutyronitrile), V70 (2,2'-azobis(4-methoxy-2,4-dimethylvaleronitrile)).
Solvent: ethyl lactate.
$M_n$ and PDI: Molecular weight and polydispersity obtained by gel permeation chromatography (GPC) with dimethylformamide (DMF) as an eluent calibrated by polymethyl methacrylate (PMMA) standard.

Example 16

[Polymerization of lauryl acrylate (LA)]

Polymerization was carried out in the same manner as in Example 1 except that the reaction materials and reaction conditions were changed as shown in the following tables. The results are shown in the following tables.

TABLE 20A

| entry | monomer | R-X | In | catalyst | $[M]_0/[R-X]_0/[In]_0/[catalyst]_0$ (mM) |
|---|---|---|---|---|---|
| 1 | LA (100 eq) | CPI | | BMPI | 8000/80/0/160 |
| 2 | LA (100 eq) | CPI | BPB | BMPI | 8000/80/2/160 |
| 3 | LA (100 eq) | CPI | BPB | BMPI | 8000/80/2/5 |
| 4 | LA (100 eq) | CPI | BPB/DAP | BMPI | 8000/80/(2/5)/160 |
| 5 | LA (100 eq) | CPI | BPB/DAP | BMPI | 8000/80/(2/5)/80 |
| 6 | LA (100 eq) | CPI | BPB/DAP | BMPI | 8000/80/(2/5)/20 |
| 7 | LA (100 eq) | CPI | | BMPI/TBA | 8000/80/0/(160/5) |

TABLE 20B

| entry | T (° C.) | t (min) | conv (%) | $M_n$ | $M_{n,theo}$ | PDI |
|---|---|---|---|---|---|---|
| 1 | 120 | 300 | 24.7 | 6300 | 5900 | 1.40 |
|   |     | 1440 | 48.9 | 9700 | 1200 | 1.31 |
| 2 | 120 | 1410 | 35.5 | 7500 | 8500 | 1.24 |
| 3 | 120 | 1440 | 20.4 | 5400 | 4900 | 1.30 |
| 4 | 120 | 1440 | 62.6 | 12000 | 15000 | 1.37 |
| 5 | 120 | 1440 | 57.4 | 11000 | 14000 | 1.32 |
|   |     | 48 h | 78.4 | 13000 | 19000 | 1.35 |
| 6 | 120 | 1440 | 41.9 | 8600 | 10000 | 1.25 |
| 7 | 120 | 1440 | 62.0 | 12000 | 15000 | 1.49 |

Monomer: lauryl acrylate (LA)
Monomer concentration: 8 M (bulk)
Alkyl halide to be used as a dormant species ((R-I)): 2-cyanopropyl iodide (CP-I)
Catalyst: BMPI (methyltributylphosphonium iodide), TBA (tributylamine, which is a catalyst disclosed in Patent Document 5).
Radical initiator (In) (which was used in some experiments): BPB (tert-butyl perbenzoate), DAP (di-tert-amyl peroxide).
$M_n$ and PDI: Molecular weight and polydispersity determined by multi-angle laser light scattering (MALLS) detector with gel permeation chromatography (GPC) with tetrahydrofuran (THF) as an eluent.

Example 17

[Polymerization of lauryl methacrylate (LMA)]

Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%.

In entry 2, $I_2$ and AIBN were charged, and during polymerization, alkyl iodide generated in situ was used.

In entry 3, the amounts of the catalyst BMPI was reduced.

TABLE 21A

| entry | monomer | R-X | In | catalyst | $[M]_0/[R\text{-}X]_0/[In]_0/[catalyst]_0$(mM) | solvent |
|---|---|---|---|---|---|---|
| 1 | LMA(400 eq) | CPI | V65 | $BNI_3$ | 8000/20/5/1 | toluene 25 wt % |
| 2 | LMA(200 eq) | $I_2$ | AIBN | BMPI | 8000/20/80/5 | — |
| 3 | LMA(200 eq) | $I_2$ | AIBN | BMPI | 8000/20/80/1 | — |

TABLE 21B

| entry | T (°C.) | t (min) | conv (%) | $M_n$ | $M_{n,theo}$ | PDI |
|---|---|---|---|---|---|---|
| 1 | 65 | 180 | 40.1 | 25000 | 41000 | 1.16 |
|  |  | 360 | 66.5 | 40000 | 68000 | 1.18 |
|  |  | 600 | 70.9 | 42000 | 72000 | 1.18 |
| 2 | 80 | 145 | 70.4 | 48000 | 36000 | 1.11 |
|  |  | 175 | 93.0 | 58000 | 47000 | 1.12 |
|  |  | 235 | 100.0 | 58000 | 51000 | 1.13 |
| 3 | 80 | 220 | 97.7 | 68000 | 50000 | 1.36 |

Monomer: lauryl methacrylate (LMA)

Monomer concentration was 8 M when no solvent was used, and 6 M when the concentration of the solvent was 25%.

Alkyl halide to be used as a dormant species ((R-I)): CP-I (2-cyanopropyl iodide). Alternatively, an organic halide was generated by a reaction of an azo-type radical initiator with iodine ($I_2$) in the reaction solution, and the organic halide was used as a dormant species in this polymerization method.

Catalyst: $BNI_3$ (tetrabutylammonium triiodide), BMPI (methyltributylphosphonium iodide).

Radical initiator (In): V65 (azobis(2,4-dimethylvaleronitrile)), AIBN (azobisisobutyronitrile).

Solvent (which was used in some experiments): toluene $M_n$ and PDI: Molecular weight and polydispersity determined by multi-angle laser light scattering (MALLS) detector with gel permeation chromatography (GPC) with tetrahydrofuran (THF) as an eluent.

Example 18

[Polymerization of benzyl methacrylate (BzMA)]

Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%. A solvent was used at 25%.

In entry 2, the catalyst was combined with a catalyst PMDETA.

In entry 3, it was aimed that a 400-mer is formed when the conversion ratio is 100%.

In entry 4, a solvent was used at 25%.

In entry 5, the catalyst was combined with a catalyst PMDETA.

In entry 6, it was aimed that an 800-mer is formed when the conversion ratio is 100%.

In entry 7, a solvent was used at 25%.

In entry 8, it was aimed that a 1600-mer is formed when the conversion ratio is 100%.

In entry 9, a solvent was used at 25%.

In entry 10, $I_2$ and AIBN were charged, and during polymerization, alkyl iodide generated in situ was used. It was aimed that a 400-mer is formed when the conversion ratio is 100%.

In entry 11, a catalyst was changed to BNI.

In entry 12, the amount of a radical initiator V65 was reduced.

In entry 13, a radical initiator was changed to V70 having a higher decomposition rate than V65.

In entry 14, a catalyst was changed to BNI.

In entry 15, it was aimed that an 800-mer is formed when the conversion ratio is 100%.

TABLE 22A

| entry | monomer | R-X | In | catalyst | $[M]_0/[R\text{-}X]_0/[In]_0/[catalyst]_0$(mM) | solvent |
|---|---|---|---|---|---|---|
| 1 | BzMA (100 eq) | CPI |  | BMPI | 8000/80/0/80 | toluene 25 wt % |
| 2 | BzMA (100 eq) | CPI |  | BMPI/PMDETA | 8000/80/0/(80/20) | toluene 25 wt % |
| 3 | BzMA (400 eq) | CPI |  | BMPI | 8000/20/0/80 | — |
| 4 | BzMA (400 eq) | CPI |  | BMPI | 8000/20/0/80 | toluene 25 wt % |
| 5 | BzMA (400 eq) | CPI |  | BMPI/PMDETA | 8000/20/0/(80/20) | toluene 25 wt % |
| 6 | BzMA (800 eq) | CPI |  | BMPI | 8000/10/0/80 | — |
| 7 | BzMA (800 eq) | CPI |  | BMPI | 8000/10/0/80 | toluene 25 wt % |
| 8 | BzMA(1600eq) | CPI |  | BMPI | 8000/5/0/80 | — |
| 9 | BzMA(1600eq) | CPI |  | BMPI | 8000/5/0/80 | toluene 25 wt % |
| 10 | BzMA (400 eq) | $I_2$ | V65 | BMPI | 8000/10/25/80 | toluene 50 wt % |
| 11 | BzMA (400 eq) | $I_2$ | V65 | BNI | 8000/10/25/80 | toluene 50 wt % |
| 12 | BzMA (400 eq) | $I_2$ | V65 | BNI | 8000/10/20/80 | toluene 50 wt % |
| 13 | BzMA (400 eq) | $I_2$ | V70 | BMPI | 8000/10/20/80 | toluene 50 wt % |
| 14 | BzMA (400 eq) | $I_2$ | V70 | BNI | 8000/10/20/80 | toluene 50 wt % |
| 15 | BzMA (800 eq) | $I_2$ | V65 | BNI | 8000/5/10/80 | toluene 50 wt % |

TABLE 22B

| entry | T (°C.) | t (min) | conv (%) | $M_n$ | $M_{n,theo}$ | PDI |
|---|---|---|---|---|---|---|
| 1 | 60 | 120 | 15.9 | 5400 | 2800 | 1.31 |
|   |    | 240 | 35.6 | 6400 | 6300 | 1.37 |
|   |    | 480 | 56.3 | 9600 | 9900 | 1.20 |
| 2 | 60 | 300 | 37.7 | 7800 | 6600 | 1.27 |
|   |    | 1220 | 74.1 | 14000 | 13000 | 1.24 |
| 3 | 60 | 300 | 34.6 | 23000 | 24000 | 1.42 |
|   |    | 1380 | 65.8 | 37000 | 46000 | 1.36 |
| 4 | 60 | 300 | 23.0 | 16000 | 16000 | 1.33 |
|   |    | 1440 | 57.5 | 35000 | 41000 | 1.25 |
| 5 | 60 | 300 | 20.2 | 15000 | 14000 | 1.21 |
|   |    | 1220 | 75.9 | 53000 | 54000 | 1.30 |
| 6 | 60 | 300 | 26.9 | 34000 | 38000 | 1.37 |
|   |    | 1380 | 50.7 | 61000 | 71000 | 1.36 |
| 7 | 60 | 300 | 17.4 | 26000 | 25000 | 1.35 |
|   |    | 1440 | 48.8 | 61000 | 69000 | 1.27 |
| 8 | 60 | 300 | 19.8 | 51000 | 56000 | 1.34 |
|   |    | 1380 | 40.9 | 89000 | 120000 | 1.35 |
| 9 | 60 | 300 | 10.6 | 31000 | 30000 | 1.33 |
|   |    | 1440 | 34.9 | 81000 | 98000 | 1.33 |
| 10 | 60 | 300 | 36.0 | 25000 | 25000 | 1.27 |
|    |    | 580 | 71.8 | 33000 | 51000 | 1.46 |
| 11 | 60 | 300 | 39.2 | 25000 | 28000 | 1.33 |
|    |    | 580 | 72.5 | 33000 | 51000 | 1.45 |
| 12 | 60 | 300 | 13.2 | 9900 | 9300 | 1.15 |
|    |    | 1440 | 79.5 | 39000 | 56000 | 1.36 |
| 13 | 60 | 300 | 59.6 | 25000 | 42000 | 1.48 |
|    |    | 540 | 61.0 | 27000 | 43000 | 1.44 |
| 14 | 60 | 300 | 59.6 | 25000 | 42000 | 1.48 |
|    |    | 540 | 64.8 | 27000 | 46000 | 1.44 |
| 15 | 60 | 300 | 12.1 | 17000 | 17000 | 1.17 |
|    |    | 1440 | 74.3 | 69000 | 100000 | 1.39 |

Monomer: benzyl methacrylate (BzMA)
Monomer concentration was 8 M when no solvent was used, 6 M when the concentration of the solvent was 25%, and 4 M when the concentration of the solvent was 50%.
Alkyl halide to be used as a dormant species ((R-I)): CP-I (2-cyanopropyl iodide)). Alternatively, an organic halide was generated by a reaction of an azo-type radical initiator with iodine ($I_2$) in the reaction solution, and the organic halide was used as a dormant species in this polymerization method.
Catalyst: BMPI (methyltributylphosphonium iodide), PMDETA (N,N,N',N'',N''-pentamethyldiethylenetriamine, which is a catalyst disclosed in Patent Document 5), BNI (tetrabutylammonium iodide).
Radical initiator (In) (which was used in some experiments): V65 (azobis(2,4-dimethylvaleronitrile)), V70 (2,2'-azobis (4-methoxy-2,4-dimethylvaleronitrile)).
Solvent (which was used in some experiments): toluene $M_n$ and PDI: Molecular weight and polydispersity determined by multi-angle laser light scattering (MALLS) detector with gel permeation chromatography (GPC) with tetrahydrofuran (THF) as an eluent.

Example 19

[Polymerization of glycidyl methacrylate (GMA)]

Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%.

In entry 2, a solvent was used at 25%.

In entry 3, it was aimed that a 400-mer is formed when the conversion ratio is 100%.

In entry 4, a solvent was used at 25%.

In entry 5, the catalyst was combined with a catalyst TBA

In entry 6, it was aimed that an 800-mer is formed when the conversion ratio is 100%.

In entry 7, a solvent was used at 25%.

In entry 8, the catalyst was combined with a catalyst TBA.

In entry 9, it was aimed that a 1600-mer is formed when the conversion ratio is 100%.

In entry 10, a solvent was used at 25%.

In entry 11, a catalyst was changed to BNI. It was aimed that a 400-mer is formed when the conversion ratio is 100%.

In entry 12, it was aimed that an 800-mer is formed when the conversion ratio is 100%.

In entry 13, $I_2$ and V65 were charged, and during polymerization, alkyl iodide generated in situ was used. It was aimed that a 400-mer is formed when the conversion ratio is 100%.

In entry 14, it was aimed that an 800-mer is formed when the conversion ratio is 100%.

In entry 15, BMPI was used as a catalyst.

TABLE 23A

| entry | monomer | R-X | In | catalyst | $[M]_0/[R-X]_0/[In]_0/[catalyst]_0$(mM) | solvent |
|---|---|---|---|---|---|---|
| 1 | GMA (100eq) | CPI |  | BMPI | 8000/80/0/80 | — |
| 2 | GMA (100eq) | CPI |  | BMPI | 8000/80/0/80 | toluene 25 wt % |
| 3 | GMA (400eq) | CPI |  | BMPI | 8000/20/0/80 | — |
| 4 | GMA (400eq) | CPI |  | BMPI | 8000/20/0/80 | toluene 25 wt % |
| 5 | GMA (400eq) | CPI |  | BMPI/TBA | 8000/20/0/(80/40) | toluene 25 wt % |
| 6 | GMA (800eq) | CPI |  | BMPI | 8000/10/0/80 | — |
| 7 | GMA (800eq) | CPI |  | BMPI | 8000/10/0/80 | toluene 25 wt % |
| 8 | GMA (800eq) | CPI |  | BMPI/TBA | 8000/10/0/(80/40) | toluene 25 wt % |
| 9 | GMA(1600eq) | CPI |  | BMPI | 8000/5/0/80 | — |
| 10 | GMA(1600eq) | CPI |  | BMPI | 8000/5/0/80 | toluene 25 wt % |
| 11 | GMA (400 eq) | CPI |  | BNI | 8000/20/0/80 | toluene 25 wt % |
| 12 | GMA (800eq) | CPI |  | BNI | 8000/10/0/80 | toluene 25 wt % |
| 13 | GMA (400eq) | $I_2$ | V65 | BNI | 8000/10/30/80 | toluene 50 wt % |
| 14 | GMA (800eq) | $I_2$ | V65 | BNI | 8000/5/15/80 | toluene 50 wt % |
| 15 | GMA (400eq) | CPI | V65 | BMPI | 8000/20/5/1 | toluene 25 wt % |

TABLE 23B

| entry | T (°C.) | t (min) | conv (%) | $M_n$ | $M_{n,theo}$ | PDI |
|---|---|---|---|---|---|---|
| 1 | 60 | 120 | 64.3 | 9800 | 9100 | 1.35 |
|   |    | 240 | 87.8 | 12000 | 12000 | 1.34 |

TABLE 23B-continued

| entry | T (°C.) | t (min) | conv (%) | $M_n$ | $M_{n,theo}$ | PDI |
|---|---|---|---|---|---|---|
| 2 | 60 | 120 | 38.1 | 6900 | 5400 | 1.34 |
|   |    | 240 | 66.1 | 9000 | 9400 | 1.25 |
|   |    | 1320 | 96.1 | 13000 | 14000 | 1.24 |
| 3 | 60 | 240 | 66.9 | 33000 | 38000 | 1.32 |
|   |    | 360 | 80.1 | 40000 | 46000 | 1.37 |
| 4 | 60 | 300 | 47.9 | 24000 | 27000 | 1.28 |
|   |    | 1320 | 82.0 | 41000 | 47000 | 1.39 |
| 5 | 60 | 300 | 51.1 | 26000 | 29000 | 1.20 |
|   |    | 1440 | 100.0 | 36000 | 57000 | 1.23 |
| 6 | 60 | 240 | 49.4 | 49000 | 56000 | 1.33 |
|   |    | 360 | 64.9 | 61000 | 74000 | 1.34 |
| 7 | 60 | 300 | 37.2 | 36000 | 42000 | 1.31 |
|   |    | 1320 | 79.8 | 76000 | 91000 | 1.47 |
| 8 | 60 | 300 | 33.5 | 37000 | 38000 | 1.19 |
|   |    | 1440 | 100.0 | 60000 | 57000 | 1.26 |
| 9 | 60 | 240 | 40.2 | 77000 | 92000 | 1.37 |
|   |    | 360 | 57.6 | 98000 | 130000 | 1.34 |
| 10 | 60 | 300 | 29.9 | 59000 | 68000 | 1.35 |
|    |    | 1320 | 74.9 | 130000 | 170000 | 1.45 |
| 11 | 60 | 270 | 47.4 | 24000 | 27000 | 1.17 |
|    |    | 1230 | 77.3 | 39000 | 44000 | 1.35 |
| 12 | 60 | 270 | 32.9 | 30000 | 37000 | 1.23 |
|    |    | 1230 | 61.8 | 56000 | 70000 | 1.49 |
| 13 | 60 | 300 | 77.9 | 24000 | 44000 | 1.27 |
| 14 | 60 | 300 | 66.5 | 33000 | 76000 | 1.28 |
| 15 | 65 | 180 | 94.7 | 33000 | 54000 | 1.29 |
|    |    | 240 | 100.0 | 38000 | 57000 | 1.32 |

Monomer: glycidyl methacrylate (GMA)
Monomer concentration was 8 M when no solvent was used, 6 M when the concentration of the solvent was 25%, and 4 M when the concentration of the solvent was 50%.
Alkyl halide to be used as a dormant species ((R-I)): CP-I (2-cyanopropyl iodide). Alternatively, an organic halide was generated by a reaction of an azo-type radical initiator with iodine ($I_2$) in the reaction solution, and the organic halide was used as a dormant species in this polymerization method.
Catalyst: BMPI (methyltributylphosphonium iodide), TBA (tributylamine, which is a catalyst disclosed in Patent Document 5), BNI (tetrabutylammonium iodide).
Radical initiator (In) (which was used in some experiments): V65 (azobis(2,4-dimethylvaleronitrile)
Solvent (which was used in some experiments): toluene
$M_n$ and PDI: Molecular weight and polydispersity determined by multi-angle laser light scattering (MALLS) detector with gel permeation chromatography (GPC) with tetrahydrofuran (THF) as an eluent.

Example 20

[Polymerization of polyethylene glycol methacrylate (PEGMA)]
Polymerization was carried out in the same manner as in Example 1 except that the reaction materials and reaction conditions were changed as shown in the following tables. The results are shown in the following tables.

The respective aims in the experiments are as described in the following.

In entry 1, a monomer having an average molecular weight of 300 was used. It was aimed that a 100-mer is formed when the conversion ratio is 100%.
In entry 2, the catalyst was combined with a catalyst TBA.
In entry 3, a catalyst was changed to BNI.
In entry 4, it was aimed that a 400-mer is formed when the conversion ratio is 100%.
In entry 5, a monomer having an average molecular weight of 475 was used. It was aimed that a 100-mer is formed when the conversion ratio is 100%.
In entry 6, the catalyst was combined with a catalyst TBA.
In entry 7, a catalyst was changed to BNI.
In entry 8, it was aimed that a 400-mer is formed when the conversion ratio is 100%.

TABLE 24A

| entry | monomer | R-X | catalyst | $[M]_0/[R-X]_0/[catalyst]_0$ (mM) |
|---|---|---|---|---|
| 1 | PEGMA(monomer molecular weight 300) (100 eq) | CPI | BMPI | 8000/80/160 |
| 2 | PEGMA(monomer molecular weight 300) (100 eq) | CPI | BMPI/TBA | 8000/80/(160/40) |
| 3 | PEGMA(monomer molecular weight 300) (100 eq) | CPI | BNI | 8000/80/160 |
| 4 | PEGMA(monomer molecular weight 300) (400 eq) | CPI | BMPI | 8000/20/80 |
| 5 | PEGMA(monomer molecular weight 475) (100 eq) | CPI | BMPI | 8000/80/160 |
| 6 | PEGMA(monomer molecular weight 475) (100 eq) | CPI | BMPI/TBA | 8000/80/(160/120) |
| 7 | PEGMA(monomer molecular weight 475) (100 eq) | CPI | BNI | 8000/80/160 |
| 8 | PEGMA(monomer molecular weight 475) (400 eq) | CPI | BMPI | 8000/20/80 |

TABLE 24B

| entry | T (°C.) | t (min) | conv (%) | $M_n$ | $M_{n,theo}$ | PDI |
|---|---|---|---|---|---|---|
| 1 | 60 | 300 | 48.8 | 9900 | 59000 | 1.33 |
| 2 | 60 | 300 | 91.5 | 17000 | 27000 | 1.35 |
| 3 | 60 | 300 | 48.5 | 9700 | 15000 | 1.32 |
| 4 | 60 | 240 | 25.7 | 17000 | 31000 | 1.26 |
| 5 | 60 | 300 | 36.4 | 12000 | 17000 | 1.22 |
| 6 | 60 | 300 | 57.2 | 16000 | 27000 | 1.17 |
| 7 | 60 | 300 | 36.4 | 12000 | 17000 | 1.21 |
| 8 | 60 | 545 | 19.7 | 21000 | 37000 | 1.19 |

Monomer: polyethylene glycol methacrylate (PEGMA)
Monomer concentration: 8 M (bulk)
Alkyl halide to be used as a dormant species ((R-I)): CP-I (2-cyanopropyl iodide)
Catalyst: BMPI (methyltributylphosphonium iodide), TBA (tributylamine, which is a catalyst disclosed in Patent Document 5), BNI (tetrabutylammonium iodide).
Radical initiator (In) was not used.
$M_n$ and PDI: Molecular weight and polydispersity determined by multi-angle laser light scattering (MALLS) detector with gel permeation chromatography (GPC) with tetrahydrofuran (THF) as an eluent.

Example 21

[Polymerization of Dimethylaminoethyl Methacrylate (DMAEMA)]
Polymerization was carried out in the same manner as in Example 1 except that the reaction materials and reaction conditions were changed as shown in the following tables. In the experiment of entry 1, it was aimed that a 100-mer is formed when the conversion ratio is 100%.

The results are shown in the following tables.

TABLE 25A

| entry | monomer | R-X | catalyst | $[M]_0/[R-X]_0/[catalyst]_0$ (mM) |
|---|---|---|---|---|
| 1 | DMAEMA (100 eq) | CPI | BMPI | 8000/80/80 |

TABLE 25B

| entry | T (°C.) | t (min) | conv (%) | $M_n$ | $M_{n,theo}$ | PDI |
|---|---|---|---|---|---|---|
| 1 | 60 | 300 | 22.7 | 6500 | 3600 | 1.30 |

Monomer: dimethylaminoethyl methacrylate (DMAEMA)
Monomer concentration: 8 M (bulk)
Alkyl halide to be used as a dormant species (R-I): CP-I (2-cyanopropyl iodide)
Catalyst: BMPI (methyltributylphosphonium iodide)
Radical initiator (In) was not used.
$M_n$ and PDI: Molecular weight and polydispersity determined by multi-angle laser light scattering (MALLS) detector with gel permeation chromatography (GPC) with dimethylformamide (DMF) as an eluent.

Example 22

[Polymerization of Hydroxyethyl Acrylate (HEA)]
Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%.

In entry 2, a catalyst was changed to BNI.

TABLE 26A

| entry | monomer | R-X | catalyst | $[M]_0/[R-X]_0/[catalyst]_0$ (mM) |
|---|---|---|---|---|
| 1 | HEA (100 eq) | CPI | BMPI | 8000/80/320 |
| 2 | HEA (100 eq) | CPI | BNI | 8000/80/320 |

TABLE 26B

| entry | T (°C.) | t (min) | conv (%) | $M_n$ | $M_{n,theo}$ | PDI |
|---|---|---|---|---|---|---|
| 1 | 90 | 1440 | 15.6 | 7400 | 1800 | 1.44 |
| 2 | 90 | 1440 | 16.0 | 7600 | 1900 | 1.44 |

Monomer: hydroxyethyl acrylate (HEA)
Monomer concentration: 8 M (bulk)
Alkyl halide to be used as a dormant species (R-I): CP-I (2-cyanopropyl iodide)
Catalyst: BMPI (methyltributylphosphonium iodide), BNI (tetrabutylammonium iodide).
Radical initiator (In) was not used.
$M_n$ and PDI: Molecular weight and polydispersity determined by multi-angle laser light scattering (MALLS) detector with gel permeation chromatography (GPC) with dimethylformamide (DMF) as an eluent.

Example 23

[Polymerization of Acrylonitrile (AN)]
Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%. A solvent was used at 25%.

In entry 2, BNI was used as a catalyst.

TABLE 27A

| entry | monomer | R-X | catalyst | $[M]_0/[R-X]_0/[catalyst]_0$ (mM) | solvent |
|---|---|---|---|---|---|
| 1 | AN | CPI | BMPI | 8000/80/320 | ethylene carbonate 50 wt % |
| 2 | AN | CPI | BNI | 8000/80/80 | ethylene carbonate 50 wt % |

TABLE 27B

| entry | T (°C.) | t (min) | conv (%) | $M_n$ | $M_{n,theo}$ | PDI |
|---|---|---|---|---|---|---|
| 1 | 75 | 300 | 20.6 | 5000 | 1100 | 1.11 |
|   |   | 1440 | 100.0 | 19000 | 5300 | 1.11 |
| 2 | 75 | 300 | 23.8 | 3800 | 1300 | 1.13 |
|   |   | 1450 | 91.6 | 13000 | 4900 | 1.13 |

Monomer: acrylonitrile (AN)
Monomer concentration was 8 M when no solvent was used, and 4 M when the concentration of the solvent was 50%.
Alkyl halide to be used as a dormant species (R-I): CP-I (2-cyanopropyl iodide)
Catalyst: BMPI (methyltributylphosphonium iodide), BNI (tetrabutylammonium iodide)
Radical initiator (In) was not used.
Solvent: ethylene carbonate
$M_n$ and PDI: Molecular weight and polydispersity determined by multi-angle laser light scattering (MALLS) detector with gel permeation chromatography (GPC) with dimethylformamide (DMF) as an eluent.

Example 24

[Polymerization of Styrene (St)]
Polymerization was carried out in the same manner as in Example 1 except that the reaction materials and reaction conditions were changed as shown in the following tables. The results are shown in the following tables.

The respective aims in the experiments are as described in the following.

In entry 1, it was aimed that a 100-mer is formed when the conversion ratio is 100%.

In entry 2, the amount of a catalyst $BNI_3$ was reduced.

In entry 3, the amounts of a catalyst $BNI_3$ and a radical initiator AIBN were reduced.

In entry 4, a radical initiator was changed to V65 which has a higher decomposition rate than AIBN, and the temperature was decreased to 60° C.

In entry 5, the amount of a catalyst $BNI_3$ was reduced.

In entry 6, it was aimed that a 400-mer is formed when the conversion ratio is 100%.

In entry 7, a catalyst was changed to $BNBrI_2$.

In entry 8, the amounts of a catalyst $BNBrI_2$ was reduced.

TABLE 28A

| entry | monomer | R-X | In | catalyst | $[M]_0/[R-X]_0/[In]_0/[catalyst]_0$ (mM) |
|---|---|---|---|---|---|
| 1 | St (100 eq) | CPI | AIBN | $BNI_3$ | 8000/80/80/10 |
| 2 | St (100 eq) | CPI | AIBN | $BNI_3$ | 8000/80/80/2 |
| 3 | St (100 eq) | CPI | AIBN | $BNI_3$ | 8000/80/40/1 |
| 4 | St (100 eq) | CPI | V65 | $BNI_3$ | 8000/80/80/10 |
| 5 | St (100 eq) | CPI | V65 | $BNI_3$ | 8000/80/80/2 |
| 6 | St (400 eq) | CPI | V65 | $BNI_3$ | 8000/20/20/2 |
| 7 | St (100 eq) | CPI | AIBN | $BNBrI_2$ | 8000/80/40/2 |
| 8 | St (100 eq) | CPI | AIBN | $BNBrI_2$ | 8000/80/40/1 |

TABLE 28B

| entry | T (°C.) | t (min) | conv (%) | $M_n$ | $M_{n,theo}$ | PDI |
|---|---|---|---|---|---|---|
| 1 | 80 | 240 | 89.2 | 5900 | 9300 | 1.31 |
| 2 | 80 | 240 | 90.6 | 6800 | 9400 | 1.35 |
| 3 | 80 | 300 | 84.0 | 6400 | 8400 | 1.37 |
| 4 | 60 | 1380 | 90.4 | 6100 | 9400 | 1.35 |
| 5 | 60 | 1380 | 92.0 | 6800 | 9600 | 1.40 |
| 6 | 60 | 1440 | 83.2 | 21000 | 35000 | 1.43 |
| 7 | 80 | 480 | 94.6 | 7500 | 9500 | 1.33 |
| 8 | 80 | 300 | 85.9 | 6600 | 8600 | 1.38 |

Monomer: styrene (St)
Monomer concentration: 8 M (bulk)
Alkyl halide to be used as a dormant species (R-I): CP-I (2-cyanopropyl iodide)
Catalyst: $BNI_3$ (tetrabutylammonium triiodide), tetrabutylammonium bromodiiodide ($BNBrI_2$).
Radical initiator (In): AIBN (azobisisobutyronitrile), V65 (azobis(2,4-dimethylvaleronitrile)).
$M_n$ and PDI: Molecular weight and polydispersity obtained by gel permeation chromatography (GPC) with tetrahydrofuran (THF) as an eluent calibrated by polystyrene (PSt) standard.

Example 25

[Random Copolymerization of Cyclohexyl Methacrylate (CHMA) and Ethylhexyl Methacrylate (EHMA)]

Polymerization was carried out in the same manner as in Example 1 except that the reaction materials and reaction conditions were changed as shown in the following tables. The results are shown in the following tables.

The respective aims in the experiments are as described in the following.

In entry 1, random copolymerization of CHMA and EHMA was performed. It was aimed that a 200-mer is formed when the conversion ratio is 100%.

In entry 2, $I_2$ and AIBN were charged, and during polymerization, alkyl iodide generated in situ was used. It was aimed that a 200-mer is formed when the conversion ratio is 100%.

TABLE 29A

| entry | monomer | R-X | In | catalyst | $[M]_0/[R-X]_0/[In]_0/[catalyst]_0$ (mM) | solvent |
|---|---|---|---|---|---|---|
| 1 | CHMA/EHMA(150/50 eq) | CPI | V65 | BMPI | (6000/2000)/40/20/20 | toluene 66.7% |
| 2 | CHMA/EHMA(150/50 eq) | $I_2$ | AIBN | BMPI | (6000/2000)/20/100/80 | toluene 66.7% |

TABLE 29B

| entry | T (°C.) | t (min) | conv (%) | $M_n$ | $M_{n,theo}$ | PDI |
|---|---|---|---|---|---|---|
| 1 | 60 | 300 | 73.5 | 13000 | 26000 | 1.39 |
| 2 | 60 | 1200 | 56.3 | 12000 | 20000 | 1.28 |

Monomer: cyclohexyl methacrylate (CHMA) and ethylhexyl methacrylate (EHMA)
Monomer concentration was 8 M when no solvent was used, and 2.7 M when the concentration of the solvent was 66.7%.
Alkyl halide to be used as a dormant species (R-I): CP-I (2-cyanopropyl iodide). Alternatively, an organic halide was generated by a reaction of an azo-type radical initiator with iodine ($I_2$) in the reaction solution, and the organic halide was used as a dormant species in this polymerization method.
Catalyst: BMPI (methyltributylphosphonium iodide).
Radical initiator (In): AIBN (azobisisobutyronitrile), V65 (azobis(2,4-dimethylvaleronitrile).
$M_n$ and PDI: Molecular weight and polydispersity obtained by gel permeation chromatography (GPC) with tetrahydrofuran (THF) as an eluent calibrated by polymethyl methacrylate (PMMA) standard.

Example 26

[Polymerization of ethylhexyl methacrylate (EHMA)]

Polymerization was carried out in the same manner as in Example 1 except that the reaction materials and reaction conditions were changed as shown in the following tables. It was aimed that a 400-mer is formed when the conversion ratio is 100%. The results are shown in the following tables.

TABLE 30A

| entry | monomer | R-X | In | XA | [M]/[R-X]₀/[In]₀/[XA]₀(mM) | solvent |
|---|---|---|---|---|---|---|
| 1 | EHMA | CPI | V65 | BNI₃ | 8000/20/10/1 | toluene 25 wt % |

TABLE 30B

| entry | T (° C.) | t (min) | conv (%) | $M_n$ | $M_{n, theo}$ | PDI |
|---|---|---|---|---|---|---|
| 1 | 65 | 180 | 78.4 | 36000 | 62000 | 1.33 |
|   |    | 360 | 92.5 | 40000 | 73000 | 1.32 |

Monomer: ethylhexyl methacrylate (EHMA)
Monomer concentration was 8 M when no solvent was used, and 6 M when the concentration of the solvent was 25%.
Alkyl halide to be used as a dormant species (R-I): CP-I (2-cyanopropyl iodide)
Catalyst: BNI₃ (tetrabutylammonium triiodide).
Radical initiator (In): V65 (azobis(2,4-dimethylvaleronitrile).
$M_n$ and PDI: Molecular weight and polydispersity determined by multi-angle laser light scattering (MALLS) detector with gel permeation chromatography (GPC) with tetrahydrofuran (THF) as an eluent.

Example 27

[Random Copolymerization of n-Butyl Acrylate (BA) and Lauryl Methacrylate (LMA)]

Polymerization was carried out in the same manner as in Example 1 except that the reaction materials and reaction conditions were changed as shown in the following tables. In this experiment, random copolymerization of BA and LMA was carried out. It was aimed that a 100-mer is formed when the conversion ratio is 100%. The results are shown in the following tables.

TABLE 31A

| entry | monomer | R-X | catalyst | [M]₀/[R-X]₀/[catalyst]₀(mM) |
|---|---|---|---|---|
| 1 | BA/LMA (50/50 eq) | CPI | BNI | (4000/4000)/80/320 |

TABLE 31B

| entry | T (° C.) | t (min) | conv (%) | $M_n$ | $M_{n, theo}$ | PDI |
|---|---|---|---|---|---|---|
| 1 | 110 | 1450 | 89.6 | 16000 | 17000 | 1.42 |

Monomer: n-butyl acrylate (BA), lauryl methacrylate (LMA)
Monomer concentration: 8 M (bulk (BA concentration was 4 M, and LMA concentration was 4 M)).
Alkyl halide to be used as a dormant species (R-I): 2-cyanopropyl iodide (CP-I)
Catalyst: BNI (tetrabutylammonium iodide)
Radical initiator (In) was not used.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 28

[Random Copolymerization of n-Butyl Acrylate (BA) and Methyl Methacrylate (MMA)]

Polymerization was carried out in the same manner as in Example 1 except that the reaction materials and reaction conditions were changed as shown in the following tables. The results are shown in the following tables.

The respective aims in the experiments are as described in the following.

In entry 1, random polymerization of BA and MMA was performed. It was aimed that a 100-mer is formed when the conversion ratio is 100%.

In entry 2, BNI was used as a catalyst.

TABLE 32A

| entry | monomer | R-X | catalyst | [M]₀/[R-X]₀/[catalyst]₀(mM) |
|---|---|---|---|---|
| 1 | BA/MMA (50/50 eq) | CPI | BMPI | (4000/4000)/80/320 |
| 2 | BA/MMA (50/50 eq) | CPI | BNI | (4000/4000)/80/320 |

TABLE 32B

| entry | T (° C.) | t (min) | conv (%) | $M_n$ | $M_{n, theo}$ | PDI |
|---|---|---|---|---|---|---|
| 1 | 90 | 300 | 30.7 | 5400 | 3500 | 1.41 |
|   |    | 1450 | 55.1 | 8200 | 6300 | 1.34 |
| 2 | 90 | 300 | 27.8 | 4500 | 3200 | 1.27 |
|   |    | 1450 | 44.4 | 6800 | 5100 | 1.23 |

Monomer: n-butyl acrylate (BA), methyl methacrylate (MMA)
Monomer concentration: 8 M (bulk (BA concentration was 4 M and MMA concentration was 4 M)).
Alkyl halide to be used as a dormant species (R-I): 2-cyanopropyl iodide (CP-I)
Catalyst: BMPI (methyltributylphosphonium iodide), BNI (tetrabutylammonium iodide)
Radical initiator (In) was not used.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 29

[Block Copolymerization Using an Organic Salt]

In table 33A to table 33D (Entries 1-3), block copolymerization of methyl methacrylate (MMA) and benzyl methacrylate (BzMA) was carried out. In Entry 1, for the first block, a solution polymerization of MMA (8 M) (containing 50 wt % of toluene as a solvent) was carried out at 80° C. for 5 hours using 2-cyanopropyl iodide (CP-I: 160 mM) and methyltributylphosphonium iodide (BMPI: 80 mM) as alkyl iodide and a catalyst, respectively (Table 33A and Table 33B). Thereafter, reprecipitation purification with hexane was carried out to obtain polymethyl methacrylate-iodide (PMMA-I) ($M_n$=5300 and PDI=1.18) (Table 33B). Then, for the second block, a solution polymerization of BzMA (8 M) (containing 50 wt % of toluene as a solvent) was carried out at 80° C. for 5 hours using the above-described PMMA-I (80 mM) and BMPI (160 mM) as alkyl iodide and a catalyst, respectively (Table 33C and Table 33D). As a result, a block copolymer having narrow molecular weight distribution (PMMA-b-PBzMA) ($M_n$=15000 and PDI=1.23) was obtained (Table 33D). It should be noted that PMMA stands for polymethyl methacrylate and PBzMA stands for polybenzyl methacrylate. To the post-polymerization solution, 2-aminoethanol was added, and then heated at 40° C. for 3 hours to remove iodine from a terminal of the polymer ($M_n$=15000 and PDI=1.22) (Table 33D). Then, purification by reprecipitation with hexane provided white PMMA-b-PBzMA ($M_n$=15000 and PDI=1.19) (Table 33D).

In Entries 2 and 3, experiments similar to Entry 1 were carried out. In Entries 2 and 3, in comparison to Entry 1, the molecular weights of the first block and the second block were changed. In Entry 2, for the first block, the solution polymerization of MMA (8 M) (containing 50 wt % of toluene as a solvent) was carried out at 80° C. for 5 hours using CP-I (80 mM) and BMPI (80 mM). After reprecipitation purification, PMMA-I ($M_n$=9400 and PDI=1.28) was obtained (Table 33A and Table 33B). Then, for the second block, a solution polymerization of BzMA (8 M) (containing 50 wt % of toluene as a solvent) was carried out at 80° C. for 5 hours using PMMA-I (80 mM) and BMPI (160 mM) to obtain block copolymer (PMMA-b-PBzMA) having narrow molecular weight distribution ($M_n$=18000 and PDI=1.27) (Table 33C and Table 33D). After 2-aminoethanol treatment ($M_n$=18000 and PDI=1.27), reprecipitation purification provided white PMMA-b-PBzMA ($M_n$=18000 and PDI=1.26) (Table 33D).

In Entry 3, for the first block, a solution polymerization of MMA (8 M) (containing 50 wt % of toluene as a solvent) was carried out at 60° C. for 16 hours using CP-I (40 mM) and BMPI (80 mM), and then reprecipitation purification was carried out to obtain PMMA-I ($M_n$=15000 and PDI=1.16) (Table 33A and Table 33B). Then, for the second block, a solution polymerization of BzMA (8 M) (containing 50 wt % of toluene as a solvent) was carried out at 80° C. for 5 hours using PMMA-I (80 mM) and BMPI (160 mM) to obtain a block copolymer (PMMA-b-PBzMA) having narrow molecular weight distribution ($M_n$=20000 and PDI=1.29) (Table 33C and Table 33D). 2-Aminoethanol treatment was carried out, and then ($M_n$=20000 and PDI=1.29) reprecipitation purification was carried out to obtain white PMMA-b-PBzMA ($M_n$=20000 and PDI=1.29) (Table 33D).

TABLE 33A

| entry | monomer | R-X | catalyst | $[M]_0/[R-X]_0/[catalyst]_0$ (mM) | solvent |
|---|---|---|---|---|---|
| 1 | MMA | CPI | BMPI | 8000/160/80 | toluene 50 wt % |
| 2 | MMA | CPI | BMPI | 8000/80/80 | toluene 50 wt % |
| 3 | MMA | CPI | BMPI | 8000/40/80 | toluene 50 wt % |

Monomer: methyl methacrylate (MMA)
Monomer concentration was 8 M when no solvent was used, and 4 M when the concentration of the solvent was 50%.
Alkyl halide to be used as a dormant species (R-I): 2-cyanopropyl iodide (CP-I)
Catalyst: BMPI (methyltributylphosphonium iodide)
Radical initiator (In) was not used.
Solvent: toluene
$M_n$ and PDI: Molecular weight and polydispersity obtained by gel permeation chromatography (GPC) with tetrahydrofuran (THF) as an eluent calibrated by polymethyl methacrylate (PMMA) standard.

TABLE 33B

| entry | T (° C.) | t (h) | conv (%) | $M_n$ | $M_{n,theo}$ | PDI |
|---|---|---|---|---|---|---|
| 1 | 80 | 5 | 76 | 5300 | 3800 | 1.18 |
| | | | after reprecipitation | 5300 | — | 1.18 |
| 2 | 80 | 5 | 71 | 9400 | 7100 | 1.28 |
| | | | after reprecipitation | 9400 | — | 1.28 |
| 3 | 60 | 16 | 72 | 15000 | 14000 | 1.16 |
| | | | after reprecipitation | 15000 | — | 1.16 |

TABLE 33C

| entry | monomer | R-X | catalyst | $[M]_0/[R-X]_0/[catalyst]_0$ (mM) | solvent |
|---|---|---|---|---|---|
| 1 | BzMA | PMMA-I ($M_n$ = 5300) | BMPI | 8000/80/160 | toluene 50 wt % |
| 2 | BzMA | PMMA-I ($M_n$ = 9400) | BMPI | 8000/80/160 | toluene 50 wt % |
| 3 | BzMA | PMMA-I ($M_n$ = 15000) | BMPI | 8000/120/160 | toluene 50 wt % |

Monomer: benzyl methacrylate (BzMA).
Monomer concentration was 8 M when no solvent was used, and 4 M when the concentration of the solvent was 50%.
Alkyl halide to be used as a dormant species (R-I): polymethyl methacrylate-iodide (PMMA-I)
Catalyst: BMPI (methyltributylphosphonium iodide)
Radical initiator (In) was not used.
Solvent: toluene
$M_n$ and PDI: Molecular weight and polydispersity obtained by gel permeation chromatography (GPC) with tetrahydrofuran (THF) as an eluent calibrated by polymethyl methacrylate (PMMA) standard.

TABLE 33D

| entry | T (° C.) | t (h) | conv (%) | $M_n$ | $M_{n,theo}$ | PDI |
|---|---|---|---|---|---|---|
| 1 | 80 | 5 | 52 | 15000 | 15000 | 1.23 |
| | | | after terminal treatment | 15000 | — | 1.22 |
| | | | after reprecipitation | 15000 | — | 1.19 |
| 2 | 80 | 5 | 47 | 18000 | 18000 | 1.27 |
| | | | after terminal treatment | 18000 | — | 1.27 |
| | | | after reprecipitation | 18000 | — | 1.26 |
| 3 | 80 | 5 | 67 | 20000 | 25000 | 1.29 |
| | | | after terminal treatment | 20000 | — | 1.29 |
| | | | after reprecipitation | 20000 | — | 1.29 |

Example 30

[Block Copolymerization by Successive Addition of Monomers]

In Table 34A to Table 34D (Entries 1 and 2), block copolymerization of methyl methacrylate (MMA) and benzyl methacrylate (BzMA) was carried out by successive addition of the two monomers. In Entry 1, for the first block, the solution polymerization of MMA (8 M) (containing 50 wt % of toluene as a solvent) was carried out at 60° C. for 16 hours using 2-cyanopropyl iodide (CP-I: 160 mM) and methyltributylphosphonium iodide (BMPI: 80 mM) as alkyl iodide and a catalyst, respectively (Table 34A and Table 34B). As a result, polymethyl methacrylate-iodide (PMMA-I) ($M_n$=4300 and PDI=1.13) was obtained (Table 34B). Then, without isolation and purification of the resulting PMMA-I, to this solution, BzMA (25 molar equivalents relative to [CP-I]) was successively added to carry out the polymerization for the second block at 60° C. for 6 hours (Table 34C). As a result, a block copolymer (PMMA-b-PBzMA) having narrow molecular weight distribution ($M_n$=5800 and PDI=1.14) was obtained (Table 34D). It should be noted that PBzMA stands for polybenzyl methacrylate. To the post-polymerization solution, 2-aminoethanol was added, and then it was heated at 40° C. for 3 hours to remove iodine from a terminal of the polymer ($M_n$=6000 and PDI=1.14) (Table 34D). Thereafter, purification by reprecipitation with hexane provided white PMMA-b-PBzMA ($M_n$=6100 and PDI=1.14) (Table 34D).

In Entry 2, an experiment similar to Entry 1 was carried out. In Entry 2, in comparison to Entry 1, the molecular weights of the first block and the second block were changed. In Entry 2, for the first block, the solution polymerization of MMA (8 M) (containing 50 wt % of toluene as a solvent) was carried out at 60° C. for 16 hours using CP-I (80 mM) and BMPI (80 mM) to obtain PMMA-I ($M_n$=8300 and PDI=1.14) (Table 34A and Table 34B). Then, without isolation and purification of the resulting PMMA-I, to this solution, BzMA (50 molar equivalents relative to [CP-I]) was added to carry out the polymerization for the second block at 60° C. for 6 hours (Table 34C). As a result, a block copolymer (PMMA-b-PBzMA) having narrow molecular weight distribution ($M_n$=10000 and PDI=1.17) was obtained (Table 34D). After 2-aminoethanol treatment ($M_n$=10000 and PDI=1.17), reprecipitation purification provided white PMMA-b-PBzMA ($M_n$=10000 and PDI=1.17) (Table 34D).

In Table 34A to Table 34D (Entry 3), a block copolymerization of MMA and polyethylene glycol methacrylate (PEGMA) was carried out by successive addition of the two monomers. The first block was the same as Entry 2. Then, without isolation and purification of the resulting PMMA-I, to this solution, PEGMA (50 molar equivalents relative to [CP-I]) and BMPI (1 molar equivalent relative to [CP-I]) and tributylamine (TBA) (0.5 molar equivalents relative to [CP-I]) were added to carry out the polymerization for the second block at 60° C. for 6 hours (Table 34C). As a result, a block copolymer (PMMA-b-PPEGMA) having narrow molecular weight distribution ($M_n$=13000 and PDI=1.19) was obtained (Table 34D). It should be noted that PPEGMA stands for poly(polyethylene glycol methacrylate).

In Table 34A to Table 34D (Entry 4), a block copolymerization of MMA and butyl acrylate (BA) was carried out by successive addition of the two monomers. The first block was the same as Entry 2. Then, without isolation and purification of the resulting PMMA-I, to this solution, BA (100 molar equivalents relative to [CP-I]) and tetrabutylammonium iodide (BNI) (4 molar equivalents relative to [CP-I]) were added to carry out the polymerization for the second block at 110° C. for 24 hours (Table 34C). As a result, a block copolymer (PMMA-b-PBA) having narrow molecular weight distribution ($M_n$=12000 and PDI=1.38) was obtained (Table 34D). It should be noted that PBA stands for polybutyl acrylate.

In Table 34A to Table 34D (Entry 5), a block copolymerization of MMA and 2-hydroxyethyl methacrylate (HEMA) was carried out by successive addition of the two monomers. For the first block, a solution polymerization of MMA (8 M) (containing 50 wt % of toluene as a solvent) was carried out at 60° C. for 16 hours using CP-I (240 mM) and BMPI (80 mM) to obtain PMMA-I ($M_n$=3400 and PDI=1.13) (Table 34A and Table 34B). Then, without isolation and purification of the resulting PMMA-I, to this solution, HEMA (30 molar equivalents relative to [CP-I]), tetrabutylammonium triiodide ($BNI_3$) (0.04 molar equivalents relative to [CP-I]), 2,2'-azobis (4-methoxy-2,4-dimethylvaleronitrile) (V70) (0.33 molar equivalents relative to [CP-I]) and toluene (0.5 weights relative to the weight of HEMA) were added to carry out the polymerization for the second block at 40° C. for 5 hours (Table 34C). As a result, a block copolymer (PMMA-b-PHEMA) having narrow molecular weight distribution ($M_n$=6800 and PDI=1.18) was obtained (Table 34D). It should be noted that in the present specification, "X weight relative to the weight" or "X weight relative to 1 weight" means that the weight ratio relative to the weight of a material, which is the basis, is X. For example, "0.5 weights relative to the weight" means that the weight ratio relative to the weight of a material, which is the basis, is 0.5. For example, an amount of toluene which is "0.5 weights relative to the weight of HEMA" means that the weight ratio of HEMA and toluene is a proportion where the weight of toluene is 0.5 g relative to 1 g of HEMA. It should be noted that PHEMA stands for poly(2-hydroxyethyl methacrylate).

In Table 34A to Table 34D (Entry 6), a block copolymerization of BA and MMA was carried out by successive addition of the two monomers. The order of the addition was opposite to Entry 4. For the first block, a bulk polymerization of BA (8 M) was carried out at 110° C. for 23 hours using CP-I (80 mM) and BNI (320 mM) to obtain polybutyl acrylate-iodide (PBA-I) ($M_n$=10000 and PDI=1.31) (Table 33A and Table 33B). Then, without isolation and purification of the resulting PBA-I, to this solution, MMA (100 molar equivalents relative to [CP-I]) and BMPI (1 molar equivalent relative to [CP-I]) and toluene (1 weight relative to the weight of MMA) were added to carry out the polymerization for the second block at 80° C. for 6 hours (Table 34C). As a result, a block copolymer (PBA-b-PMMA) having narrow molecular weight distribution ($M_n$=11000 and PDI=1.42) (Table 34D) was obtained.

TABLE 34A

| entry | monomer | R-X | catalyst | $[M]_0/[R-X]_0/$ $[catalyst]_0$ (mM) | solvent |
|---|---|---|---|---|---|
| 1 | MMA | CPI | BMPI | 8000/160/80 | toluene 50 wt % |
| 2 | MMA | CPI | BMPI | 8000/80/80 | toluene 50 wt % |
| 3 | MMA | CPI | BMPI | 8000/80/80 | toluene 50 wt % |
| 4 | MMA | CPI | BMPI | 8000/80/80 | toluene 50 wt % |
| 5 | MMA | CPI | BMPI | 8000/240/80 | toluene 50 wt % |
| 6 | BA | CPI | BNI | 8000/80/320 | none |

Monomer: methyl methacrylate (MMA), butyl acrylate (BA).

Monomer concentration was 8 M when no solvent was used, and 4 M when the concentration of the solvent was 50%.

Alkyl halide to be used as a dormant species (R-I): 2-cyanopropyl iodide (CP-I)

Catalyst: BMPI (methyltributylphosphonium iodide), BNI (tetrabutylammonium iodide)

Radical initiator (In) was not used.

Solvent (which was used in some experiments): toluene $M_n$ and PDI: Molecular weight and polydispersity obtained by gel permeation chromatography (GPC) with tetrahydrofuran (THF) as an eluent calibrated by polymethyl methacrylate (PMMA) standard.

TABLE 34B

| entry | T (° C.) | t (h) | conv (%) | $M_n$ | $M_{n, theo}$ | PDI |
|---|---|---|---|---|---|---|
| 1 | 60 | 16 | 93 | 4300 | 4600 | 1.13 |
| 2 | 60 | 16 | 82 | 8300 | 8200 | 1.14 |
| 3 | 60 | 16 | 82 | 8300 | 8200 | 1.14 |
| 4 | 60 | 16 | 82 | 8300 | 8200 | 1.14 |
| 5 | 60 | 16 | 90 | 3400 | 3000 | 1.13 |
| 6 | 110 | 23 | 76 | 10000 | 9700 | 1.31 |

TABLE 34C

| entry | monomer | Molar equivalents of the second monomer relative to [CP-I]$_0$ | Catalyst or radical initiator which was additionally added | Molar equivalents of the catalyst or radical initiator which was additionally added, relative to [CP-I]$_0$ | Weight of solvent relative to 1 weight of the second monomer |
|---|---|---|---|---|---|
| 1 | BzMA | 25 | none | none | none |
| 2 | BzMA | 50 | none | none | none |
| 3 | PEGMA | 50 | BMPI/TBA | 1/0.5 | none |
| 4 | BA | 100 | BNI | 4 | none |
| 5 | HEMA | 30 | V70/BNI$_3$ | 0.33/0.04 | toluene 0.5 weights |
| 6 | MMA | 100 | BMPI | 1 | toluene 0.5 weights |

Monomer: benzyl methacrylate (BzMA), polyethylene glycol methacrylate (PEGMA), butyl acrylate (BA), 2-hydroxyethyl methacrylate (HEMA), methyl methacrylate (MMA)

Catalyst: BMPI (methyltributylphosphonium iodide), tributylamine (TBA, which is a catalyst disclosed in Patent Document 5), tetrabutylammonium iodide (BNI), tetrabutylammonium triiodide (BNI$_3$)

Radical initiator (radical source) (which was used in some experiments): 2,2'-azobis(4-methoxy-2,4-dimethylvaleronitrile) (V70)

Solvent (which was used in some experiments): toluene $M_n$ and PDI: In Entries 1, 2, 4, and 6, molecular weight and polydispersity obtained by gel permeation chromatography (GPC) with tetrahydrofuran (THF) as an eluent calibrated by polymethyl methacrylate (PMMA) standard. In Entries 3 and 5, molecular weight and polydispersity obtained by GPC with dimethylformamide (DMF) as an eluent calibrated by PMMA standard.

TABLE 34D

| entry | T (° C.) | t (h) | conv (%) | $M_n$ | $M_{n, theo}$ | PDI |
|---|---|---|---|---|---|---|
| 1 | 60 | 6 | 67 | 5800 | 7700 | 1.14 |
| | | | after terminal treatment | 6000 | — | 1.14 |
| | | | after reprecipitation | 6100 | — | 1.14 |
| 2 | 60 | 6 | 47 | 10000 | 13000 | 1.17 |
| | | | after terminal treatment | 10000 | — | 1.17 |
| | | | after reprecipitation | 10000 | — | 1.17 |
| 3 | 60 | 6 | 53 | 13000 | 16000 | 1.19 |
| 4 | 110 | 24 | 53 | 12000 | 15000 | 1.38 |
| 5 | 40 | 5 | 57 | 6800 | 5200 | 1.18 |
| 6 | 80 | 6 | 37 | 11000 | 13000 | 1.42 |

Example 31

[Block Copolymerization by Successive Addition of Monomers. Combination with a Catalyst (NIS) Described in International Publication No. WO 2008/139980.]

In Table 35A to Table 35D (Entries 1 and 2), a block copolymerization of methyl methacrylate (MMA) and dimethylaminoethyl methacrylate (DMAEMA) was carried out by successive addition of the two monomers. In the polymerization of the second block, a catalyst (NIS) which is described in International Publication No. WO 2008/139980 was used. By the combination, a block copolymer was successfully synthesized.

In Entry 1, for the first block, a solution polymerization of MMA (8 M) (containing 50 wt % of toluene as a solvent) was carried out at 60° C. for 16 hours using 2-cyanopropyl iodide (CP-I: 80 mM) and methyltributylphosphonium iodide (BMPI: 80 mM) as alkyl iodide and a catalyst (Table 35A and Table 35B). As a result, polymethyl methacrylate-iodide (PMMA-I) ($M_n$=8400 and PDI=1.14) was obtained (Table 35B). Then, without isolation and purification of the resulting PMMA-I, to this solution, DMAEMA (50 molar equivalents relative to [CP-I]), 2,2'-azobis(4-methoxy-2,4-dimethylvaleronitrile) (V70) (0.25 molar equivalents relative to [CP-I]) which is a radical initiator, N-succinimide (NIS) (0.015 molar equivalents relative to [CP-I]) which is a catalyst, and dipropylene glycol monomethyl ether (MFDG) (0.5 weights relative to the weight of DMAEMA) which is a solvent were added to carry out the polymerization for the second block at 50° C. for 3 hours (Table 35C). As a result, a block copolymer (PMMA-b-PDMAEMA) having narrow molecular weight distribution ($M_n$=12000 and PDI=1.32) was obtained (Table 35D). It should be noted that PDMAEMA stands for poly(dimethylaminoethyl methacrylate). To the post-polymerization solution, 2-aminoethanol was added, and then it was heated at 40° C. for 3 hours to remove iodine from a terminal of the polymer ($M_n$=12000 and PDI=1.32) (Table 35D). Then, purification by reprecipitation with hexane provided white PMMA-b-PDMAEMA ($M_n$=13000 and PDI=1.32) (Table 35D).

In Entry 2, an experiment similar to Entry 1 was carried out. In Entry 2, in comparison to Entry 1, the molecular weights of the first block and the second block were changed. In Entry 2, for the first block, a solution polymerization of MMA (8 M) (containing 50 wt % of toluene as a solvent) was carried out at 60° C. for 16 hours using CP-I (240 mM) and BMPI (80 mM) (Table 35A and Table 35B). As a result, PMMA-I ($M_n$=3400 and PDI=1.13) was obtained (Table 35B). Then, without isolation and purification of the resulting PMMA-I, to this solution, DMAEMA (30 molar equivalents relative to [CP-I]), V70 (0.33 molar equivalents relative to [CP-I]), NIS (0.025 molar equivalents relative to [CP-I]), and MFDG (0.5 weights relative to the weight of DMAEMA) were added to carry out the polymerization for the second block at 50° C. for 3 hours (Table 35C). As a result, a block copolymer (PMMA-b-PDMAEMA) having narrow molecular weight distribution ($M_n$=6700 and PDI=1.25) was obtained (Table 35D). To the post-polymerization solution, 2-aminoethanol was added, and then it was heated at 40° C. for 3 hours to remove iodine from a terminal of the polymer ($M_n$=7000 and PDI=1.27) (Table 35D). Thereafter, purification by reprecipitation with hexane provided white PMMA-b-PDMAEMA ($M_n$=7200 and PDI=1.26) (Table 35D).

TABLE 35A

| entry | monomer | R-X | catalyst | $[M]_0/[R-X]_0/[catalyst]_0$ (mM) | solvent |
|---|---|---|---|---|---|
| 1 | MMA | CPI | BMPI | 8000/80/80 | toluene 50 wt % |
| 2 | MMA | CPI | BMPI | 8000/240/80 | toluene 50 wt % |

Monomer: methyl methacrylate (MMA)
Monomer concentration was 8 M when no solvent was used, and 4 M when the concentration of the solvent was 50%.
Alkyl halide to be used as a dormant species (R-I): 2-cyanopropyl iodide (CP-I)
Catalyst: BMPI (methyltributylphosphonium iodide)
Radical initiator (In) was not used.
Solvent: toluene.
$M_n$ and PDI: Molecular weight and polydispersity obtained by gel permeation chromatography (GPC) with tetrahydrofuran (THF) as an eluent calibrated by polymethyl methacrylate (PMMA) standard.

TABLE 35B

| entry | T (° C.) | t (h) | conv (%) | $M_n$ | $M_{n, theo}$ | PDI |
|---|---|---|---|---|---|---|
| 1 | 60 | 16 | 83 | 8400 | 8300 | 1.14 |
| 2 | 60 | 16 | 90 | 3400 | 3000 | 1.13 |

TABLE 35C

| entry | monomer | Molar equivalents of the second monomer relative to $[CP-I]_0$ | Molar equivalents of V70 relative to $[CP-I]_0$ | Molar equivalents of NIS relative to $[CP-I]_0$ | Weight of MFDG relative to 1 weight of the second monomer |
|---|---|---|---|---|---|
| 1 | DMAEMA | 50 | 0.25 | 0.015 | 0.5 weights |
| 2 | DMAEMA | 30 | 0.33 | 0.025 | 0.5 weights |

Monomer: dimethylaminoethyl methacrylate (DMAEMA).
Catalyst: N-succinimide (NIS)
Radical initiator (radical source): 2,2'-azobis(4-methoxy-2,4-dimethylvaleronitrile) (V70)
Solvent: dipropylene glycol monomethyl ether (MFDG).
$M_n$ and PDI: Molecular weight and polydispersity obtained by gel permeation chromatography (GPC) with dimethylformamide (DMF) as an eluent calibrated by polymethyl methacrylate (PMMA) standard.

TABLE 35D

| entry | T (° C.) | t (h) | conv (%) | $M_n$ | $M_{n, theo}$ | PDI |
|---|---|---|---|---|---|---|
| 1 | 50 | 3 | 67 | 12000 | 14000 | 1.32 |
|  |  |  | after terminal treatment | 12000 | — | 1.32 |
|  |  |  | after reprecipitation | 13000 | — | 1.32 |
| 2 | 50 | 3 | 60 | 6700 | 5900 | 1.25 |
|  |  |  | after terminal treatment | 7000 | — | 1.27 |
|  |  |  | after reprecipitation | 7200 | — | 1.26 |

Comparative Example 4

Polymerization experiments were performed similarly to Example 1, with the proviso that the following formulations were used:
Monomer: styrene, 8.0 M (1 g);
Alkyl halide to be used as a dormant species: 1-phenylethyl bromide, 80 mM (0.016 g) (This is abbreviated as "PEB" in the following table);
Catalyst: CuBr 5 mM (0.00071 g); and
Ligand: 4,4'-di-(5-nonyl)-2,2'-bipyridine 10 mM (0.0035 g) (This is abbreviated as "dHbipy" in the following table).

A ligand is always required in order to dissolve CuBr (catalyst) in a monomer. In a case of dHbipy, two equivalents are required with respect to CuBr. The concentration of the catalyst in this experiment (CuBr complex concentration) was 5 mM. Please note that no peroxide was used in these experiments, since it is technical common knowledge of those skilled in the art that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then a deactivation reaction of the growing species can occur significantly and as a result, the molecular weight distribution becomes broader. Specifically, for example, the aforementioned non-patent document 1 describes that a reaction material which contains no peroxide is used.

These materials were dissolved in a monomer to obtain a reaction solution. The reaction solution was heated to 80° C. The results are as follows.

TABLE 51

Result of polymerization with a copper complex

| No. | XA | $[PEB]_0/[CuBr/2dHbipy]_0$ (mM) | T (° C.) | t (h) | conv (%) | $M_n$ | PDI |
|---|---|---|---|---|---|---|---|
| 1 | CuBr | 80/5 | 80 | 2 | 1.8 | 1200 | 1.40 |
|  |  |  |  | 4 | 3.5 | 1300 | 1.40 |
|  |  |  |  | 8 | 6.0 | 1400 | 1.38 |

PEB: 1-phenylethyl bromide
dHbipy: a ligand for dissolving CuBr into a monomer (styrene)

As a result, the monomer conversion was much lower than those of MMA in Example 1. Further, the values of $M_n$ after the reaction were 1200 to 1400, which are significantly low. Polystyrene having high molecular weight was not obtained. Furthermore, the values of $M_w/M_n$ (PDI) were much larger than the values in the experiments of Example 1 which uses the catalyst of the present invention. Therefore, it is understood that the activity of the transition metal catalyst is significantly inferior than the activity of the catalyst of the present invention.

As can be seen from the comparison of the results of Comparative Example 4 and the results of Example 1, the catalyst of the present invention has a significantly higher activity than a transition metal complex catalyst used in the prior art.

The aforementioned Examples show that the present invention has superior properties in comparison with the catalysts in the prior art, which is disclosed in the prior art.

For example, according to the Example described in the aforementioned Non-Patent Document 1, the following reaction solution is subjected to a reaction:
styrene: 8.7 M (1 g);
1-phenylethyl bromide: 87 mM (0.016 g);
CuBr: 87 mM (0.013 g); and
4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example, the present invention can significantly reduce the amount of a catalyst used, and can also reduce the reaction temperature by 10 to 70° C., without the need for a ligand.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

INDUSTRIAL APPLICABILITY

As described above, the inventors obtained an invention of a new living radical polymerization method (a precisely controlled radical polymerization), which uses a nonmetallic compound having an ionic bond with a halide ion as a catalyst. The method is characterized by the low toxicity of the catalyst, low amount of the catalyst required, high solubility of the catalyst (a ligand is unnecessary), mild reaction conditions, no coloration, no odor (treatment after a polymerization reaction is unnecessary), and the like. The method is significantly more environmental-friendly and economically advantageous than the conventional living radical polymerization methods.

The catalysts and polymerization methods of the present invention are particularly useful in organic catalyst-type living radical polymerization referred to as reversible complexation mediated polymerization (RCMP).

One half or more of the amount of polymer compounds produced in the world is produced by radical polymerizations. A living radical polymerization method can be applied to the production of a variety of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), materials for resistor, organic electroluminescence material, adhesives, polymer alloy, various filler additives, lubricant, surfactant, paint, ink, packaging material, pharmaceuticals (for example, materials for sustained release medicaments), personal care products (cosmetics, hairdressings, and the like), and the like. The scale of the market is very large. The living radical polymerization of the present invention can be widely used as a satisfactory process for producing new electronic materials, optical materials, separation materials, or materials for a living body.

The biggest problem in the prior art concerning the practical utilization of living radical polymerization has been the high cost of the catalyst. That is, when a living radical polymerization is carried out, the catalyst enters a state in which the catalyst has been incorporated into the resulting polymer, and therefore, it takes time and effort to recover the catalyst from the polymer. This, as a result, increases the process costs enormously, and is not practical. For this reason, it is difficult to practically recover and recycle the catalyst, and under the current situation, the catalyst is substantially used once and thrown away.

The inventors of the present invention discovered that an inexpensive nonmetallic compound having an ionic bond with a halide ion acts as excellent catalysts in a living radical polymerization, and thus realized living radical polymerization at far lower costs as compared with the conventional techniques. Specifically, when the cost of catalyst required in synthesizing 1 kg of a polymer is calculated based on the prices described in the catalogue of Sigma-Aldrich Company, for example, with copper complex catalyst that is most frequently used as a conventional type catalyst, the cost of catalyst sums approximately to several thousand yen. Further, even if a germanium catalyst is used, the cost sums to about one thousand yen. On the other hand, in the present invention, for example, when an ammonium salt compound is used as a catalyst, the cost sums only to several ten yen, or even to several yen. In other words, according to the present invention, it is possible to reduce the cost significantly, as compared with the conventional catalysts.

Upon considering that the prices of various general-purpose monomers are generally around 100 yen to several hundred yen per kilogram, the cost for catalyst that is about ten times the cost for monomer, was required in the conventional techniques. In this regard, the present invention requires the cost for catalyst that is only about one-tenth or about one-hundredth of the cost for monomer, and thus the cost reducing effect is dramatic.

In addition, the advantages possessed by germanium catalysts, such as low toxicity (or non-toxicity) of catalyst, high dissolubility (no need for ligand), mild reaction conditions, no coloration/no odor (no need for treatment after polymerization reaction), are all possessed by the nonmetallic compound which is used as a catalyst of the present invention. Furthermore, a polymerization can be controlled with an amount of catalyst that is far lower (for example, down to one-fourth) than the small amount of catalyst realized by germanium catalysts. Although germanium catalysts (iodides) are somehow sensitive to moisture and light, the nonmetallic compounds which are used as a catalyst in the present invention are resistant to moisture and light, and further facilitate the operation of polymerization. As such, the present invention exhibits high environmental safety which is not possessed by conventional processes, as well as excellent economic efficiency and superior convenience that exceed the conventional techniques by far, and is highly excellent in practicality.

Moreover, the nonmetallic compound, which is used as a catalyst of the present invention, has particularly excellent functional-group-tolerance, and accordingly is expected to be utilized for various functional monomers that have a functional group, and have many practical applications. Since the catalyst of the present invention have high activity, it can be applied to various monomer groups, including acrylate group as a monomer group. Further, the catalyst of the present invention has high activity, and enables polymerization even at a low temperature. By conducting polymerization at a low temperature, side reactions are inhibited and a high molecular weight polymer can be synthesized.

The invention claimed is:

1. A method of polymerization comprising a step of conducting a living radical polymerization,
wherein the living radical polymerization step is conducted in the presence of a catalyst, wherein the catalyst is a nonmetallic compound having an ionic bond with a halide ion, and a nonmetallic atom in the nonmetallic compound is in a cationic state and forms an ionic bond with a halide ion.

2. The method according to claim 1,
wherein, the living radical polymerization is carried out in a reaction mixture comprising a monomer, and wherein a radical initiator is not present in the reaction mixture at the time of conducting the living radical polymerization.

3. The method according to claim 1,
wherein an organic halide having a carbon-halogen bond is used in the living radical polymerization reaction, and a halogen given from the organic halide is used as a protecting group of a growing chain.

4. The method according to claim 1,
wherein a reaction temperature at the time of conducting the living radical polymerization is 30° C. to 85° C.

5. The method according to claim 1,
wherein $I^-$ is used as an activating agent for the living radical polymerization reaction and $I_3^-$ is used as a deactivating agent for the living radical polymerization reaction.

6. The method according to claim 1, wherein the nonmetallic atom is selected from the group 15 elements, the group 16 elements, or the group 17 elements, and one to four organic groups are bonded to the nonmetallic atom.

7. The method according to claim 1, wherein the nonmetallic atom is selected from nitrogen, phosphorus, sulfur, or iodine.

8. The method according to claim 1, wherein the nonmetallic atom in a cationic state is covalently bonded to two to four organic groups and the nonmetallic atom is ionically bonded to one halide ion, and two of the organic groups may be linked to form a heterocycle, and wherein the nonmetallic atom is not bonded to any substituent other than the halide ion and the organic groups.

9. The method according to claim 8, wherein one or two nonmetallic atoms are present in the nonmetallic compound, and when two nonmetallic atoms are present, the two nonmetallic atoms are linked via the organic group.

10. The method according to claim 8, wherein the organic group is a hydrocarbon group or a substituted hydrocarbon group, the number of carbon atoms in the hydrocarbon group is 1 to 15, and the number of carbon atoms of the hydrocarbon moiety in the substituted hydrocarbon group is 1 to 15.

11. The method according to claim 1, wherein the halide ion ionically bonded to the nonmetallic atom is an iodide ion or a bromide ion.

12. The method according to claim 1, wherein the halide ion ionically bonded to the nonmetallic atom is an iodide ion.

13. The method according to claim 8, wherein the organic group is a saturated hydrocarbon group, a substituted saturated hydrocarbon group, an aromatic hydrocarbon group, or a substituted aromatic hydrocarbon group, or wherein the organic group is a hydrocarbon group or a substituted hydrocarbon group, and is taken together with the nonmetallic atom to form an aromatic ring structure.

14. The method according to claim 13, wherein the organic group is lower alkyl, lower haloalkyl, aryl, or halogenated aryl, or wherein the organic group is an unsaturated hydrocarbon or a halogenated unsaturated hydrocarbon and is taken together with the nonmetallic atom to form an aromatic ring structure.

* * * * *

UNITED STATES PATENT AND TRADEMARK OFFICE
CERTIFICATE OF CORRECTION

| | |
|---|---|
| PATENT NO. | : 9,018,325 B2 |
| APPLICATION NO. | : 14/240607 |
| DATED | : April 28, 2015 |
| INVENTOR(S) | : Atsushi Goto et al. |

It is certified that error appears in the above-identified patent and that said Letters Patent is hereby corrected as shown below:

Title Page

Item (75):
"Atsushi Goto, Uji (JP); Hironori Kaji, Uji (JP)" should read, --Atsushi Goto, Uji-shi, (JP); Hironori Kaji, Uji-shi (JP)--.

Signed and Sealed this
Fifth Day of April, 2016

Michelle K. Lee
*Director of the United States Patent and Trademark Office*